(12) United States Patent
Lee et al.

(10) Patent No.: US 10,317,685 B1
(45) Date of Patent: Jun. 11, 2019

(54) CLOAKING DEVICES CONSTRUCTED FROM REFLECTION BOUNDARIES AND HALF-MIRRORS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Chengang Ji, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 35 days.

(21) Appl. No.: 15/816,084

(22) Filed: Nov. 17, 2017

(51) Int. Cl.
*G02B 27/14* (2006.01)
*B60R 1/10* (2006.01)
*G02B 17/00* (2006.01)

(52) U.S. Cl.
CPC .............. *G02B 27/145* (2013.01); *B60R 1/10* (2013.01); *G02B 17/008* (2013.01)

(58) Field of Classification Search
CPC .. G02B 27/145; G02B 17/008; G02B 27/143; G02B 27/146; G02B 27/148; B60R 1/10
See application file for complete search history.

(56) References Cited

U.S. PATENT DOCUMENTS 5,392,161 A * 2/1995 Weder .................... A63H 33/22
359/861
7,429,115 B2    9/2008 Patrikakis 9,405,118 B1    8/2016 Lu
2017/0074652 A1    3/2017 Send et al.
2017/0227781 A1*    8/2017 Banerjee ................ G02B 27/14

OTHER PUBLICATIONS

"Physics demonstrations: cloaking device?", Apr. 25, 2013; URL: https://skullsinthestars.com/2013/04/25/physics-demonstrations-cloaking-device/.
Banerjee, Debasish et al., "Invisibility cloak with image projection capability", Sci. Rep., 6: 38965 (2016).

* cited by examiner

Primary Examiner — Ryan D Howard
(74) Attorney, Agent, or Firm — Dinsmore & Shohl LLP

(57) ABSTRACT

A cloaking device includes an object-side, an image-side, a cloaked region (CR) between the object-side and the image-side, and a reference optical axis extending from the object-side to the image-side. An object-side CR reflection boundary and an object-side optical component sub-assembly are positioned on the object-side and an image-side CR reflection boundary and an image-side optical component sub-assembly are positioned on the image-side. The object-side optical component sub-assembly includes an object-side outward-positioned half-mirror, an object-side inward-positioned half-mirror, and at least one of an object-side outward-positioned reflection boundary and an object-side half-wave plate. The image-side optical component sub-assembly includes an image-side outward-positioned half-mirror, an image-side inward-positioned half-mirror, and at least one of an image-side outward-positioned reflection boundary and an image-side half-wave plate. Light from an object located on the object-side of the cloaking device and obscured by the cloaked region is redirected around the cloaked region via three optical paths.

20 Claims, 9 Drawing Sheets

US 10,317,685 B1

CLOAKING DEVICES CONSTRUCTED FROM REFLECTION BOUNDARIES AND HALF-MIRRORS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region (CR) between the object-side and the image-side, and a reference optical axis extending from the object-side to the image-side. An object-side CR reflection boundary and an object-side optical component sub-assembly are positioned on the object-side and an image-side CR reflection boundary and an image-side optical component sub-assembly are positioned on the image-side. The object-side optical component sub-assembly includes an object-side outward-positioned half-mirror spaced apart and generally parallel to the object-side CR reflection boundary, and an object-side inward-positioned half-mirror spaced apart and generally parallel to the object-side outward-positioned half-mirror. At least one of an object-side outward-positioned reflection boundary spaced apart and parallel to the object-side CR reflection boundary and an object-side half-wave plate spaced apart and not parallel to the object-side CR reflection boundary is included. The image-side optical component sub-assembly includes an image-side outward-positioned half-mirror spaced apart and generally parallel to the image-side CR reflection boundary, and an image-side inward-positioned half-mirror spaced apart and generally parallel to the image-side outward-positioned half-mirror. At least one of an image-side outward-positioned reflection boundary spaced apart and parallel to the image-side CR reflection boundary and an image-side half-wave plate spaced apart and not parallel to the image-side CR reflection boundary is included. Light from an object located on the object-side of the cloaking device and obscured by the CR is redirected around the CR via three optical paths to form an image of the object on the image-side of the cloaking device such that the light from the object appears to pass through the CR.

In some embodiments, the cloaking device includes an object-side CR half-mirror co-planar with the object-side CR reflection boundary and the object-side inward-positioned half-mirror is positioned between the object-side outward-positioned half-mirror and the object-side CR half-mirror. The object-side optical component sub-assembly includes the object-side half-wave plate positioned generally perpendicular to the reference optical axis and extending between the object-side outward-positioned half-mirror and the object-side inward-positioned half-mirror. In such embodiments, an image-side CR half-mirror extending co-planar with the image-side CR reflection boundary may be included and the image-side inward-positioned half-mirror may be positioned between the image-side outward-positioned half-mirror and the image-side CR half-mirror. Also, the image-side optical component sub-assembly may include the image-side half-wave plate positioned generally perpendicular to the reference optical axis and extending between the image-side outward-positioned half-mirror and the image-side inward-positioned half-mirror.

In other embodiments, the object-side optical component sub-assembly includes an object-side outward-positioned reflection boundary co-planar with the object-side outward-positioned half-mirror and an object-side inward-positioned reflection boundary co-planar with the object-side inward-positioned half-mirror. The object-side half-wave plate may be positioned generally parallel to the reference optical axis and extend between the object-side outward-positioned half-mirror and the object-side inward-positioned half-mirror. In such embodiments, the image-side optical component sub-assembly may include an image-side outward-positioned reflection boundary co-planar with the image-side outward-positioned half-mirror and an image-side inward-positioned reflection boundary co-planar with the image-side inward-positioned half-mirror. The image-side half-wave plate may be positioned generally parallel to the reference optical axis and extend between the image-side outward-positioned half-mirror and the image-side inward-positioned half-mirror.

In still other embodiments, an object-side CR half-mirror extends co-planar from the object-side CR reflection boundary and an object-side outward-positioned reflection boundary extends co-planar from the object-side outward-positioned half-mirror. The object-side inward-positioned half-mirror may be positioned between the object-side outward-positioned reflection boundary and the object-side CR half-mirror. In such embodiments, an image-side CR half-mirror may be co-planar with the image-side CR reflection boundary and an image-side outward-positioned reflection boundary may be co-planar with the image-side outward-positioned half-mirror. The image-side inward-positioned half-mirror may be positioned between the image-side outward-positioned reflection boundary and the image-side CR half-mirror.

According to another embodiment, a cloaking device assembly includes an object-side, an image-side, a CR between the object-side and the image-side, and a reference optical axis extending from the object-side to the image-side. A first object-side CR reflection boundary and a first object-side optical component sub-assembly are positioned on a first side of the reference optical axis, and a second object-side CR reflection boundary and a second object-side optical component sub-assembly are positioned on a second side of the reference optical axis opposite the first side. The first and second object-side optical component sub-assemblies include first and second object-side outward-positioned half-mirrors, respectively, spaced apart and generally parallel to the first and second object-side CR reflection boundaries, respectively. First and second object-side inward-positioned half-mirrors, respectively, spaced apart and generally parallel to the first and second object-side outward-positioned half-mirrors, respectively, may be included. The first and second object-side optical component sub-assemblies may also include at least one of first and second object-side outward-positioned reflection boundaries, respectively, spaced apart and parallel to the first and second object-side CR reflection boundaries, respectively, and first and second object-side half-wave plates, respectively, spaced apart and not parallel to the first and second object-side CR reflection boundaries, respectively. A first image-side CR reflection boundary and a first image-side optical component sub-assembly are positioned on the first side of the reference optical axis and a second image-side CR reflection boundary and a second image-side optical component sub-assembly are positioned on the second side of the reference optical axis opposite the first side. The first and second image-side optical component sub-assemblies include first and second image-side outward-positioned half-mirrors, respectively, spaced apart and generally parallel to the first and second image-side CR reflection boundaries, respectively. First and second image-side inward-positioned half-mirrors, respectively, spaced apart and generally parallel to the first and second image-side outward-positioned half-mirrors, respectively, may be included. The first and second image-side optical component sub-assemblies may also include at least one of first and second image-side outward-positioned reflection boundaries, respectively, spaced apart and parallel to the first and second image-side CR reflection boundaries, respectively, and first and second image-side half-wave plates, respectively, spaced apart and not parallel to the first and second image-side CR reflection boundaries, respectively.

In some embodiments, first and second object-side CR half-mirrors may be co-planar with the first and second object-side CR reflection boundaries, respectively, and the first and second object-side inward-positioned half-mirrors are positioned between the first and second object-side outward-positioned half-mirrors and the first and second object-side CR half-mirrors, respectively. The first and second object-side optical component sub-assemblies may include the first and second object-side half-wave plates, respectively, positioned generally perpendicular to the reference optical axis and extending between the first and second object-side outward-positioned half-mirrors and the first and second object-side inward-positioned half-mirrors, respectively. In such embodiments, the first and second image-side CR half-mirrors may be co-planar with the first and second image-side CR reflection boundaries, respectively, and the first and second image-side inward-positioned half-mirrors may be positioned between the first and second image-side outward-positioned half-mirrors and the first and second image-side CR half-mirrors, respectively. Also, the first and second image-side optical component sub-assemblies may include the first and second image-side half-wave plates, respectively, positioned generally perpendicular to the reference optical axis and extending between the first and second image-side outward-positioned half-mirrors and the first and second image-side inward-positioned half-mirrors, respectively.

In other embodiments, the first and second object-side optical component sub-assemblies include first and second object-side outward-positioned reflection boundaries, respectively, co-planar with the first and second object-side outward-positioned half-mirrors, respectively, and first and second object-side inward-positioned reflection boundaries co-planar with the first and second object-side inward-positioned half-mirrors. The first and second object-side half-wave plates may be positioned generally parallel to the reference optical axis and extend between the first and second object-side outward-positioned half-mirrors and the first and second object-side inward-positioned half-mirrors, respectively. In such embodiments, the first and second image-side optical component sub-assemblies may include first and second image-side outward-positioned reflection boundaries, respectively, co-planar with the first and second image-side outward-positioned half-mirrors, respectively, and first and second image-side inward-positioned reflection boundaries co-planar with the first and second image-side inward-positioned half-mirrors, respectively. Also, the first and second image-side half-wave plates may be positioned generally parallel to the reference optical axis and extend between the first and second image-side outward-positioned half-mirrors and the first and second image-side inward-positioned half-mirrors, respectively.

According to another embodiment, a vehicle includes an A-pillar and a cloaking device positioned on the A-pillar. The cloaking device includes an object-side, an image-side, and a CR between the object-side and the image-side. The A-pillar is positioned within the cloaked region, the object-side is positioned on an exterior of the vehicle and the image-side is positioned within an interior of the vehicle. An object-side CR reflection boundary and an object-side optical component sub-assembly are positioned on the object-side and an image-side CR reflection boundary and an image-side optical component sub-assembly are positioned on the image-side. The object-side optical component sub-assembly includes an object-side outward-positioned half-mirror spaced apart and generally parallel to the object-side CR reflection boundary and an object-side inward-positioned half-mirror spaced apart and generally parallel to the object-side outward-positioned half-mirror. At least one of an object-side outward-positioned reflection boundary spaced apart and parallel to the object-side CR reflection boundary and an object-side half-wave plate spaced apart and not parallel to the object-side CR reflection boundary is included. The image-side optical component sub-assembly includes an image-side outward-positioned half-mirror spaced apart and generally parallel to the image-side CR reflection boundary and an image-side inward-positioned half-mirror spaced apart and generally parallel to the image-side outward-positioned half-mirror. At least one of an image-side outward-positioned reflection boundary spaced apart and parallel to the image-side CR reflection boundary and an image-side half-wave plate spaced apart and not parallel to the image-side CR reflection boundary is included. Light from an object located on the exterior of the vehicle and obscured by the A-pillar is redirected around the A-pillar via three optical paths to form an image of the object on the interior of the vehicle such that the light from the object appears to pass through the A-pillar.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of reflection boundaries and half-mirrors positioned around a cloaked region that reflect and transmit light around the cloaked region. In some embodiments, the cloaking device may further comprise half-wave plates. The cloaking devices described herein may be used, for example, to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. Alternatively of additionally, cloaking devices described herein may be used to cloak home, office and industrial articles such as extension cords, electrical conduit, piping, etc. The utilization of the reflection boundaries and half-mirrors allows an individual to perceive an image which, if not for the cloaking device, would be obstructed by an article. Various embodiments of cloaking devices and vehicles comprising the same will be described in further detail herein with specific reference to the appended drawings.

Figure 1A:
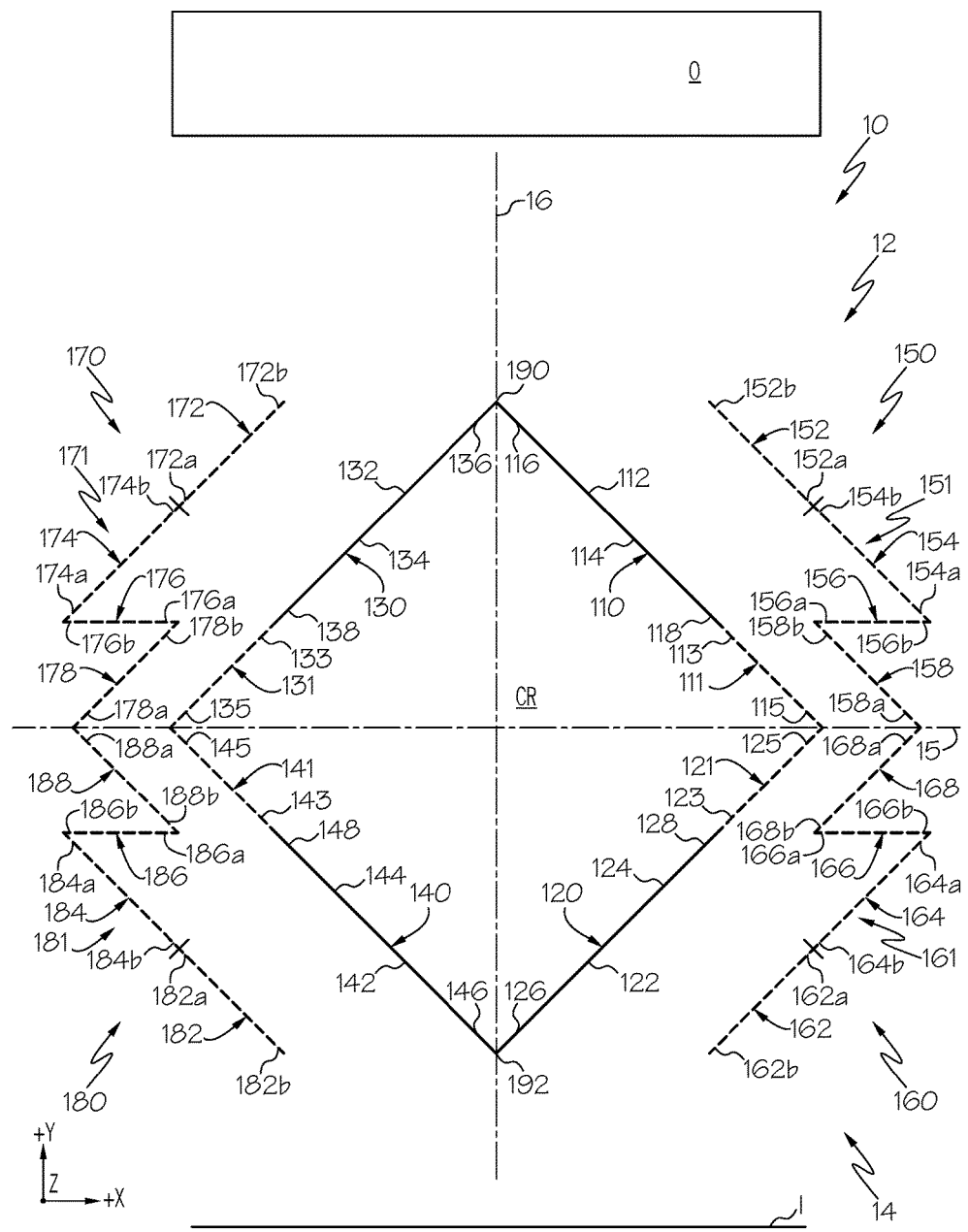
FIG. 1A schematically depicts a top view of a cloaking assembly according to one or more embodiments described and illustrated herein.

FIG. 1A generally depicts one embodiment of a cloaking device. The cloaking device includes an object-side, an image-side, and a cloaked region (CR) between the image-side and the object-side. A CR reflection boundary, an outward-positioned half-mirror, an inward-positioned half-mirror and a half-wave plate are positioned on the object-side of the cloaking device, and another CR reflection boundary, outward-positioned half-mirror, inward-positioned half-mirror and half-wave plate are positioned on the image-side of the cloaking device. As used herein, the terms "boundaries" and "boundary" refer to a physical surface. The term "outward-positioned" refers to an optical component spaced apart and positioned outward from (+ or −X direction depicted in the figures) the cloaked region relative to an inward-positioned optical component and the term "inward-positioned" refers to an optical component spaced apart and positioned inward from (− or +X direction) an outward-positioned optical component. The term "half-mirror" as used herein refers to an optical filter that allows light waves of a specific polarization (e.g., p-polarized light or s-polarized light) to pass through the optical filter and reflects light waves of other polarizations (e.g., s-polarized light or p-polarized light). The term "half-wave plate" as used herein refers to an optical component that shifts the polarization of linearly polarized light, e.g., shifts p-polarized light to s-polarized light or shifts s-polarized light to p-polarized light.

Light from an object located on the object-side of the cloaking device and obscured by the cloaked region is redirected around the cloaked region via three optical paths to form an image of the object on the image-side of the cloaking device such that the light from the object appears to pass through the cloaked region. As used herein, the term "three optical paths" refers to a first optical path, a second optical path that is different than the first optical path due to different reflections by and/or transmittances through a plurality of optical components, and a third optical that is different than the first optical path and the second optical path due to different reflections by and/or transmittances through a plurality of optical components. For example, the first optical path may include light from the object on the object-side of the cloaking device being reflected by the CR reflection boundaries, outward-positioned half-mirrors and inward-positioned half-mirrors. The second optical path may include light from the object being reflected by the CR reflection boundaries and the outward-positioned half-mirrors, and transmitted through the half-wave plates, and the third optical path may include light from the object being transmitted through the outward-positioned half-mirrors. Accordingly, the three optical paths redirect or "bend" light such that an individual will see the object located on the opposite side of the cloaked region (and thus on the opposite side of a cloaked article) giving the visual impression that the cloaked article is transparent.

Still referring to FIG. 1A, embodiments of a cloaking device include a cloaking assembly 10 with an object-side 12, an image-side 14, four CR reflection boundaries 110, 120, 130, 140. In embodiments, the CR reflection boundaries 110, 120, 130, 140 are planar and four CR half-mirrors 111, 121, 131, 141 are co-planar with the four CR reflection boundaries 110, 120, 130, 140, respectively. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the four CR reflection boundaries 110, 120, 130, 140 and each of the four CR half-mirrors 111, 121, 131, 141 may be planar and oriented at an acute angle (e.g., 45°) relative to the bisecting axis 15 and a reference optical axis 16 extending from the object-side 12 to the image-side 14 as depicted in FIG. 1A. The Z-axis shown in the figures extends along a height of the four CR reflection boundaries 110, 120, 130, 140 and the four CR half-mirrors 111, 121, 131, 141.

The two CR reflection boundaries 110, 130 and the two CR half-mirrors 111, 131 may be positioned on the object-side 12 of the cloaking assembly 10 to face an object 'O' and may be referred to herein as object-side CR reflection boundaries 110, 130 and object-side CR half-mirrors 111-131. Also, the object-side CR reflection boundary 110 and the object-side CR half-mirror 111 are positioned on a first side (+X direction) of the reference optical axis 16 and may be referred to herein as a first object-side CR reflection boundary 110 and a first object-side CR half-mirror 111. The object-side CR reflection boundary 130 and the object-side CR half-mirror 131 are positioned on a second side (−X direction) of the reference optical axis 16 opposite the first side and may be referred to herein as a second object-side CR reflection boundary 130 and a second object-side CR half-mirror 131.

The two CR reflection boundaries 120, 140 and the two CR half-mirrors 121, 141 may be positioned on the image-side 14 of the cloaking assembly 10 to provide an image 'I' formed by the cloaking assembly 10 and may be referred to herein as image-side CR reflection boundaries 120, 140 and image-side CR half-mirrors 121, 141. The image-side CR reflection boundary 120 and the image-side CR half-mirror 121 are positioned on the first side (+X direction) of the reference optical axis 16 and may be referred to herein as a first image-side CR reflection boundary 120 and a first image-side CR half-mirror 121. The image-side CR reflection boundary 140 and the image-side CR half-mirror 141 are positioned on the second side (−X direction) of the reference optical axis 16 opposite the first side and may be referred to herein as a second image-side CR reflection boundary 140 and a second image-side CR half-mirror 141.

The CR reflection boundaries 110, 120, 130, 140 each have an outward facing reflection surface 112, 122, 132, 142 and an inward facing surface 114, 124, 134, 144, respectively. The term "outward facing surface" used herein refers to a surface that faces away and/or reflects light away from a cloaked region 'CR' bound at least partially by the CR reflection boundaries 110, 120, 130, 140, and the term "inward facing surface" used herein refers to a surface that faces towards and/or reflects light towards the cloaked region CR. In embodiments, one or more of the inward facing surfaces 114, 124, 134, 144 may be an opaque surface thereby preventing light from within the cloaked region CR from propagating through one or more of the CR reflection boundaries 110, 120, 130, 140, respectively. The outward facing reflection surfaces 112, 122, 132, 142 can be made from omnidirectional photonic crystals or mirrors such that light incident on the outward facing reflection surfaces 112, 122, 132, 142 is reflected there from. In the alternative, one or more of the outward facing reflection surfaces 112, 122, 132, 142 may be a reflection surface of a prism, e.g., a right angle prism, that totally internally reflects light incident on the surface. As used herein, the term "reflection surface" refers to a surface that reflects all modes of light (e.g. s-polarized light and p-polarized light) incident on the reflection surface. Also, as used herein the term "reflected there from" refers to at least 60% of incident light being reflected from a surface. In some embodiments, at least 70% of incident light is reflected from the surface, while in other embodiments at least 80% of incident light is reflected from the surface. In still other embodiments, at least 90% of incident light, for example at least 95% of incident light is reflected from the surface.

The CR reflection boundaries 110, 120, 130, 140 may each have a distal end 116, 126, 136, 146 and a proximal end 118, 128, 138, 148, respectively. As used herein, the term "distal end" refers to an end or edge of an optical component positioned distal from a bisecting axis of the cloaking assembly (compared to a proximal end of the optical component) and the term "proximal end" refers to an end or edge of an optical component positioned proximal to the bisecting axis of a cloaking assembly (compared to a distal end of the optical component). The proximal ends 118, 128, 138, 148 are spaced apart from the distal ends 116, 126, 136, 146, respectively, and the CR reflection boundaries 110, 120, 130, 140 extend between distal ends 116, 126, 136, 146 and proximal ends 118, 128, 138, 148, respectively. The CR half-mirrors 111, 121, 131, 141 may each have a distal end 113, 123, 133, 143 and a proximal end 115, 125, 135, 145, respectively. The proximal ends 115, 125, 135, 145 are spaced apart from the distal ends 113, 123, 133, 143, respectively, and the CR half-mirrors 111, 121, 131, 141 extend between distal ends 113, 123, 133, 143 and proximal ends 115, 125, 135, 145, respectively. In embodiments, the distal ends 113, 123, 133, 143 of the CR half-mirrors 111, 121, 131, 141 are in contact with the proximal ends 118, 128, 138, 148 of the CR reflection boundaries 110, 120, 130, 140, respectively, such that un-polarized light does not escape or propagate out from the cloaked region CR. In some embodiments, the distal ends 113, 123, 133, 143 of the CR half-mirrors 111, 121, 131, 141 may be attached to the proximal ends 118, 128, 138, 148 of the CR reflection boundaries 110, 120, 130, 140, respectively.

In embodiments, the distal ends 116, 136 of the two object-side CR reflection boundaries 110, 130, respectively, meet or intersect at an apex 190. Alternatively or additionally, the distal ends 126, 146 of the two image-side CR reflection boundaries 120, 140, respectively, meet or intersect at an apex 192. In such embodiments, the reference optical axis 16 bisects the apex 190 and the apex 192, and may be a centerline between the first side (+X direction) and the second side (−X direction) of the cloaking assembly 10. In other embodiments, the distal ends 116, 136 of the two object-side CR reflection boundaries 110, 130, respectively, are spaced apart from each other and/or the distal ends 126, 146 of the two image-side CR reflection boundaries 120, 140, respectively, are spaced apart from each other such that a uncloaked region or gap (not shown) is present between the spaced apart distal ends 116, 136 and/or spaced apart distal ends 126, 146. In such embodiments, an image of the portion of the object O positioned above (+Y direction) the uncloaked region is not provided on the image-side 14 of the cloaking assembly 10. Also, in embodiments, the proximal ends 115, 135 of the object-side CR half-mirrors 111, 131 may be positioned adjacent to and may be joined to proximal ends 125, 145 of the image-side CR half-mirrors as depicted in FIG. 1A. In other embodiments, the proximal ends 115, 135 may be spaced apart (Y direction) from the proximal ends 125, 145 (not shown).

In embodiments, the two object-side CR reflection boundaries 110, 130, the two object-side CR half-mirrors 111, 131, the two image-side CR reflection boundaries 120, 140 and the two image-side CR half-mirrors 121, 141 form the cloaked region CR that is bound at least partly by the inward facing surfaces 114, 134, 124, 144 of the four CR reflection boundaries 110, 130, 120, 140, respectively, and the four CR half-mirrors 111, 121, 131, 141. Also, the two object-side CR reflection boundaries 110, 130, the two object-side CR half-mirrors 111, 131, the two image-side CR reflection boundaries 120, 140 and the two image-side CR half-mirrors 121, 141 have a height 'h' (FIG. 7) in the Z-direction of the coordinate axes in the figures.

In some embodiments, the two object-side CR reflection boundaries 110, 130, the two object-side CR half-mirrors 111, 131, the two image-side CR reflection boundaries 120, 140 and the two image-side CR half-mirrors 121, 141 may be oriented at an acute angle (e.g., 45°) relative to the bisecting axis 15 and the reference optical axis 16. In such embodiments, the two image-side CR reflection boundaries 120, 140 and the two image-side CR half-mirrors 121, 141 may be oriented relative to the bisecting axis 15 and the reference optical axis 16 at the same acute angle as the two object-side CR reflection boundaries 110, 130, the two object-side CR half-mirrors 111, 131, respectively. For example, the two image-side CR reflection boundaries 120, 140 and the two image-side CR half-mirrors 121, 141 may be symmetrical to the two object-side CR reflection boundaries 110, 130 and the two object-side CR half-mirrors 111, 131 (i.e., form a mirror image) about the bisecting optical axis 15. Alternatively or additionally, the second object-side and the second image-side CR reflection boundaries 130, 140 and the second object-side and the second image-side CR half mirrors 131, 141 may be symmetrical to the first object-side and the first image-side CR reflection boundaries 110, 120 and the first object-side and the first image-side CR half mirrors 111, 121 (i.e., form a mirror image) about the reference optical axis 16.

Still referring to FIG. 1A, the cloaking assembly 10 may include four optical component sub-assemblies 150, 160, 170, 180. In embodiments, the four optical component sub-assemblies 150, 160, 170, 180 are spaced apart from each of the CR reflection boundaries 110, 120, 130, 140, and CR half-mirrors 111, 121, 131, 141, respectively, and may include four outward-positioned half-mirrors 151, 161, 171, 181, four inward-positioned half-mirrors 158, 168, 178, 188, and four half-wave plates 156, 166, 176, 186.

The four outward-positioned half-mirrors 151, 161, 171, 181 are oriented generally parallel (+/−2°) to and spaced apart from the four CR reflection boundaries 110, 120, 130, 140, respectively. The four inward-positioned half-mirrors 158, 168, 178, 188, are oriented generally parallel (+/−2°) to and spaced apart from the four CR reflection boundaries 110, 120, 130, 140, and the four outward-positioned half-mirrors 151, 161, 171, 181, respectively. In some embodiments, the four inward-positioned half-mirrors 158, 168, 178, 188 are positioned between the four outward-positioned half-mirrors 151, 161, 171, 181 and the four CR half-mirrors 111, 121, 131, 141, respectively, as depicted in FIG. 1A. The four half-wave plates 156, 166, 176, 186 are oriented generally perpendicular (+/−2°) to the reference optical axis 16. In some embodiments, four half-wave plates 156, 166, 176, 186 extend between the four outward-positioned half-mirrors 151, 161, 171, 181 and the four inward-positioned half-mirrors 158, 168, 178, 188, respectively, as depicted in FIG. 1A.

In embodiments, one or more of the outward-positioned half-mirrors 151, 161, 171, 181 may comprise a first portion 152, 162, 172, 182 and a second portion 154, 164, 174, 184 co-planar with the first portion 152, 162, 172, 182, respectively. For example, the first portions 152, 162, 172, 182 may be in the form of a first set of four wire-grid polarizer—cube beamsplitters (not shown) and the second portions 154, 164, 174, 184 may be in the form of a second set of four wire-grid polarizer—cube beamsplitters (not shown). In such embodiments, the first portions 152, 162, 172, 182 may include proximal ends 152a, 162a, 172a, 182a and distal ends 152b, 162b, 172b, 182b, respectively, and the second portions 154, 164, 174, 184 may include proximal ends 154a, 164a, 174a, 184a and distal ends 154b, 164b, 174b, 184b, respectively. The proximal ends 152a, 162a, 172a, 182a are spaced apart from the distal ends 152b, 162b, 172b, 182b, respectively, and the first portions 152, 162, 172, 182 extend between the proximal ends 152a, 162a, 172a, 182a and the distal ends 152b, 162b, 172b, 182b, respectively. Also, the proximal ends 154a, 164a, 174a, 184a are spaced apart from the distal ends 154b, 164b, 174b, 184b, respectively, and the second portions 154, 164, 174, 184 extend between the proximal ends 154a, 164a, 174a, 184a and the distal ends 154b, 164b, 174b, 184b, respectively. The proximal ends 152a, 162a, 172a, 182a of the first portions 152, 162, 172, 182, respectively, may be directly in contact with the distal ends 154b, 164b, 174b, 184b of the second portions 154, 164, 174, 184, respectively. In some embodiments, the proximal ends 152a, 162a, 172a, 182a of the first portions 152, 162, 172, 182, respectively, may be attached to the distal ends 154b, 164b, 174b, 184b of the second portions 154, 164, 174, 184, respectively.

In some embodiments, one or more of the outward-positioned half-mirrors 151, 161, 171, 181 are not formed from a first portion and a second portion. That is, one or more of the outward-positioned half-mirrors 151, 161, 171, 181 are formed as a single half-mirror. In such embodiments, the outward-positioned half-mirrors 151, 161, 171, 181 include proximal ends 154a, 164a, 174a, 184a and distal ends 152b, 162b, 172b, 182b, respectively. The proximal ends 154a, 164a, 174a, 184a are spaced apart from the distal ends 152b, 162b, 172b, 182b, respectively, and the outward-positioned half-mirrors 151, 161, 171, 181 extend between the proximal ends 154a, 164a, 174a, 184a and the distal ends 152b, 162b, 172b, 182b, respectively. It should be understood that discussion of the outward-positioned half-mirrors 151, 161, 171, 181 herein may include embodiments with the first portions 152, 162, 172, 182 and the second portions 154, 164, 174, 184 unless stated otherwise.

The inward-positioned half-mirrors 158, 168, 178, 188 may include proximal ends 158a, 168a, 178a, 188a and distal ends 158b, 168b, 178b, 188b, respectively. The proximal ends 158a, 168a, 178a, 188a are spaced apart from the distal ends 158b, 168b, 178b, 188b, respectively, and the inward-positioned half-mirrors 158, 168, 178 188 extend between the proximal ends 158a, 168a, 178a, 188a and the distal ends 158b, 168b, 178b, 188b, respectively.

The four half-wave plates 156, 166, 176, 186 may include first ends 156a, 166a, 176a, 186a and second ends 156b, 166b, 176b, 186b, respectively. The first ends 156a, 166a, 176a, 186a are spaced apart from the second ends 156b, 166b, 176b, 186b, respectively, and the four half-wave plates 156, 166, 176, 186 extend between the first ends 156a, 166a, 176a, 186a and the second ends 156b, 166b, 176b, 186b, respectively. As noted above, the four half-wave plates 156, 166, 176, 186 may extend between the outward-positioned half-mirrors 151, 161, 171, 181 and the inward-positioned half-mirrors 158, 168, 178, 188, respectively. For example, the four half-wave plates 156, 166, 176, 186 may extend between the proximal ends 154a, 164a, 174a, 184a of the outward-positioned half-mirrors 151, 161, 171, 181 and the distal ends 158b, 168b, 178b, 188b of the inward-positioned half-mirrors 158, 168, 178 188, respectively. In embodiments, the first ends 156a, 166a, 176a, 186a of the four half-wave plates 156, 166, 176, 186, respectively, are directly in contact with the distal ends 158b, 168b, 178b, 188b of the inward-positioned half-mirrors 158, 168, 178 188, respectively, and the second ends 156b, 166b, 176b, 186b are directly in contact with the proximal ends 154a, 164a, 174a, 184a of the outward-positioned half-mirrors 151, 161, 171, 181, respectively. In such embodiments, the first ends 156a, 166a, 176a, 186a of the four half-wave plates 156, 166, 176, 186, respectively, may be attached to the distal ends 158b, 168b, 178b, 188b of the inward-positioned half-mirrors 158, 168, 178 188, respectively, and/or the second ends 156b, 166b, 176b, 186b may be attached to the proximal ends 154a, 164a, 174a, 184a of the outward-positioned half-mirrors 151, 161, 171, 181, respectively.

The two outward-positioned half-mirrors 151, 171, the two inward-positioned half-mirrors 158, 178 and the two half-wave plates 156, 176 may be positioned on the object-side 12 of the cloaking assembly 10 and may be referred to herein as object-side outward-positioned half-mirrors 151, 171, object-side inward-positioned half-mirrors 158, 178, and object-side half-wave plates 156, 176, respectively. The object-side outward-positioned half-mirror 151, the object-side inward-positioned half-mirror 158, and the object-side half-wave plate 156 are positioned on the first side (+X direction) of the reference optical axis 16 and may be referred to herein as a first object-side outward-positioned half-mirror 151, a first object-side inward-positioned half-mirror 158, and a first object-side half-wave plate 156. The object-side outward-positioned half-mirror 171, the object-side inward-positioned half-mirror 178, and the object-side half-wave plate 176 are positioned on the second side (−X direction) of the reference optical axis 16 and may be referred to herein as a second object-side outward-positioned half-mirror 171, a second object-side inward-positioned half-mirror 178, and a second object-side half-wave plate 176. The two outward-positioned half-mirrors 161, 181, the two inward-positioned half-mirrors 168, 188 and the two half-wave plates 166, 186 may be positioned on the image-side 14 of the cloaking assembly 10 and may be referred to herein as image-side outward-positioned half-mirrors 161, 181, image-side inward-positioned half-mirrors 168, 188, and image-side half-wave plates 166, 186, respectively. The image-side outward-positioned half-mirror 161, the image-side inward-positioned half-mirror 168, and the image-side half-wave plate 166 are positioned on the first side (+X direction) of the reference optical axis 16 and may be referred to herein as a first image-side outward-positioned half-mirror 161, a first image-side inward-positioned half-mirror 168, and a first image-side half-wave plate 166. The image-side outward-positioned half-mirror 181, the image-side inward-positioned half-mirror 188, and the image-side half-wave plate 186 are positioned on the second side (−X direction) of the reference optical axis 16 and may be referred to herein as a second image-side outward-positioned half-mirror 181, a second image-side inward-positioned half-mirror 188, and a second image-side half-wave plate 186.

The CR half-mirrors 111, 121, 131, 141, the outward-positioned half-mirrors 151, 161, 171, 181, including embodiments with the first portions 152, 162, 172, 182 and second portions 154, 164, 174, 184, and the inward-positioned half-mirrors 158, 168, 178, 188, reflect a specific mode of visible light. Specifically, each of the CR half-mirrors 111, 121, 131, 141, each of the outward-positioned half-mirrors 151, 161, 171, 181 and each of the inward-positioned half-mirrors 158, 168, 178, 188 may be an s-polarizer half-mirror or a p-polarizer half-mirror. The CR half-mirrors 111, 121, 131, 141, the outward-positioned half-mirrors 151, 161, 171, 181, and the inward-positioned half-mirrors 158, 168, 178, 188 may be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of the visible light to pass through (an s-polarization diffraction grating or thin film). In embodiments, the CR half-mirrors 111, 121, 131, 141, the outward-positioned half-mirrors 151, 161, 171, 181 and the inward-positioned half-mirrors 158, 168, 178, 188 are all p-polarizer half-mirrors or all s-polarizer half-mirrors. In other embodiments, the first side (+X direction) half-mirrors, i.e., CR half-mirrors 111, 121, the outward-positioned half-mirrors 151, 161, and the inward-positioned half-mirrors 158, 168, are all p-polarizer half-mirrors and the second side (−X direction) half-mirrors, i.e., the CR half-mirrors 131, 141, the outward-positioned half-mirrors 171, 181, and the inward-positioned half-mirrors 178, 188, are all s-polarizer half-mirrors. In still other embodiments, the first side (+X direction) half-mirrors, i.e., CR half-mirrors 111, 121, the outward-positioned half-mirrors 151, 161, and the inward-positioned half-mirrors 158, 168, are all s-polarizer half-mirrors and the second side (−X direction) half-mirrors, i.e., the CR half-mirrors 131, 141, the outward-positioned half-mirrors 171, 181, and the inward-positioned half-mirrors 178, 188, are all p-polarizer half-mirrors.

Figure 1B:
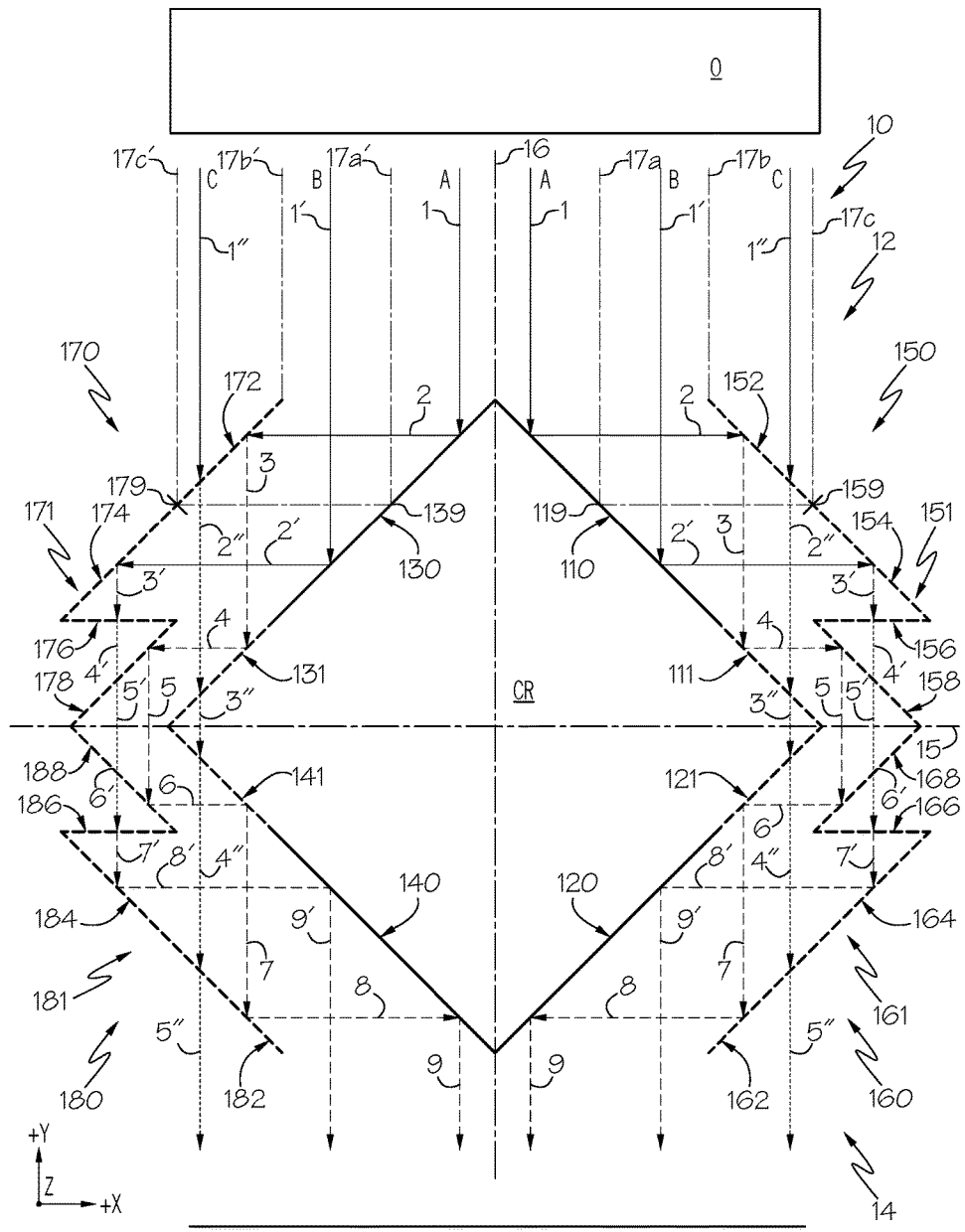
FIG. 1B schematically depicts a top view of the cloaking assembly of FIG. 1A with light propagating from an object on an object-side of the cloaking assembly to form an image on an image-side of the cloaking assembly via three optical paths.

Referring now to FIGS. 1A and 1B, the cloaking assembly 10 includes three optical paths for light from an object 'O' positioned on the object 12 to be redirected around the cloaked region CR to from an image T on the image-side 14 on the first side (+X direction) of the reference optical axis 16. The cloaking assembly 10 may also include three optical paths for light from an object 'O' positioned on the object 12 to be redirected around the cloaked region CR to from an image T on the image-side 14 on the second side (−X direction) of the reference optical axis 16. Regarding the three optical paths on the first side (+X direction) of the reference optical axis 16, light from the object O incident on the cloaking assembly 10 between the reference optical axis 16 and a first optical path transition axis 17a propagates via an optical path 'A'. Light from the object O incident on the cloaking assembly 10 between the first optical path transition axis 17a and a second optical path transition axis 17b propagates via an optical path 'B'. Light from the object O positioned above (+Y direction) the cloaking assembly 10 between the second optical path transition axis 17b and a third optical path transition axis 17c propagates via an optical path 'C'.

The first optical path transition axis 17a extends parallel to the Y-axis in the figures from a point 119 on the first object-side CR reflection boundary 110 to the object O. In embodiments, the point 119 is defined by the intersection of a line extending parallel to the X-axis in the figures from a point 159 on the first object-side outward-positioned half-mirror 151, which in turn is defined by a line extending parallel to the Y-axis line (not shown) lying on the first ends 156a, 166a (FIG. 1A) of the half-wave plates 156, 166, respectively. Accordingly, light propagating via optical path A is reflected from the first object-side CR reflection boundary 110 onto the first object-side outward-positioned half-mirror 151 between the distal end 152b and the point 159. The second optical path transition axis 17b extends parallel to the Y-axis from the distal end 152b (FIG. 1A) of the first object-side outward-positioned half-mirror 151 to object O. Accordingly, light propagating via optical path B is reflected from the first object-side CR reflection boundary 110 onto the first object-side outward-positioned half-mirror 151 between the point 159 and the proximal end 154a (FIG. 1A) of the first object-side outward-positioned half-mirror 151. The third optical path transition axis 17c extends parallel to the Y-axis from the point 159 on the first object-side outward-positioned half-mirror 151 to the object O. Accordingly, light propagating via optical path C is incident on the first object-side outward-positioned half-mirror 151 between the distal end 152b (FIG. 1A) and the point 159.

Regarding the first optical path A on the first side (+X direction) of the reference optical axis 16, light from the object O positioned above (+Y direction) the cloaking assembly 10 between the reference optical axis 16 and the first optical path transition axis 17a is incident on the first object-side CR reflection boundary 110 (shown as arrow '1' in FIG. 1B). The first object-side CR reflection boundary 110 is positioned relative to the first object-side outward-positioned half-mirror 151 such that light 1 is reflected by the outward facing reflection surface 112 (FIG. 1A) of the first object-side CR reflection boundary 110 onto the first outward-positioned half-mirror 151 (shown as arrow '2' in FIG. 1B) between the distal end 152b and the point 159. A non-limiting example of the first outward-positioned half-mirror 151 in the form of a p-polarization half-mirror is depicted in FIG. 1B. Accordingly, s-polarized light (shown as a dashed line in the figures) is reflected from the first outward-positioned half-mirror 151 (shown as arrow '3' in FIG. 1B). The first outward-positioned half-mirror 151 is positioned relative to the first object-side CR half-mirror 111 such that s-polarized light 3 is reflected by the first outward-positioned half-mirror 151 onto the first object-side CR half-mirror 111. As noted above, the first side (+X direction) half-mirrors are all the same type or mode of half-mirrors. That is, each of the CR half-mirrors 111, 121, each of the outward-positioned half-mirrors 151, 161, and each of the inward-positioned half-mirrors 158, 168 depicted in FIG. 1B is a p-polarization half-mirror. Accordingly, s-polarized light 3 is reflected by the first object-side CR half-mirror 111 (shown as arrow '4' in FIG. 1B). The first object-side CR half-mirror 111 is positioned relative to the first object-side inward-positioned half-mirror 158 such that s-polarized light 4 is reflected by the first object-side CR half-mirror 111 onto the first object-side inward-positioned half-mirror 158 where it is reflected (shown as arrow '5' in FIG. 1B). The first object-side inward-positioned half-mirror 158 is positioned relative to the first image-side inward-positioned half-mirror 168 such that s-polarized light 5 is reflected by the first object-side inward-positioned half-mirror 158 onto the first image-side inward-positioned half-mirror 168 where it is reflected (shown as arrow '6' in FIG. 1B). The first image-side inward-positioned half-mirror 168 is positioned relative to the first image-side CR half-mirror 121 such that s-polarized light 6 is reflected by the first image-side inward-positioned half-mirror 168 onto the first image-side CR half-mirror 121 where it is reflected (shown as arrow '7' in FIG. 1B). The first image-side CR half-mirror 121 is positioned relative to the first image-side outward-positioned half-mirror 161 such that s-polarized light 7 is reflected by the first image-side CR half-mirror 121 onto the first image-side outward-positioned half-mirror 161 where it is reflected (shown as arrow '8' in FIG. 1B). The first image-side outward-positioned half-mirror 161 is positioned relative to the first image-side CR reflection boundary 120 such that s-polarized light 8 is reflected by the first image-side outward-positioned half-mirror 161 onto the outward facing reflection surface 122 (FIG. 1A) of the first image-side CR reflection boundary 120 where it is reflected (shown as arrow '9' in FIG. 1B). S-polarized light 9 is reflected by the outward facing reflection surface 122 generally parallel to light 1 and forms a portion of an image I on the image-side 14 of the cloaking assembly 10.

Accordingly, light from the object O may travel from the object-side 12 to the image-side 14 via the first optical path A: object O—first object-side CR reflection boundary 110—first object-side outward-positioned half-mirror 151—first object-side CR half-mirror 111—first object-side inward-positioned half-mirror 158—first image-side inward-positioned half-mirror 168—first image-side CR half-mirror 121—first image-side outward-positioned half-mirror 161—first image-side CR reflection boundary 120—image I. That is, light from the object O may travel from the object-side 12 to the image-side 14 via the first optical path A: object O—reflection from first object-side CR reflection boundary 110—reflection from first object-side outward-positioned half-mirror 151—reflection from first object-side CR half-mirror 111—reflection from first object-side inward-positioned half-mirror 158—reflection from first image-side inward-positioned half-mirror 168—reflection from first image-side CR half-mirror 121—reflection from first image-side outward-positioned half-mirror 161—reflection from first image-side CR reflection boundary 120—image I.

Regarding the second optical path B on the first side (+X direction) of the reference optical axis 16, light from the object O positioned above (+Y direction) the cloaking assembly 10 between the first optical path transition axis 17a and the second optical path transition axis 17b is incident on the first object-side CR reflection boundary 110 (shown as arrow '1'' in FIG. 1B). The first object-side CR reflection boundary 110 is positioned relative to the first object-side outward-positioned half-mirror 151 such that light 1' is reflected by the outward facing reflection surface 112 (FIG. 1A) of the first object-side CR reflection boundary 110 onto the first object-side outward-positioned half-mirror 151 (shown as arrow '2'' in FIG. 1B) between the point 159 and the proximal end 154a. Light 2' is polarized by the first object-side outward-positioned half-mirror 151 such that s-polarized light is reflected by the first object-side outward-positioned half-mirror 151 (shown as arrow '3'' in FIG. 1B). The first object-side outward-positioned half-mirror 151 is positioned relative to the first object-side half-wave plate 156 such that s-polarized light 3' is reflected by the first object-side outward-positioned half-mirror 151 onto the first object-side half-wave plate 156. The s-polarized light 3' is transmitted through the first object-side half-wave plate 156 and shifted to p-polarized light (shown as arrow '4'' in FIG. 1B with a small-dash line in the figures in contrast to a long-dash line for s-polarized light). The first object-side half-wave plate 156 is positioned relative to the first object-side inward-positioned half-mirror 158 such that p-polarized light 4' transmitted through the first object-side half-wave plate 156 is incident on the first object-side inward-positioned half-mirror 158. As noted above, the first object-side inward-positioned half-mirror 158 is a p-polarization half-mirror. Accordingly, p-polarized light 4' is transmitted through the first object-side inward-positioned half-mirror 158 as p-polarized light 5'. The first object-side inward-positioned half-mirror 158 is positioned relative to the first image-side inward-positioned half-mirror 168 such that p-polarized light 5' transmitted through the first object-side inward-positioned half-mirror 158 is incident on the first image-side inward-positioned half-mirror 168 where it is transmitted through as p-polarized light 6'. The first image-side inward-positioned half-mirror 168 is positioned relative to the first image-side half-wave plate 166 such that p-polarized light 6' transmitted through the first image-side inward-positioned half-mirror 168 is incident on the first image-side half-wave plate 166. The p-polarized light 6' is transmitted through the first image-side half-wave plate 166 and shifted back to s-polarized light (shown as arrow '7'' in FIG. 1B). The first image-side half-wave plate 166 is positioned relative to the first image-side outward-positioned half-mirror 161 such that s-polarized light 7' transmitted through the first image-side half-wave plate 166 is incident on the first image-side outward-positioned half-mirror 161 where it is reflected (shown as arrow '8'' in FIG. 1B). The first image-side outward-positioned half-mirror 161 is positioned relative to the first image-side CR reflection boundary 120 such that s-polarized light 8' is reflected by the first image-side outward-positioned half-mirror 161 onto the outward facing reflection surface 122 (FIG. 1A) of the first image-side CR reflection boundary 120 where it is reflected (shown as arrow '9'' in FIG. 1B). S-polarized light 9' is reflected by the outward facing reflection surface 122 of the first image-side CR reflection boundary 120 generally parallel to light 1' and forms a portion of the image I on the image-side 14 of the cloaking assembly 10.

Accordingly, light from the object O may travel from the object-side 12 to the image-side 14 via the second optical path B: object O—first object-side CR reflection boundary 110—first object-side outward-positioned half-mirror 151—first object-side half-wave plate 156—first object-side inward-positioned half-mirror 158—first image-side inward-positioned half-mirror 168—first image-side half-wave plate 166—first image-side outward-positioned half-mirror 161—first image-side CR reflection boundary 120—image I. That is, light from the object O may travel from the object-side 12 to the image-side 14 via the second optical path B: object O—reflection from first object-side CR reflection boundary 110—reflection from first object-side outward-positioned half-mirror 151—transmittance through first object-side half-wave plate 156—transmittance through first object-side inward-positioned half-mirror 158—transmittance through first image-side inward-positioned half-mirror 168—transmittance through first image-side half-wave plate 166—reflection from first image-side outward-positioned half-mirror 161—reflection from first image-side CR reflection boundary 120—image I.

Regarding the third optical path C on the first side (+X direction) of the reference optical axis 16, light from the object O positioned above (+Y direction) the cloaking assembly 10 between the second optical path transition axis 17b and the third optical path transition axis 17c is incident on the first object-side outward-positioned half-mirror 151 between the distal end 152b (FIG. 1A) and the point 159 (shown as arrow '1''' in FIG. 1B). The p-polarized mode of light 1'' is transmitted through the first object-side outward-positioned half-mirror 151 as p-polarized light 2''. The first object-side outward-positioned half-mirror 151 is positioned relative to the first object-side CR half-mirror 111 such that p-polarized light 2'' is incident on the first object-side CR half-mirror 111 where it is transmitted the first object-side CR half-mirror 111 as p-polarized light 3''. The first object-side CR half-mirror 111 is positioned relative to the first image-side CR half-mirror 121 such that p-polarized light 3'' is incident on the first image-side CR half-mirror 121 where it is transmitted through the first image-side CR half-mirror 121 as p-polarized light 4''. The first image-side CR half-mirror 121 is positioned relative to the first image-side outward-positioned half-mirror 161 such that p-polarized light 4'' is incident on the first image-side outward-positioned half-mirror 161 where it is transmitted through the first image-side outward-positioned half-mirror 161 as p-polarized light 5''. P-polarized light 5'' propagates generally parallel to light 1'' and forms a portion of the image I on the image-side 14 of the cloaking assembly 10.

Accordingly, light from the object O may travel from the object-side 12 to the image-side 14 via the third optical path C: object O—first object-side outward-positioned half-mirror 151—first object-side CR half-mirror 111—first image-side CR half-mirror 121—first image-side outward-positioned half-mirror 161—image I. That is, light from the object O may travel from the object-side 12 to the image-side 14 via the third optical path C: object O—transmittance through first object-side outward-positioned half-mirror 151—transmittance through first object-side CR half-mirror 111—transmittance through first image-side CR half-mirror 121—transmittance through first image-side outward-positioned half-mirror 161—image I.

Still referring to FIGS. 1A and 1B, and regarding the three optical paths on the second side (−X direction) of the reference optical axis 16, light from the object O incident on the cloaking assembly 10 between the reference optical axis 16 and a first optical path transition axis 17a' propagates via an optical path 'A'. Light from the object O incident on the cloaking assembly 10 between the first optical path transition axis 17a' and a second optical path transition axis 17b' propagates via an optical path 'B'. Light from the object O positioned above (+Y direction) the cloaking assembly 10 between the second optical path transition axis 17b' and a third optical path transition axis 17c' propagates via an optical path 'C'.

The first optical path transition axis 17a' extends parallel to the Y-axis in the figures from a point 139 on the second object-side CR reflection boundary 130 to the object O. In embodiments, the point 139 is defined by the intersection of line extending parallel to the X-axis in the figures from a point 179 on the second object-side outward-positioned half-mirror 171, which in turn is defined by a line (not shown) extending parallel to the Y-axis line lying on the first ends 176a, 186a (FIG. 1A) of the half-wave plates 176, 186, respectively. Accordingly, light propagating via optical path A is reflected from the second object-side CR reflection boundary 130 onto the second object-side outward-positioned half-mirror 171 between the distal and 172b (FIG. 1A) and the point 179. The second optical path transition axis 17b' extends parallel to the Y-axis from the distal end 172b (FIG. 1A) of the second object-side outward-positioned half-mirror 171 to the object O. Accordingly, light propagating via optical path B is reflected from the second object-side CR reflection boundary 130 onto the second object-side outward-positioned half-mirror 171 between the point 179 and the proximal end 174a (FIG. 1A) of the second object-side outward-positioned half-mirror 171. The third optical path transition axis 17c' extends parallel to the Y-axis from the point 179 on the second object-side outward-positioned half-mirror 171 to the object O. Accordingly, light propagating via optical path C is incident on the second object-side outward-positioned half-mirror 171 between the distal end 172b (FIG. 1A) and the point 179.

Regarding the first optical path A on the second side (−X direction) of the reference optical axis 16, light from the object O positioned above (+Y direction) the cloaking assembly 10 between the reference optical axis 16 and the first optical path transition axis 17a' is incident on the second object-side CR reflection boundary 130 (shown as arrow '1' in FIG. 1B). The second object-side CR reflection boundary 130 is positioned relative to the second outward-positioned half-mirror 171 such that light 1 is reflected by the outward facing reflection surface 132 (FIG. 1A) of the second object-side CR reflection boundary 130 onto the second outward-positioned half-mirror 171 (shown as arrow '2' in FIG. 1B) between the distal end 172b and the point 179. A non-limiting example of the second outward-positioned half-mirror 171 in the form of a p-polarization half-mirror is depicted in FIG. 1B. Accordingly, s-polarized light (shown as a dashed line in the figures) is reflected from the second outward-positioned half-mirror 171 (shown as arrow '3' in FIG. 1B). The second outward-positioned half-mirror 171 is positioned relative to the second object-side CR half-mirror 131 such that s-polarized light 3 is reflected by the second outward-positioned half-mirror 171 onto the second object-side CR half-mirror 131. As noted above, the second side (−X direction) half-mirrors are all the same type or mode of half-mirrors. That is, each of the CR half-mirrors 131, 141, each of the outward-positioned half-mirrors 171, 181, and each of the inward-positioned half-mirrors 178, 188 depicted in FIG. 1B is a p-polarization half-mirror. Accordingly, s-polarized light 3 is reflected by the second object-side CR half-mirror 131 (shown as arrow '4' in FIG. 1B). The second object-side CR half-mirror 131 is positioned relative to the second object-side inward-positioned half-mirror 178 such that s-polarized light 4 is reflected by the second object-side CR half-mirror 131 onto the second object-side inward-positioned half-mirror 178 where it is reflected (shown as arrow '5' in FIG. 1B). The second object-side inward-positioned half-mirror 178 is positioned relative to the second image-side inward-positioned half-mirror 188 such that s-polarized light 5 is reflected by the second object-side inward-positioned half-mirror 178 onto the second image-side inward-positioned half-mirror 188 where it is reflected (shown as arrow '6' in FIG. 1B). The second image-side inward-positioned half-mirror 188 is positioned relative to the second image-side CR half-mirror 141 such that s-polarized light 6 is reflected by the second image-side inward-positioned half-mirror 188 onto the second image-side CR half-mirror 141 where it is reflected (shown as arrow '7' in FIG. 1B). The second image-side CR half-mirror 141 is positioned relative to the second image-side outward-positioned half-mirror 181 such that s-polarized light 7 is reflected by the second image-side CR half-mirror 141 onto the second image-side outward-positioned half-mirror 181 where it is reflected (shown as arrow '8' in FIG. 1B). The second image-side outward-positioned half-mirror 181 is positioned relative to the second image-side CR reflection boundary 140 such that s-polarized light 8 is reflected by the second image-side outward-positioned half-mirror 181 onto the outward facing reflection surface 142 (FIG. 1A) of the second image-side CR reflection boundary 140 where it is reflected (shown as arrow '9' in FIG. 1B). S-polarized light 9 is reflected by the outward facing reflection surface 142 generally parallel to light 1 and forms a portion of an image I on the image-side 14 of the cloaking assembly 10.

Accordingly, light from the object O may travel from the object-side 12 to the image-side 14 via the first optical path A: object O—second object-side CR reflection boundary 130—second object-side outward-positioned half-mirror 171—second object-side CR half-mirror 131—second object-side inward-positioned half-mirror 178—second image-side inward-positioned half-mirror 188—second image-side CR half-mirror 141—second image-side outward-positioned half-mirror 181—second image-side CR reflection boundary 140—image I. That is, light from the object O may travel from the object-side 12 to the image-side 14 via the first optical path A: object O—reflection from second object-side CR reflection boundary 130—reflection from second object-side outward-positioned half-mirror 171—reflection from second object-side CR half-mirror 131—reflection from second object-side inward-positioned half-mirror 178—reflection from second image-side inward-positioned half-mirror 188—reflection from second image-side CR half-mirror 141—reflection from second image-side outward-positioned half-mirror 181—reflection from second image-side CR reflection boundary 140—image I.

Regarding the second optical path B on the second side (−X direction) of the reference optical axis 16, light from the object O positioned above (+Y direction) the cloaking assembly 10 between the first optical path transition axis 17a' and the second optical path transition axis 17b' is incident on the second object-side CR reflection boundary 130 (shown as arrow '1'' in FIG. 1B). The second object-side CR reflection boundary 130 is positioned relative to the second object-side outward-positioned half-mirror 171 such that light 1' is reflected by the outward facing reflection surface 132 (FIG. 1A) of the second object-side CR reflection boundary 130 onto the second object-side outward-positioned half-mirror 171 (shown as arrow '2'' in FIG. 1B) between the point 179 and the proximal end 174a. Light 2' is polarized by the second object-side outward-positioned half-mirror 171 such that s-polarized light is reflected by the second object-side outward-positioned half-mirror 171 (shown as arrow '3'' in FIG. 1B). The second object-side outward-positioned half-mirror 171 is positioned relative to the second object-side half-wave plate 176 such that s-polarized light 3' is reflected by the second object-side outward-positioned half-mirror 171 onto the second object-side half-wave plate 176. The s-polarized light 3' is transmitted through the second object-side half-wave plate 176 and shifted to p-polarized light (shown as arrow '4'' in FIG. 1B). The second object-side half-wave plate 176 is positioned relative to the second object-side inward-positioned half-mirror 178 such that p-polarized light 4' transmitted through the second object-side half-wave plate 176 is incident on the second object-side inward-positioned half-mirror 178. As noted above, the second object-side inward-positioned half-mirror 178 is a p-polarization half-mirror. Accordingly, p-polarized light 4' is transmitted through the second object-side inward-positioned half-mirror 178 as p-polarized light 5'. The second object-side inward-positioned half-mirror 178 is positioned relative to the second image-side inward-positioned half-mirror 188 such that p-polarized light 5' transmitted through the second object-side inward-positioned half-mirror 178 is incident on the second image-side inward-positioned half-mirror 188 where it is transmitted through as p-polarized light 6'. The second image-side inward-positioned half-mirror 188 is positioned relative to the second image-side half-wave plate 186 such that p-polarized light 6' transmitted through the second image-side inward-positioned half-mirror 188 is incident on the second image-side half-wave plate 186. The p-polarized light 6' is transmitted through the second image-side half-wave plate 186 and shifted back to s-polarized light (shown as arrow '7'' in FIG. 1B). The second image-side half-wave plate 186 is positioned relative to the second image-side outward-positioned half-mirror 181 such that s-polarized light 7' transmitted through the second image-side half-wave plate 186 is incident on the second image-side outward-positioned half-mirror 181 where it is reflected (shown as arrow '8'' in FIG. 1B). The second image-side outward-positioned half-mirror 181 is positioned relative to the second image-side CR reflection boundary 140 such that s-polarized light 8' is reflected by the second image-side outward-positioned half-mirror 181 onto the outward facing reflection surface 142 (FIG. 1A) of the second images-side CR reflection boundary 140 where it is reflected (shown as arrow '9'' in FIG. 1B). S-polarized light 9' is reflected by the outward facing reflection surface 142 of the second images-side CR reflection boundary 140 generally parallel to light 1' and forms a portion of the image I on the image-side 14 of the cloaking assembly 10.

Accordingly, light from the object O may travel from the object-side 12 to the image-side 14 via the second optical path B: object O—second object-side CR reflection boundary 130—second object-side outward-positioned half-mirror 171—second object-side half-wave plate 176—second object-side inward-positioned half-mirror 178—second image-side inward-positioned half-mirror 188—second image-side half-wave plate 186—second image-side outward-positioned half-mirror 181—second image-side CR reflection boundary 140—image I. That is, light from the object O may travel from the object-side 12 to the image-side 14 via the second optical path B: object O—reflection from second object-side CR reflection boundary 130—reflection from second object-side outward-positioned half-mirror 171—transmittance through second object-side half-wave plate 176—transmittance through second object-side inward-positioned half-mirror 178—transmittance through second image-side inward-positioned half-mirror 188—transmittance through second image-side half-wave plate 186—reflection from second image-side outward-positioned half-mirror 181—reflection from second image-side CR reflection boundary 140—image I.

Regarding the third optical path C on the second side (−X direction) of the reference optical axis 16, light from the object O positioned above (+Y direction) the cloaking assembly 10 between the second optical path transition axis 17b' and the third optical path transition axis 17c' is incident on the second object-side outward-positioned half-mirror 171 between the distal end 172b (FIG. 1A) and the point 179 (shown as arrow '1'" in FIG. 1B). The p-polarized mode of light 1" is transmitted through the second object-side outward-positioned half-mirror 171 as p-polarized light 2". The second object-side outward-positioned half-mirror 171 is positioned relative to the second object-side CR half-mirror 131 such that p-polarized light 2" is incident on the second object-side CR half-mirror 131 where it is transmitted the second object-side CR half-mirror 131 as p-polarized light 3". The second object-side CR half-mirror 131 is positioned relative to the second image-side CR half-mirror 141 such that p-polarized light 3" is incident on the second image-side CR half-mirror 141 where it is transmitted through the second image-side CR half-mirror 141 as p-polarized light 4". The second image-side CR half-mirror 141 is positioned relative to the second image-side outward-positioned half-mirror 181 such that p-polarized light 4" is incident on the second image-side outward-positioned half-mirror 181 where it is transmitted through the second image-side outward-positioned half-mirror 181 as p-polarized light 5". P-polarized light 5" propagates generally parallel to light 1" and forms a portion of the image I on the image-side 14 of the cloaking assembly 10.

Accordingly, light from the object O may travel from the object-side 12 to the image-side 14 via the third optical path C: object O—second object-side outward-positioned half-mirror 171—second object-side CR half-mirror 131—second image-side CR half-mirror 141—second image-side outward-positioned half-mirror 181—image I. That is, light from the object O may travel from the object-side 12 to the image-side 14 via the third optical path C: object O—transmittance through second object-side outward-positioned half-mirror 171—transmittance through second object-side CR half-mirror 131—transmittance through second image-side CR half-mirror 141—transmittance through second image-side outward-positioned half-mirror 181—image I.

In combination, i.e., light 1 on the first side (+X direction) and the second side (−X direction) of the reference optical axis 16 from the object O on the object-side 12 of the cloaking assembly 10 propagates to the image-side 14 via the first optical paths A: object O—reflection from the outward facing reflection surfaces 112, 132 (FIG. 1A) of the first and second object-side CR reflection boundaries 110, 130, respectively—reflection from the first and second object-side outward-positioned half-mirrors 151, 171—reflection from the first and second object-side CR half-mirrors 111, 131—reflection from the first and second object-side inward-positioned half-mirrors 158, 178—reflection from the first and second image-side inward-positioned half-mirrors 168, 188—reflection from the first and second image-side CR half-mirrors 121, 141—reflection from the first and second image-side outward-positioned half-mirrors 161, 181—reflection from the outward facing reflection surfaces 122, 142 (FIG. 1A) of the first and second image-side CR reflection boundaries 120, 140, respectively—image I. Light 1' on the first side (+X direction) and the second side (−X direction) of the reference optical axis 16 from the object O on the object-side 12 of the cloaking assembly 10 propagates to the image-side 14 via the second optical paths B: object O—reflection from the outward facing reflection surfaces 112, 132 of the first and second object-side CR reflection boundaries 110, 130, respectively—reflection from the first and second object-side outward-positioned half-mirrors 151, 171—transmittance through the first and second object-side half-wave plates 156, 176—transmittance through the first and second object-side inward-positioned half-mirrors 158, 178—transmittance through the first and second image-side inward-positioned half-mirrors 168, 188—transmittance through the first and second image-side half-wave plates 166, 186—reflection from the first and second image-side outward-positioned half-mirrors 161, 181—reflection from the outward facing reflection surfaces 122, 142 of the first and second image-side CR reflection boundaries 120, 140, respectively—image I. Light 1" on the first side (+X direction) and the second side (−X direction) of the reference optical axis 16 from the object O on the object-side 12 of the cloaking assembly 10 propagates to the image-side 14 via the third optical paths C: object O—transmittance through the first and second object-side outward-positioned half-mirrors 151, 171—transmittance through the first and second object-side CR half-mirrors 111, 131—transmittance through the first and second image-side CR half-mirrors 121, 141—transmittance through the first and second image-side outward-positioned half-mirrors 161, 181—image I.

While FIGS. 1A and 1B depict the CR reflection boundaries 110, 120, 130, 140, outward-positioned half-mirrors 151, 161, 171, 181, inward-positioned half-mirrors 158, 168, 178, 188, and half-wave plates 156, 166, 176, 186 as stand-alone components, it should be understood that the CR reflection boundaries 110, 120, 130, 140, outward-positioned half-mirrors 151, 161, 171, 181, inward-positioned half-mirrors 158, 168, 178, 188 and half-wave plates 156, 166, 176, 186 may be provided as a single unit or a plurality of assembled units. For example, the optical component sub-assemblies 150, 160, 170, 180 may be formed from a plurality of prisms that comprise the CR reflection boundaries 110, 120, 130, 140, outward-positioned half-mirrors 151, 161, 171, 181, inward-positioned half-mirrors 158, 168, 178, 188 and half-wave plates 156, 166, 176, 186. It should also be understood that the cloaking assembly 10 may cloak an object within the cloaked region CR including only the first object-side and image-side CR reflection boundaries 110, 120, the first object-side and image-side outward-positioned half-mirrors 151, 161, the first object-side and image-side half-wave plates 156, 166 and the first object-side and image-side inward-positioned half-mirrors 158, 168. That is, an object positioned on the first side (+X direction) of the reference optical axis 16 within the cloaked region CR would be cloaked by the first object-side and image-side CR reflection boundaries 110, 120, the first object-side and image-side outward-positioned half-mirrors 151, 161, the first object-side and image-side half-wave plates 156, 166 and the first object-side and image-side inward-positioned half-mirrors 158, 168. In the alternative, an object positioned on the second side (−X direction) of the reference optical axis 16 within the cloaked region CR would be cloaked by the second object-side and image-side CR reflection boundaries 130, 140, the second object-side and image-side outward-positioned half-mirrors 171, 181, the second object-side and image-side half-wave plates 176, 186 and the second object-side and image-side inward-positioned half-mirrors 178, 188.

Figure 2A:
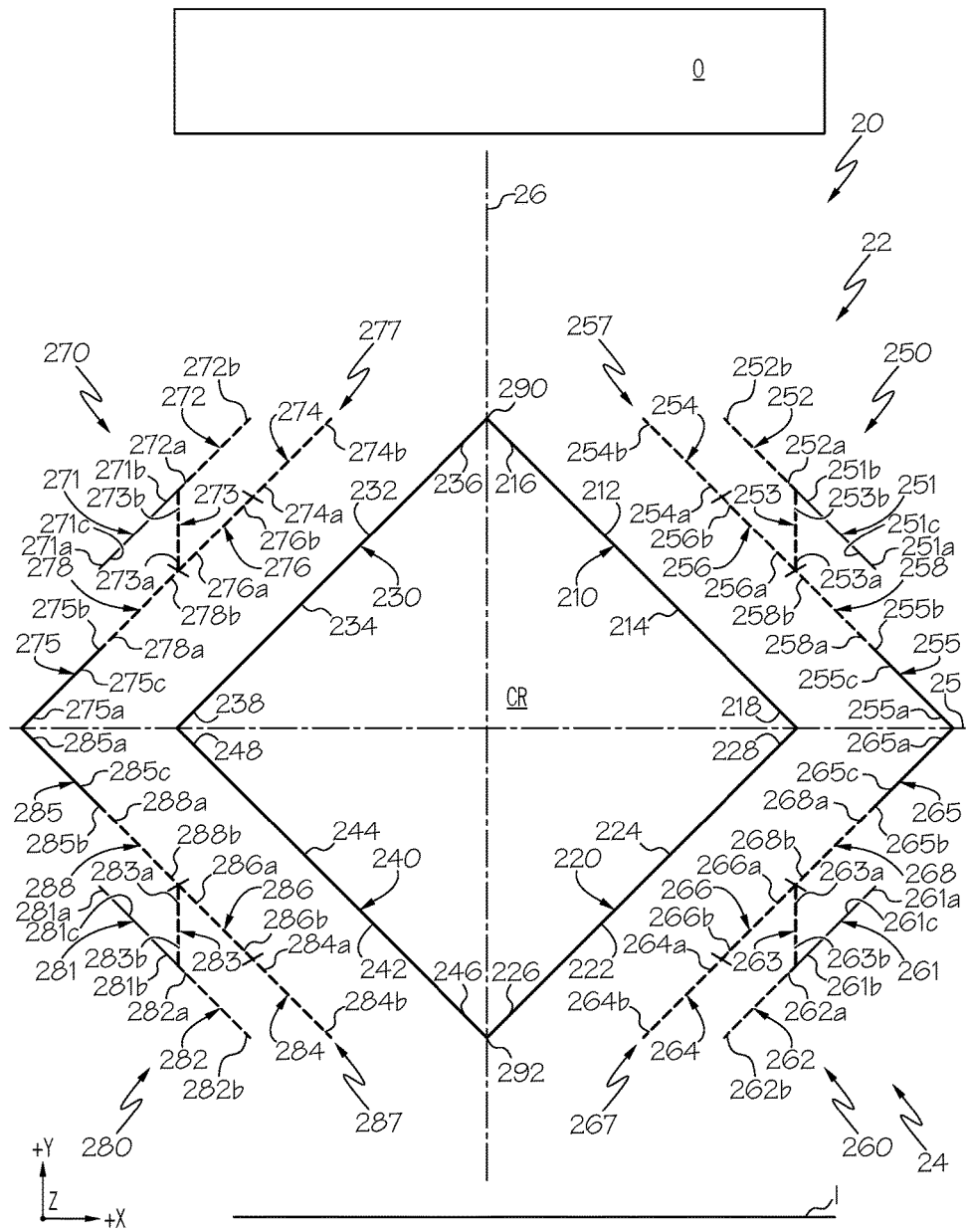
FIG. 2A schematically depicts a top view of a cloaking assembly according to one or more embodiments described and illustrated herein.

Referring now to FIG. 2A, an embodiment of a cloaking assembly 20 with external reflection boundaries co-planar with the outward-positioned and inward positioned half-mirrors, and half-wave plates positioned parallel with a reference optical axis of the cloaking assembly 20, is depicted. The cloaking assembly 20 includes an object-side 22, an image-side 24, and four CR reflection boundaries 210, 220, 230, 240. In embodiments, the four CR reflection boundaries 210, 220, 230, 240 are planar. In other embodiments, the four CR reflection boundaries 210, 220, 230, 240 are not planar. The object-side 22 is positioned above (+Y direction) a bisecting axis 25 and the image-side 24 is positioned below (−Y direction) the bisecting axis 25. That is, the bisecting axis 25 extends between and delineates the object-side 22 and the image-side 24. Also, each of the four CR reflection boundaries 210, 220, 230, 240 has a height along the Z-axis shown in the figures. That is, the Z-axis shown in the figures extends along a height of the four CR reflection boundaries 210, 220, 230, 240.

The two CR reflection boundaries 210, 230 may be positioned on the object-side 22 of the cloaking assembly 20 to face an object 'O' and may be referred to herein as object-side CR reflection boundaries 210, 230. Also, the object-side CR reflection boundary 210 is positioned on a first side (+X direction) of the reference optical axis 26 and may be referred to herein as a first object-side CR reflection boundary 210. The object-side CR reflection boundary 230 is positioned on a second side (−X direction) of the reference optical axis 26 opposite the first side and may be referred to herein as a second object-side CR reflection boundary 230. The two CR reflection boundaries 220, 240 may be positioned on the image-side 24 of the cloaking assembly 20 to provide an image 'I' formed by the cloaking assembly 20 and may be referred to herein as image-side CR reflection boundaries 220, 240. The image-side CR reflection boundary 220 is positioned on the first side (+X direction) of the reference optical axis 26 and may be referred to herein as a first image-side CR reflection boundary 220. The image-side CR reflection boundary 240 is positioned on the second side (−X direction) of the reference optical axis 26 opposite the first side and may be referred to herein as a second image-side CR reflection boundary 240.

In some embodiments, the two object-side CR reflection boundaries 210, 230 and the two image-side CR reflection boundaries 220, 240 may be oriented at an acute angle (e.g., 45°) relative to the bisecting axis 25 and the reference optical axis 26. In such embodiments, the two image-side CR reflection boundaries 220, 240 may be oriented relative to the bisecting axis 25 and the reference optical axis 26 at the same acute angle as the two object-side CR reflection boundaries 210, 230, respectively. For example, the two image-side CR reflection boundaries 220, 240 may be symmetrical to the two object-side CR reflection boundaries 210, 230 (i.e., form a mirror image) about the bisecting optical axis 25. Alternatively or additionally, the second object-side and the second image-side CR reflection boundaries 230, 240 and the second object-side may be symmetrical to the first object-side and the first image-side CR reflection boundaries 210, 220 (i.e., form a mirror image) about the reference optical axis 26.

The CR reflection boundaries 210, 220, 230, 240 each have an outward facing reflection surface 212, 222, 232, 242 and an inward facing surface 214, 224, 234, 244, respectively. In embodiments, one or more of the inward facing surfaces 214, 224, 234, 244 may be an opaque surface thereby preventing light from within the cloaked region CR from propagating through one or more of the CR reflection boundaries 210, 220, 230, 240, respectively. The outward facing reflection surfaces 212, 222, 232, 242 can be made from omnidirectional photonic crystals or mirrors such that light incident on the outward facing reflection surfaces 212, 222, 232, 242 is reflected there from. In the alternative, one or more of the outward facing reflection surfaces 212, 222, 232, 242 may be a reflection surface of a prism, e.g., a right angle prism, that totally internally reflects light incident on the surface.

The CR reflection boundaries 210, 220, 230, 240 may each have a distal end 216, 226, 236, 246 and a proximal end 218, 228, 238, 248, respectively. The proximal ends 218, 228, 238, 248 are spaced apart from the distal ends 216, 226, 236, 246, respectively, and the CR reflection boundaries 210, 220, 230, 240 extend between distal ends 216, 226, 236, 246 and proximal ends 218, 228, 238, 248, respectively. In embodiments, the distal ends 216, 236 of the two object-side CR reflection boundaries 210, 230, respectively, meet or intersect at an apex 290. Alternatively or additionally, the distal ends 226, 246 of the two image-side CR reflection boundaries 220, 240, respectively, meet or intersect at an apex 292. In such embodiments, the reference optical axis 26 bisects the apex 290 and the apex 292, and may be a centerline between a first side (+X direction) and a second side (−X direction) of the cloaking assembly 20. In other embodiments, the distal ends 216, 236 of the two object-side CR reflection boundaries 210, 230, respectively, are spaced apart from each other and/or the distal ends 226, 246 of the two image-side CR reflection boundaries 220, 240, respectively, are spaced apart from each other such that a uncloaked region or gap (not shown) is present between the spaced apart distal ends 216, 236 and/or spaced apart distal ends 226, 246. In such embodiments, an image of the portion of the object O positioned above (+Y direction) the uncloaked region is not provided on the image-side 24 of the cloaking assembly 20. Also, in embodiments, the proximal ends 218, 238 of the object-side CR reflection boundaries 210, 230, respectively, may be positioned adjacent to and may be joined to proximal ends 228, 248 of the image-side CR reflection boundaries 220, 240, respectively, as depicted in FIG. 2A. In other embodiments, the proximal ends 218, 238 may be spaced apart (Y direction) from the proximal ends 228, 248 (not shown).

In embodiments, the two object-side CR reflection boundaries 210, 230 and the two image-side CR reflection boundaries 220, 240 form the cloaked region CR that is bound at least partly by the inward facing surfaces 214, 224, 234, 244 of the four CR reflection boundaries 210, 230, 220, 240, respectively. The two object-side CR reflection boundaries 210, 230 and the two image-side CR reflection boundaries 220, 240 have a height 'h' (FIG. 7) in the Z-direction of the coordinate axes in the figures. Accordingly, an article located within the cloaked region CR (e.g., a cloaked article) is not visible to an observer viewing the cloaking assembly 20 from the image-side 24 in the +Y direction.

Still referring to FIG. 2A, the cloaking assembly 20 may include four optical component sub-assemblies 250, 260, 270, 280. In embodiments, four optical component sub-assemblies 250, 260, 270, 280 are spaced apart from each of the CR reflection boundaries 210, 220, 230, 240, respectively, and may include four outward-positioned half-mirrors 252, 262, 272, 282, four inward-positioned half-mirrors 257, 267, 277, 287, and four half-wave plates 253, 263, 273, 283, respectively.

The four outward-positioned half-mirrors 252, 262, 272, 282 are oriented generally parallel (+/−2°) to and spaced apart from the four CR reflection boundaries 210, 220, 230, 240, respectively. The four inward-positioned half-mirrors 257, 267, 277, 287, are oriented generally parallel (+/−2°) to and spaced apart from the four outward-positioned half-mirrors 252, 262, 272, 282, respectively. In some embodiments, the four inward-positioned half-mirrors 257, 267, 277, 287 are positioned between the four outward-positioned half-mirrors 252, 262, 272, 282 and the four CR reflection boundaries 210, 220, 230, 240, respectively. The four half-wave plates 253, 263, 273, 283 are oriented generally parallel (+/−2°) to the reference optical axis 26. In some embodiments, four half-wave plates 253, 263, 273, 283 extend between the four outward-positioned half-mirrors 252, 262, 272, 282 and the four inward-positioned half-mirrors 257, 267, 277, 287, respectively, as depicted in FIG. 2A.

In embodiments, one or more of the four optical component sub-assemblies 250, 260, 270, 280 comprise an outward-positioned reflection boundary 251, 261, 271, 281, respectively, co-planar with one or more of the outward-positioned half-mirrors 252, 262, 272, 282, respectively. In such embodiments, the outward-positioned half-mirrors 252, 262, 272, 282 may include proximal ends 252a, 262a, 272a, 282a and distal ends 252b, 262b, 272b, 282b, respectively, and the outward-positioned reflection boundaries 251, 261, 271, 281 may include proximal ends 251a, 261a, 271a, 281a, distal ends 251b, 261b, 271b, 281b, and inward facing reflection surfaces 251c, 261c, 271c, 281c, respectively. The proximal ends 252a, 262a, 272a, 282a are spaced apart from the distal ends 252b, 262b, 272b, 282b, respectively, and the outward-positioned half-mirrors 252, 262, 272, 282 extend between proximal ends 252a, 262a, 272a, 282a and distal ends 252b, 262b, 272b, 282b, respectively. Also, the proximal ends 251a, 261a, 271a, 281a are spaced apart from the distal ends 251b, 261b, 271b, 281b and the outward-positioned reflection boundaries 251, 261, 271, 281 extend between proximal ends 251a, 261a, 271a, 281a and distal ends 251b, 261b, 271b, 281b, respectively. The distal ends 251b, 261b, 271b, 281b of the outward-positioned reflection boundaries 251, 261, 271, 281, respectively may be directly in contact with the proximal ends 252a, 262a, 272a, 282a of the outward-positioned half-mirrors 252, 262, 272, 282, respectively. In some embodiments, the distal ends 251b, 261b, 271b, 281b of the outward-positioned reflection boundaries 251, 261, 271, 281, respectively may be attached to the proximal ends 252a, 262a, 272a, 282a of the outward-positioned half-mirrors 252, 262, 272, 282, respectively.

In some embodiments, one or more of the inward-positioned half-mirrors 257, 267, 277, 287 comprise a first portion 254, 264, 274, 284, a second portion 256, 266, 276, 286, and a third portion 258, 268, 278, 288, respectively. For example, the first portions 254, 264, 274, 284 may be in the form of a first set of four wire-grid polarizer—cube beamsplitters (not shown), the second portions 256, 266, 276, 286 may be in the form of a second set of four wire-grid polarizer—cube beamsplitters (not shown) and/or the third portions 258, 268, 278, 288 may be in the form of a third set of four wire-grid polarizer—cube beamsplitters (not shown). In such embodiments, the first portions 254, 264, 274, 284 may include proximal ends 254a, 264a, 274a, 284a and distal ends 254b, 264b, 274b, 284b, respectively. The proximal ends 254a, 264a, 274a, 284a are spaced apart from the distal ends 254b, 264b, 274b, 284b, respectively, and the first portions 254, 264, 274, 284 extend between the proximal ends 254a, 264a, 274a, 284a and the distal ends 254b, 264b, 274b, 284b, respectively. The second portions 256, 266, 276, 286 may include proximal ends 256a, 266a, 276a, 286a and distal ends 256b, 266b, 276b, 286b, respectively. The proximal ends 256a, 266a, 276a, 286a are spaced apart from the distal ends 256b, 266b, 276b, 286b, respectively, and the second portions 256, 266, 276, 286 extend between the proximal ends 256a, 266a, 276a, 286a and the distal ends 256b, 266b, 276b, 286b, respectively. The third portions 258, 268, 278, 288 may include proximal ends 258a, 268a, 278a, 288a and distal ends 258b, 268b, 278b, 288b, respectively. The proximal ends 258a, 268a, 278a, 288a are spaced apart from the distal ends 258b, 268b, 278b, 288b, respectively, and the third portions 258, 268, 278, 288 extend between the proximal ends 258a, 268a, 278a, 288a and the distal ends 258b, 268b, 278b, 288b, respectively. In embodiments, the proximal ends 254a, 264a, 274a, 284a of the first portions 254, 264, 274, 284, respectively, may be directly in contact with the distal ends 256b, 266b, 276b, 286b of the second portions 256, 266, 276, 286, respectively. In such embodiments, the proximal ends 254a, 264a, 274a, 284a of the first portions 254, 264, 274, 284, respectively, may be attached to the distal ends 256b, 266b, 276b, 286b of the second portions 256, 266, 276, 286, respectively. In embodiments, the proximal ends 256a, 266a, 276a, 286a of the second portions 256, 266, 276, 286, respectively, are directly in contact with the distal ends 258b, 268b, 278b, 288b of the third portions 258, 268, 278, 288, respectively. In such embodiments, the proximal ends 256a, 266a, 276a, 286a of the second portions 256, 266, 276, 286, respectively, may be attached to the distal ends 258b, 268b, 278b, 288b of the third portions 258, 268, 278, 288, respectively. In embodiments, the proximal ends 258a, 268a, 278a, 288a of the third portions 258, 268, 278, 288 are directly in contact with the distal ends 255b, 265b, 275b, 285b of the inward-positioned reflection boundaries 255, 265, 275, 285, respectively. In such embodiments, the proximal ends 258a, 268a, 278a, 288a of the third portions 258, 268, 278, 288 may be attached to the distal ends 255b, 265b, 275b, 285b of the inward-positioned reflection boundaries 255, 265, 275, 285, respectively.

In some embodiments, one or more of the inward-positioned half-mirrors 257, 267, 277, 287 are not formed from a first portion, a second portion and/or a third portion. That is, one or more of the inward-positioned half-mirrors 257, 267, 277, 287 are formed as a single half-mirror. In such embodiments, the inward-positioned half-mirrors 257, 267, 277, 287 include proximal ends 258a, 268a, 278a, 288a and distal ends 254b, 264b, 274b, 284b, respectively. The proximal ends 258a, 268a, 278a, 288a are spaced apart from the distal ends 254b, 264b, 274b, 284b, respectively, and the inward-positioned half-mirrors 257, 267, 277, 287 extend between the proximal ends 258a, 268a, 278a, 288a and the distal ends 254b, 264b, 274b, 284b, respectively. It should be understood that discussion of the inward-positioned half-mirrors 257, 267, 277, 287 herein may include embodiments with the first portions 254, 264, 274, 284, second portions 256, 266, 276, 286 and third portions 258, 268, 278, 288 unless stated otherwise.

In some embodiments, one or more of the four optical component sub-assemblies 250, 260, 270, 280 comprise an inward-positioned reflection boundary 255, 265, 275, 285 co-planar with one or more of the inward-positioned half-mirrors 257, 267, 277, 287, respectively. In such embodiments, the inward-positioned reflection boundaries 255, 265, 275, 285 may include proximal ends 255a, 265a, 275a, 285a, distal ends 255b, 265b, 275b, 285b, and inward facing reflection surfaces 255c, 265c, 275c, 285c, respectively. The proximal ends 255a, 265a, 275a, 285a are spaced apart from the distal ends 255b, 265b, 275b, 285b, respectively, and the inward-positioned reflection boundaries 255, 265, 275, 285 extend between proximal ends 255a, 265a, 275a, 285a and distal ends 255b, 265b, 275b, 285b, respectively. In embodiments, the distal ends 255b, 265b, 275b, 285b of the inward-positioned reflection boundaries 255, 265, 275, 285, respectively, may be directly in contact with the proximal ends 258a, 268a, 278a, 288a of the inward-positioned half-mirrors 257, 267, 277, 287, respectively. In such embodiments, the distal ends 255b, 265b, 275b, 285b of the inward-positioned reflection boundaries 255, 265, 275, 285, respectively, may be attached to the proximal ends 258a, 268a, 278a, 288a of the inward-positioned half-mirrors 257, 267, 277, 287, respectively.

The four half-wave plates 253, 263, 273, 283 may include first ends 253a, 263a, 273a, 283a and second ends 253b, 263b, 273b, 283b, respectively. The first ends 253a, 263a, 273a, 283a are spaced apart from the second ends 253b, 263b, 273b, 283b, respectively, and the four half-wave plates 253, 263, 273, 283 extend between the first ends 253a, 263a, 273a, 283a and the second ends 253b, 263b, 273b, 283b, respectively. As noted above, the four half-wave plates 253, 263, 273, 283 may extend between the outward-positioned half-mirrors 252, 262, 272, 282 and the inward-positioned half-mirrors 257, 267, 277, 287, respectively. For example, the four half-wave plates 253, 263, 273, 283 may extend between the proximal ends 252a, 262a, 272a, 282a of the outward-positioned half-mirrors 252, 262, 272, 282, respectively, and the proximal ends 256a, 266a, 276a, 286a of the second portions 256, 266, 276, 286 of the inward-positioned half-mirrors 257, 267, 277, 287, respectively. In embodiments, the first ends 253a, 263a, 273a, 283a of the four half-wave plates 253, 263, 273, 283, respectively, are directly in contact with the proximal ends 256a, 266a, 276a, 286a of the second portions 256, 266, 276, 286 of the inward-positioned half-mirrors 257, 267, 277, 287, respectively, and the second ends 253b, 263b, 273b, 283b are directly in contact with the proximal ends 252a, 262a, 272a, 282a of the outward-positioned half-mirrors 252, 262, 272, 282, respectively. In such embodiments, the first ends 253a, 263a, 273a, 283a of the four half-wave plates 253, 263, 273, 283, respectively, may be attached to the proximal ends 256a, 266a, 276a, 286a of the second portions 256, 266, 276, 286 of the inward-positioned half-mirrors 257, 267, 277, 287, respectively, and the second ends 253b, 263b, 273b, 283b may be attached to the proximal ends 252a, 262a, 272a, 282a of the outward-positioned half-mirrors 252, 262, 272, 282, respectively.

Each of the outward-positioned half-mirrors 252, 262, 272, 282, each of the outward-positioned reflection boundaries 251, 261, 271, 281, each of the inward-positioned half-mirrors 257, 267, 277, 287, and each of the half-wave plates 253, 263, 273, 283 has a height along the Z-axis shown in the figures. The two outward-positioned half-mirrors 252, 272 and the two outward-positioned reflection boundaries 251, 271, the two half-wave plates 253, 273, the inward-positioned half-mirrors 257, 277 and the inward-positioned reflection boundaries 255, 275 may be positioned on the object-side 22 of the cloaking assembly 20. Accordingly, these components on the object-side 22 of the cloaking assembly 20 may be referred to herein as object-side outward-positioned half-mirrors 252, 272, object-side outward-positioned reflection boundaries 251, 271, object-side half-wave plates 253, 273, object-side inward-positioned half-mirrors 257, 277 and object-side inward-positioned reflection boundaries 255, 275.

The object-side outward-positioned half-mirror 252, the object-side outward-positioned reflection boundary 251, the object-side half-wave plate 253, the object-side inward-positioned half-mirror 257, and the object-side inward-positioned reflection boundary 255 are positioned on the first side (+X direction) of the reference optical axis 26. Accordingly, these components on the first side (+X direction) of the reference optical axis 26 may be referred to herein as a first object-side outward-positioned half-mirror 252, a first object-side outward-positioned reflection boundary 251, a first object-side half-wave plate 253, a first object-side inward-positioned half-mirror 257, and a first object-side inward-positioned reflection boundary 255. The object-side outward-positioned half-mirror 272, the object-side outward-positioned reflection boundary 271, the object-side half-wave plate 273, the object-side inward-positioned half-mirror 277, and the object-side inward-positioned reflection boundary 275 are positioned on the second side (−X direction) of the reference optical axis 26. Accordingly, these components on the second side (−X direction) of the reference optical axis 26 may be referred to herein as a second object-side outward-positioned half-mirror 272, a second object-side outward-positioned reflection boundary 271, a second object-side half-wave plate 273, a second object-side inward-positioned half-mirror 277, and a second object-side inward-positioned reflection boundary 275.

The two outward-positioned half-mirrors 262, 282, the two outward-positioned reflection boundaries 261, 281, the two half-wave plates 263, 283, the inward-positioned half-mirrors 267, 287 and the inward-positioned reflection boundaries 265, 285 may be positioned on the image-side 24 of the cloaking assembly 20. Accordingly, these components on the image-side 24 of the cloaking assembly 20 may be referred to herein as image-side outward-positioned half-mirrors 262, 282, image-side outward-positioned reflection boundaries 261, 281, image-side half-wave plates 263, 283, image-side inward-positioned half-mirrors 267, 287 and image-side inward-positioned reflection boundaries 265, 285.

The image-side outward-positioned half-mirror 262, the image-side outward-positioned reflection boundary 261, the image-side half-wave plate 263, the image-side inward-positioned half-mirror 267, and the image-side inward-positioned reflection boundary 265 are positioned on the first side (+X direction) of the reference optical axis 26. Accordingly, these components on the first side (+X direction) of the reference optical axis 26 may be referred to herein as a first image-side outward-positioned half-mirror 262, a first image-side outward-positioned reflection boundary 261, a first image-side half-wave plate 263, a first image-side inward-positioned half-mirror 267, and a first image-side inward-positioned reflection boundary 265. The image-side outward-positioned half-mirror 282, the image-side outward-positioned reflection boundary 281, the image-side half-wave plate 283, the image-side inward-positioned half-mirror 287, and the image-side inward-positioned reflection boundary 285 are positioned on the second side (−X direction) of the reference optical axis 26. Accordingly, these components on the second side (−X direction) of the reference optical axis 26 may be referred to herein as a second image-side outward-positioned half-mirror 282, a second image-side outward-positioned reflection boundary 281, a second image-side half-wave plate 283, a second image-side inward-positioned half-mirror 287, and a second image-side inward-positioned reflection boundary 285.

The outward-positioned half-mirrors 252, 262, 272, 282 and the inward-positioned half-mirrors 257, 267, 277, 287, including embodiments with the first portions 254, 264, 274, 284, second portions 256, 266, 276, 286, and third portions 258, 268, 278, 288, reflect a specific mode of visible light. Specifically, each outward-positioned half-mirrors 252, 262, 272, 282 and each of the inward-positioned half-mirrors 257, 267, 277, 287 may be an s-polarizer half-mirror or a p-polarizer half-mirror. The outward-positioned half-mirrors 252, 262, 272, 282 and the inward-positioned half-mirrors 257, 267, 277, 287 may be in the form of a diffraction grating or thin film polarizer. In embodiments, the outward-positioned half-mirrors 252, 262, 272, 282 and the inward-positioned half-mirrors 257, 267, 277, 287 are all p-polarizer half-mirrors or all s-polarizer half-mirrors. In other embodiments, the first side (+X direction) half-mirrors, i.e., the outward-positioned half-mirrors 252, 262, and the inward-positioned half-mirrors 257, 267 are p-polarizer half-mirrors and the second side (−X direction) half-mirrors, i.e., the outward-positioned half-mirrors 272, 282, and the inward-positioned half-mirrors 277, 287 are s-polarizer half-mirrors. In still other embodiments, the first side (+X direction) half-mirrors, i.e., the outward-positioned half-mirrors 252, 262, and the inward-positioned half-mirrors 257, 267 are s-polarizer half-mirrors and the second side (−X direction) half-mirrors, i.e., the outward-positioned half-mirrors 272, 282, and the inward-positioned half-mirrors 277, 287 are p-polarizer half-mirrors.

Figure 2B:
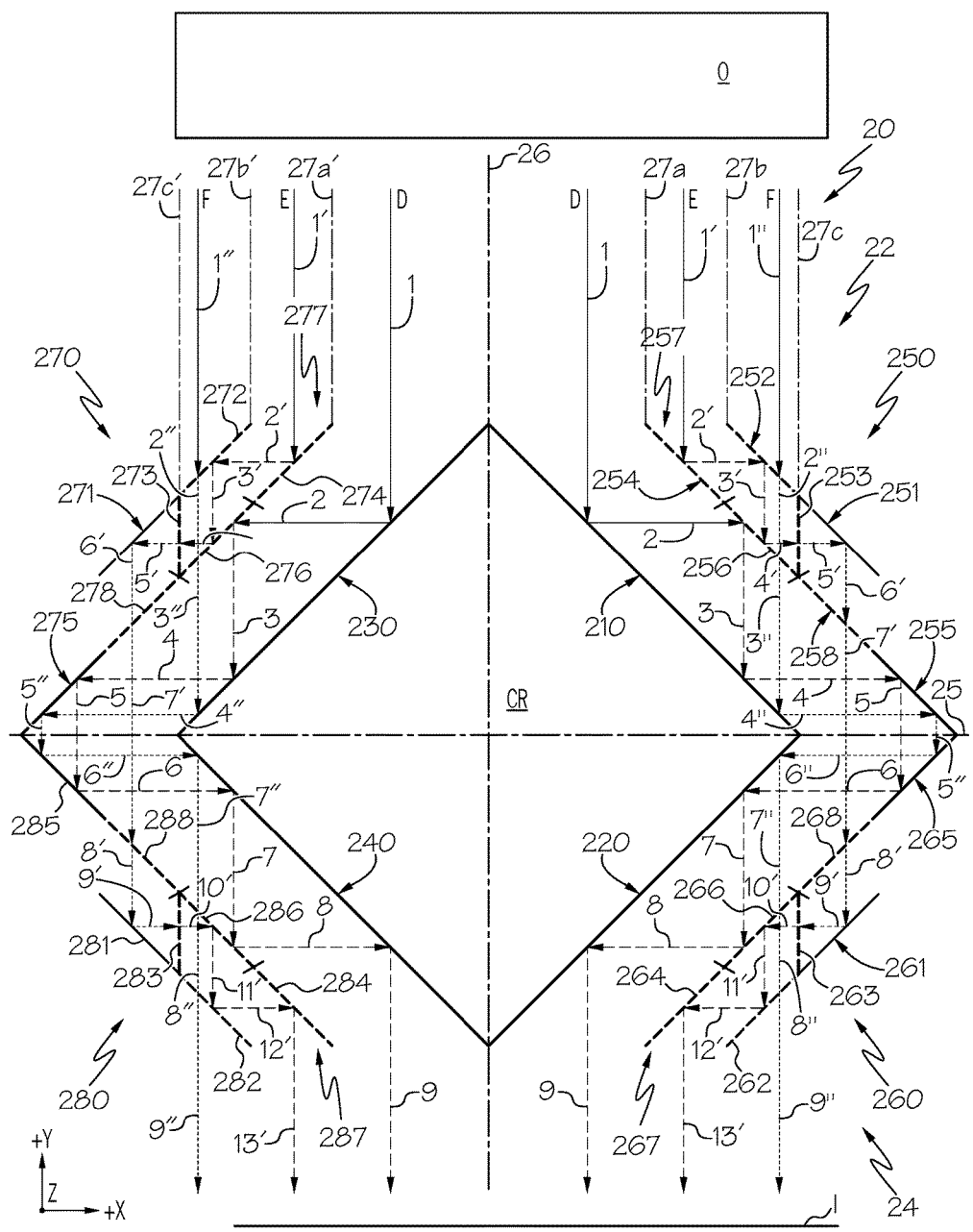
FIG. 2B schematically depicts a top view of the cloaking assembly of FIG. 2A with light propagating from an object on an object-side of the cloaking assembly to form an image on an image-side of the cloaking assembly via three optical paths.

Referring now to FIGS. 2A and 2B, the cloaking assembly 20 includes three optical paths for light from an object 'O' positioned on the object-side 22 to be redirected around the cloaked region CR to from an image 'I' on the image-side 24 on the first side (+X direction) of the reference optical axis 26. The cloaking assembly 20 may also include three optical paths for light from an object 'O' positioned on the object-side 22 to be redirected around the cloaked region CR to from an image 'I' on the image-side 24 on the second side (−X direction) of the reference optical axis 26. Regarding the three optical paths on the first side (+X direction) of the reference optical axis 26, light from the object O incident on the cloaking assembly 20 between the reference optical axis 26 and a first optical path transition axis 27a propagates via an optical path 'D'. Light from the object O incident on the cloaking assembly 20 between the first optical path transition axis 27a and a second optical path transition axis 27b propagates via an optical path 'E'. Light from the object O incident on the cloaking assembly 20 between the second optical path transition axis 27b and a third optical path transition axis 27c propagates via an optical path 'F'.

The first optical path transition axis 27a extends parallel to the Y-axis in the figures from distal end 254b (FIG. 2A) of the first object-side inward-positioned half-mirror 257 to the object O. Accordingly, light propagating via the first optical path D is incident on the first object-side CR reflection boundary 210 as depicted in FIG. 2B. The second optical path transition axis 27b extends parallel to the Y-axis from the distal end 252b (FIG. 2A) of the first object-side outward-positioned half-mirror 252 to object O. Accordingly, light propagating via the second optical path E is incident on the first object-side inward-positioned half-mirror 257 as depicted in FIG. 2B. The third optical path transition axis 27c extends parallel to the Y-axis from the proximal end 252a (FIG. 2A) of the first object-side outward-positioned half-mirror 252 to the object O. Accordingly, light propagating via the third optical path F is incident on the first object-side outward-positioned half-mirror 252 as depicted in FIG. 2B.

Regarding the first optical path D on the first side (+X direction) of the reference optical axis 26, light from the object O positioned above (+Y direction) the cloaking assembly 20 between the reference optical axis 26 and the first optical path transition axis 27a is incident on the first object-side CR reflection boundary 210 (shown as arrow '1' in FIG. 2B). The first object-side CR reflection boundary 210 is positioned relative to the first object-side inward-positioned half-mirror 257 such that light 1 from the object O is reflected by the outward facing reflection surface 212 (FIG. 2A) of the first object-side CR reflection boundary 210 onto the first object-side inward-positioned half-mirror 257 as light 2. A non-limiting example of the first object-side inward-positioned half-mirror 257 in the form of a p-polarization half-mirror is depicted in FIG. 2B. Accordingly, s-polarized light (shown as a dashed line in the figures) is reflected from the first object-side inward-positioned half-mirror 257 as s-polarized light 3. The first object-side inward-positioned half-mirror 257 is positioned relative to the first object-side CR reflection boundary 210 such that s-polarized light 3 is reflected by the first object-side inward-positioned half-mirror 257 onto the first object-side CR reflection boundary 210 where it is reflect by the outward facing reflection surface 212 as s-polarized light 4. The first object-side CR reflection boundary 210 is positioned relative to the first object-side inward-positioned reflection boundary 255 such that s-polarized light 4 is reflected by the outward facing reflection surface 212 of the first object-side CR reflection boundary 210 onto the inward facing reflection surface 255c (FIG. 2A) of the first object-side inward-positioned reflection boundary 255 where it is reflected as s-polarized light 5. The first object-side inward-positioned reflection boundary 255 is positioned relative to the first image-side inward-positioned reflection boundary 265 such that s-polarized light 5 is reflected by the inward facing reflection surface 255c of the first object-side inward-positioned reflection boundary 255 onto the inward facing reflection surface 265c (FIG. 2A) of the first image-side inward-reflection boundary 265 where it is reflected as s-polarized light 6. The first image-side inward-positioned reflection boundary 265 is positioned relative to the first image-side CR reflection boundary 220 such that s-polarized light 6 is reflected by the first image-side inward-positioned reflection boundary 265 onto the first image-side CR reflection boundary 220 where it is reflected by the outward facing reflection surface 222 (FIG. 2A) as s-polarized light 7. The first image-side CR reflection boundary 220 is positioned relative to the first image-side inward-positioned half-mirror 267 such that s-polarized light 7 is reflected by the outward facing reflection surface 222 of the first image-side CR reflection boundary 220 onto the first image-side inward-positioned half-mirror 267 where it is reflected as s-polarized light 8. The first image-side inward-positioned half-mirror 267 is positioned relative to the first image-side CR reflection boundary 220 such that s-polarized light 8 is reflected by the first image-side inward-positioned half-mirror 267 onto the outward facing reflection surface 222 of the first image-side CR reflection boundary 220 where it is reflected as s-polarized light 9. S-polarized light 9 is reflected by the outward facing reflection surface 222 generally parallel to light 1 and forms a portion of an image I on the image-side 24 of the cloaking assembly 20.

Accordingly, light from the object O may travel from the object-side 22 to the image-side 24 via the first optical path D: object O—first object-side CR reflection boundary 210—first object-side inward-positioned half-mirror 257—first object-side CR reflection boundary 210—first object-side inward-positioned reflection boundary 255—first image-side inward-positioned reflection boundary 265—first image-side CR reflection boundary 220—first image-side inward-positioned half-mirror 267—first image-side CR reflection boundary 220—image I. That is, light from the object O may travel from the object-side 22 to the image-side 24 via the first optical path D: object O—reflection from first object-side CR reflection boundary 210—reflection from first object-side inward-positioned half-mirror 257—reflection from first object-side CR reflection boundary 210—reflection from first object-side inward-positioned reflection boundary 255—reflection from first image-side inward-positioned reflection boundary 265—reflection from first image-side CR reflection boundary 220—reflection from first image-side inward-positioned half-mirror 267—reflection from first image-side CR reflection boundary 220—image I.

Regarding the second optical path E on the first side (+X direction) of the reference optical axis 26, light from the object O positioned above (+Y direction) the cloaking assembly 20 between the first optical path transition axis 27a and the second optical path transition axis 27b is incident on the first portion 254 of the object-side inward-positioned half-mirror 257 (shown as arrow '1" in FIG. 2B). The first object-side inward-positioned half-mirror 257 is positioned relative to the first object-side outward-positioned half-mirror 252 such that light 1' is reflected by first object-side inward-positioned half-mirror 257 as s-polarized light 2' onto the first object-side outward-positioned half-mirror 252 where it is reflected as s-polarized light 3'. The first object-side outward-positioned half-mirror 252 is positioned relative to the first object-side inward-positioned half-mirror 257 such that s-polarized light 3' is reflected by the first object-side outward-positioned half-mirror 252 onto the first object-side inward-positioned half-mirror 257 where it is reflected as s-polarized light 4'. The first object-side inward-positioned half-mirror 257 is positioned relative to the first object-side half-wave plate 253 such that s-polarized light 4' is reflected by the first object-side inward-positioned half-mirror 257 onto the first object-side half-wave plate 253. S-polarized light 4' is transmitted through the first object-side half-wave plate 253 where it is shifted to p-polarized light 5'. The first object-side half-wave plate 253 is positioned relative to the first object-side outward-positioned reflection boundary 251 such that p-polarized light 5' transmitted through the first object-side half-wave plate 253 is incident on the inward facing reflection surface 251c (FIG. 2A) of the first object-side outward-positioned reflection boundary 251 where it is reflected as p-polarized light 6'.

The first object-side outward-positioned reflection boundary 251 is positioned relative to the first object-side inward-positioned half-mirror 257 such p-polarized light 6' is reflected by the inward facing reflection surface 251c onto the first object-side inward-positioned half-mirror 257. As noted above, in the embodiment depicted in FIG. 2B, the first object-side inward-positioned half-mirror 257 is a p-polarization half-mirror. Accordingly, shifting of the s-polarized light 4' into p-polarized light 5' by the first object-side half-wave plate 253 allows the p-polarized 6' to transmit (propagate) through the first object-side inward-positioned half-mirror 257 as p-polarized light 7'. The first object-side inward-positioned half-mirror 257 is positioned relative to the first image-side inward-positioned half-mirror 267 such that p-polarized light 7' transmitted through the first object-side inward-positioned half-mirror 257 is incident on the first image-side inward-positioned half-mirror 267 where it transmits through as p-polarized light 8'. The first image-side inward-positioned half-mirror 267 is positioned relative to the first image-side outward-positioned reflection boundary 261 such that p-polarized light 8' transmitted through the first image-side inward-positioned half-mirror 267 is incident on the inward facing reflection surface 261c (FIG. 2A) of the first image-side outward-positioned reflection boundary 261 where it is reflected as p-polarized light 9'. The first image-side outward-positioned reflection boundary 261 is positioned relative to the first image-side half-wave plate 263 such that p-polarized light 9' reflected from the inward facing reflection surface 261c of the first image-side outward-positioned reflection boundary 261 is incident on the first image-side half-wave plate 263. P-polarized light 9' is transmitted through the first image-side half-wave plate 263 where it is shifted to s-polarized light 10'. The first image-side half-wave plate 263 is positioned relative to the first image-side inward-positioned half-mirror 267 such that the s-polarized light 10' transmitted through the first image-side half-wave plate 263 is incident on the first image-side inward-positioned half-mirror 267 where it is reflected as s-polarized light 11'. Accordingly, shifting of the p-polarized light 9' to s-polarized light 10' allows the light path E to include reflection from the first image-side inward-positioned half-mirror 267. The first image-side inward-positioned half-mirror 267 is positioned relative to the first image-side outward-positioned half-mirror 262 such that the s-polarized light 11' is reflected by the first image-side inward-positioned half-mirror 267 onto the first image-side outward-positioned half-mirror 262 where it is reflected as s-polarized light 12'. The first image-side outward-positioned half-mirror 262 is positioned relative to the first image-side inward-positioned half-mirror 267 such that the s-polarized light 12' is reflected by the first image-side outward-positioned half-mirror 262 onto the first image-side inward-positioned half-mirror 267 where it is reflected as s-polarized light 13'. S-polarized light 13' is reflected by the first image-side inward-positioned half-mirror 267 generally parallel to light 1' and forms a portion of an image I on the image-side 24 of the cloaking assembly 20.

Accordingly, light from the object O may travel from the object-side 22 to the image-side 24 via the second optical path E: object O—first object-side inward-positioned half-mirror 257—first object-side outward-positioned half-mirror 252—first object-side inward-positioned half-mirror 257—first object-side half-wave plate 253—first object-side outward-positioned reflection boundary 251—first object-side inward-positioned half-mirror 257—first image-side inward-positioned half-mirror 267—first image-side outward-positioned reflection boundary 261—first image-side half-wave plate 263—first image-side inward-positioned half-mirror 267—first image-side outward-positioned half-mirror 262—first image-side inward-positioned half-mirror 267—Image I. That is, light from the object O may travel from the object-side 22 to the image-side 24 via the second optical path E: object O—reflection from first object-side inward-positioned half-mirror 257—reflection from first object-side outward-positioned half-mirror 252—reflection from first object-side inward-positioned half-mirror 257—transmittance through first object-side half-wave plate 253—reflection from first object-side outward-positioned reflection boundary 251—transmittance through first object-side inward-positioned half-mirror 257—transmittance through first image-side inward-positioned half-mirror 267—reflection from first image-side outward-positioned reflection boundary 261—transmittance through first image-side half-wave plate 263—reflection from first image-side inward-positioned half-mirror 267—reflection from first image-side outward-positioned half-mirror 262—reflection from first image-side inward-positioned half-mirror 267—Image I.

Regarding the third optical path F on the first side (+X direction) of the reference optical axis 26, light from the object O positioned above (+Y direction) the cloaking assembly 20 between the second optical path transition axis 27b and the third optical path transition axis 27c is incident on the first object-side outward-positioned half-mirror 252 (shown as arrow '1'''' in FIG. 2B). The p-polarized mode of light 1" is transmitted through the first object-side outward-positioned half-mirror 252 as p-polarized light 2". The first object-side outward-positioned half-mirror 252 is positioned relative to the first object-side inward-positioned half-mirror 257 such that the p-polarized light 2" transmitted through the first object-side outward-positioned half-mirror 252 is incident on the first object-side inward-positioned half-mirror 257 where it transmits through as p-polarized light 3". The first object-side inward-positioned half-mirror 257 is positioned relative to the first object-side CR reflection boundary 210 such that the p-polarized light 3" transmitted through the first object-side inward-positioned half-mirror 257 is incident on the first object-side CR reflection boundary 210 where it is reflected by the outward facing reflection surface 212 (FIG. 2A) as p-polarized light 4". The first object-side CR reflection boundary 210 is positioned relative to the first object-side inward-positioned reflection boundary 255 such that p-polarized light 4" is reflected by the outward facing reflection surface 212 onto the inward facing reflection surface 255c (FIG. 2A) of the first object-side inward-positioned reflection boundary 255 where it reflected as p-polarized light 5". The first object-side inward-positioned reflection boundary 255 is positioned relative to the first image-side inward-positioned reflection boundary 265 such that p-polarized light 5" is reflected from the inward facing reflection surface 255c onto the inward facing reflection surface 265c (FIG. 2A) of the first image-side inward-positioned reflection boundary 265 where it is reflected as p-polarized light 6". The first image-side inward-positioned reflection boundary 265 is positioned relative to the first image-side CR reflection boundary 220 such that p-polarized light 6" is reflected by the inward facing reflection surface 265c onto the outward facing reflection surface 222 (FIG. 2A) of the first image-side CR reflection boundary 220 where it is reflected as p-polarized light 7". The first image-side CR reflection boundary 220 is positioned relative to the first image-side inward-positioned half-mirror 267 such that the p-polarized light 7" reflected by the outward facing reflection surface 222 is incident on the first image-side inward-positioned half-mirror 267 where it transmits through as p-polarized light 8". The first image-side inward-positioned half-mirror 267 is positioned relative to the first image-side outward-positioned half-mirror 262 such that p-polarized light 8" transmitted through the first image-side inward-positioned half-mirror 267 is incident on the first image-side outward-positioned half-mirror 262 where it transmits through as p-polarized light 9". P-polarized light 9" is transmitted through the first image-side outward-positioned half-mirror 262 generally parallel to light 1" and forms a portion of an image I on the image-side 24 of the cloaking assembly 20.

Accordingly, light from the object O may travel from the object-side 22 to the image-side 24 via the third optical path F: object O—first object-side outward-positioned half-mirror 252—first object-side inward-positioned half-mirror 257—first object-side CR reflection boundary 210—first object-side inward-positioned reflection boundary 255—first image-side inward-positioned reflection boundary 265—first image-side CR reflection boundary 220—first image-side inward-positioned half-mirror 267—first image-side outward-positioned half-mirror 262—Image I. That is, light from the object O may travel from the object-side 22 to the image-side 24 via the third optical path F: object O—transmittance through first object-side outward-positioned half-mirror 252—transmittance through first object-side inward-positioned half-mirror 257—reflection from first object-side CR reflection boundary 210—reflection from first object-side inward-positioned reflection boundary 255—reflection from first image-side inward-positioned reflection boundary 265—reflection from first image-side CR reflection boundary 220—transmittance through first image-side inward-positioned half-mirror 267—transmittance through first image-side outward-positioned half-mirror 262—Image I.

Still referring to FIGS. 2A and 2B, and regarding the first optical path D on the second side (−X direction) of the reference optical axis 26, light from the object O positioned above (+Y direction) the cloaking assembly 20 between the reference optical axis 26 and the first optical path transition axis 27a' is incident on the second object-side CR reflection boundary 230 (shown as arrow '1' in FIG. 2B). The second object-side CR reflection boundary 230 is positioned relative to the second object-side inward-positioned half-mirror 277 such that light 1 from the object O is reflected by the outward facing reflection surface 232 (FIG. 2A) of the second object-side CR reflection boundary 230 onto the second object-side inward-positioned half-mirror 277 as light 2. A non-limiting example of the second object-side inward-positioned half-mirror 277 in the form of a p-polarization half-mirror is depicted in FIG. 2B. Accordingly, s-polarized light (shown as a dashed line in the figures) is reflected from the second object-side inward-positioned half-mirror 277 as s-polarized light 3. The second object-side inward-positioned half-mirror 277 is positioned relative to the second object-side CR reflection boundary 230 such that s-polarized light 3 is reflected by the second object-side inward-positioned half-mirror 277 onto the second object-side CR reflection boundary 230 where it is reflect by the outward facing reflection surface 232 as s-polarized light 4. The second object-side CR reflection boundary 230 is positioned relative to the second object-side inward-positioned reflection boundary 275 such that s-polarized light 4 is reflected by the outward facing reflection surface 232 of the second object-side CR reflection boundary 230 onto the inward facing reflection surface 275c (FIG. 2A) of the second object-side inward-positioned reflection boundary 275 where it is reflected as s-polarized light 5. The second object-side inward-positioned reflection boundary 275 is positioned relative to the second image-side inward-positioned reflection boundary 285 such that s-polarized light 5 is reflected by the inward facing reflection surface 275c of the second object-side inward-positioned reflection boundary 275 onto the inward facing reflection surface 285c (FIG. 2A) of the second image-side inward-positioned reflection boundary 285 where it is reflected as s-polarized light 6. The second image-side inward-positioned reflection boundary 285 is positioned relative to the second image-side CR reflection boundary 240 such that s-polarized light 6 is reflected by the second image-side inward-positioned reflection boundary 285 onto the second image-side CR reflection boundary 240 where it is reflected by the outward facing reflection surface 242 (FIG. 2A) as s-polarized light 7. The second image-side CR reflection boundary 240 is positioned relative to the second image-side inward-positioned half-mirror 287 such that s-polarized light 7 is reflected by the outward facing reflection surface 242 of the second image-side CR reflection boundary 240 onto the second image-side inward-positioned half-mirror 287 where it is reflected as s-polarized light 8. The second image-side inward-positioned half-mirror 287 is positioned relative to the second image-side CR reflection boundary 240 such that s-polarized light 8 is reflected by the second image-side inward-positioned half-mirror 287 onto the outward facing reflection surface 242 of the second image-side CR reflection boundary 240 where it is reflected as s-polarized light 9. S-polarized light 9 is reflected by the outward facing reflection surface 242 generally parallel to light 1 and forms a portion of an image I on the image-side 24 of the cloaking assembly 20.

Accordingly, light from the object O may travel from the object-side 22 to the image-side 24 via the first optical path D: object O—second object-side CR reflection boundary 230—second object-side inward-positioned half-mirror 277—second object-side CR reflection boundary 230—second object-side inward-positioned reflection boundary 275—second image-side inward-positioned reflection boundary 285—second image-side CR reflection boundary 240—second image-side inward-positioned half-mirror 287—second image-side CR reflection boundary 240—image I. That is, light from the object O may travel to the image-side 24 via the first optical path D: object O—reflection from second object-side CR reflection boundary 230—reflection from second object-side inward-positioned half-mirror 277—reflection from second object-side CR reflection boundary 230—reflection from second object-side inward-positioned reflection boundary 275—reflection from second image-side inward-positioned reflection boundary 285—reflection from second image-side CR reflection boundary 240—reflection from second image-side inward-positioned half-mirror 287—reflection from second image-side CR reflection boundary 240—image I.

Regarding the second optical path E on the second side (−X direction) of the reference optical axis 26, light from the object O positioned above (+Y direction) the cloaking assembly 20 between the first optical path transition axis 27a' and the second optical path transition axis 27b' is incident on the first portion 274 of the object-side inward-positioned half-mirror 277 (shown as arrow '1'' in FIG. 2B). The second object-side inward-positioned half-mirror 277 is positioned relative to the second object-side outward-positioned half-mirror 272 such that light 1' is reflected by the second object-side inward-positioned half-mirror 277 as s-polarized light 2' onto the second object-side outward-positioned half-mirror 272 where it is reflected as light 3'. The second object-side outward-positioned half-mirror 272 is positioned relative to the second object-side inward-positioned half-mirror 277 such that s-polarized light 3' is reflected by the second object-side outward-positioned half-mirror 272 onto the second object-side inward-positioned half-mirror 277 where it is reflected as s-polarized light 4'. The second object-side inward-positioned half-mirror 277 is positioned relative to the second object-side half-wave plate 273 such that s-polarized light 4' is reflected by the second object-side inward-positioned half-mirror 277 onto the second object-side half-wave plate 273. S-polarized light 4' is transmitted through the second object-side half-wave plate 273 where it is shifted to p-polarized light 5'. The second object-side half-wave plate 273 is positioned relative to the second object-side outward-positioned reflection boundary 271 such that p-polarized light 5' transmitted through the second object-side half-wave plate 273 is incident on the inward facing reflection surface 271c (FIG. 2A) of the second object-side outward-positioned reflection boundary 271 where it is reflected as p-polarized light 6'. The second object-side outward-positioned reflection boundary 271 is positioned relative to the second object-side inward-positioned half-mirror 277 such p-polarized light 6' is reflected by the inward facing reflection surface 271c onto the second object-side inward-positioned half-mirror 277. As noted above, in the embodiment depicted in FIG. 2B, the second object-side inward-positioned half-mirror 277 is a p-polarization half-mirror. Accordingly, shifting of the s-polarized light 4' into p-polarized light 5' by the second object-side half-wave plate 273 allows the p-polarized 6' to transmit (propagate) through the second object-side inward-positioned half-mirror 277 as p-polarized light 7'. The second object-side inward-positioned half-mirror 277 is positioned relative to the second image-side inward-positioned half-mirror 287 such that p-polarized light 7' transmitted through the second object-side inward-positioned half-mirror 277 is incident on the second image-side inward-positioned half-mirror 287 where it transmits through as p-polarized light 8'. The second image-side inward-positioned half-mirror 287 is positioned relative to the second image-side outward-positioned reflection boundary 281 such that p-polarized light 8' transmitted through the second image-side inward-positioned half-mirror 287 is incident on the inward facing reflection surface 281c (FIG. 2A) of the second image-side outward-positioned reflection boundary 281 where it is reflected as p-polarized light 9'. The second image-side outward-positioned reflection boundary 281 is positioned relative to the second image-side half-wave plate 283 such that p-polarized light 9' reflected from the inward facing reflection surface 281c of the second image-side outward-positioned reflection boundary 281 is incident on the second image-side half-wave plate 283. P-polarized light 9' is transmitted through the second image-side half-wave plate 283 where it is shifted to s-polarized light 10'. The second image-side half-wave plate 283 is positioned relative to the second image-side inward-positioned half-mirror 287 such that the s-polarized light 10' transmitted through the second image-side half-wave plate 283 is incident on the second image-side inward-positioned half-mirror 287 where it is reflected as s-polarized light 11'. Accordingly, shifting of the p-polarized light 9' to s-polarized light 10' allows the light path E to include reflection from the second image-side inward-positioned half-mirror 287. The second image-side inward-positioned half-mirror 287 is positioned relative to the second image-side outward-positioned half-mirror 282 such that the s-polarized light 11' is reflected by the second image-side inward-positioned half-mirror 287 onto the second image-side outward-positioned half-mirror 282 where it is reflected as s-polarized light 12'. The second image-side outward-positioned half-mirror 282 is positioned relative to the second image-side inward-positioned half-mirror 287 such that the s-polarized light 12' is reflected by the second image-side outward-positioned half-mirror 282 onto the second image-side inward-positioned half-mirror 287 where it is reflected as s-polarized light 13'. S-polarized light 13' is reflected by the second image-side inward-positioned half-mirror 287 generally parallel to light 1' and forms a portion of an image I on the image-side 24 of the cloaking assembly 20.

Accordingly, light from the object O may travel from the object-side 22 to the image-side 24 via the second optical path E: object O—second object-side inward-positioned half-mirror 277—second object-side outward-positioned half-mirror 272—second object-side inward-positioned half-mirror 277—second object-side half-wave plate 273—second object-side outward-positioned reflection boundary 271—second object-side inward-positioned half-mirror 277—second image-side inward-positioned half-mirror 287—second image-side outward-positioned reflection boundary 281—second image-side half-wave plate 283—second image-side inward-positioned half-mirror 287—second image-side outward-positioned half-mirror 282—second image-side inward-positioned half-mirror 287—Image I. That is, light from the object O may travel from the object-side 22 to the image-side 24 via the second optical path E: object O—reflection from second object-side inward-positioned half-mirror 277—reflection from second object-side outward-positioned half-mirror 272—reflection from second object-side inward-positioned half-mirror 277—transmittance through second object-side half-wave plate 273—reflection from second object-side outward-positioned reflection boundary 271—transmittance through second object-side inward-positioned half-mirror 277—transmittance through second image-side inward-positioned half-mirror 287—reflection from second image-side outward-positioned reflection boundary 281—transmittance through second image-side half-wave plate 283—reflection from second image-side inward-positioned half-mirror 287—reflection from second image-side outward-positioned half-mirror 282—reflection from second image-side inward-positioned half-mirror 287—Image I.

Regarding the third optical path F on the second side (−X direction) of the reference optical axis 26, light from the object O positioned above (+Y direction) the cloaking assembly 20 between the second optical path transition axis 27b' and the third optical path transition axis 27c' is incident on the second object-side outward-positioned half-mirror 272 (shown as arrow '1''' in FIG. 2B). The p-polarized mode of light 1" is transmitted through the second object-side outward-positioned half-mirror 272 as p-polarized light 2". The second object-side outward-positioned half-mirror 272 is positioned relative to the second object-side inward-positioned half-mirror 277 such that the p-polarized light 2" transmitted through the second object-side outward-positioned half-mirror 272 is incident on the second object-side inward-positioned half-mirror 277 where it transmits through as p-polarized light 3". The second object-side inward-positioned half-mirror 277 is positioned relative to the second object-side CR reflection boundary 230 such that the p-polarized light 3" transmitted through the second object-side inward-positioned half-mirror 277 is incident on the on the second object-side CR reflection boundary 230 where it is reflected by the outward facing reflection surface 232 (FIG. 2A) as p-polarized light 4". The second object-side CR reflection boundary 230 is positioned relative to the second object-side inward-positioned reflection boundary 275 such that p-polarized light 4" is reflected by the outward facing reflection surface 232 onto the inward facing reflection surface 275c (FIG. 2A) of the second object-side inward-positioned reflection boundary 275 where it reflected as p-polarized light 5". The second object-side inward-positioned reflection boundary 275 is positioned relative to the second image-side inward-positioned reflection boundary 285 such that p-polarized light 5" is reflected from the inward facing reflection surface 275c onto the inward facing reflection surface 285c (FIG. 2A) of the second image-side inward-positioned reflection boundary 285 where it is reflected as p-polarized light 6". The second image-side inward-positioned reflection boundary 285 is positioned relative to the second image-side CR reflection boundary 240 such that p-polarized light 6" is reflected by the inward facing reflection surface 285c onto the outward facing reflection surface 242 (FIG. 2A) of the second image-side CR reflection boundary 240 where it is reflected as p-polarized light 7". The second image-side CR reflection boundary 240 is positioned relative to the second image-side inward-positioned half-mirror 287 such that the p-polarized light 7" reflected by the outward facing reflection surface 242 is incident on the second image-side inward-positioned half-mirror 287 where it transmits through as p-polarized light 8". The second image-side inward-positioned half-mirror 287 is positioned relative to the second image-side outward-positioned half-mirror 282 such that p-polarized light 8" transmitted through the second image-side inward-positioned half-mirror 287 is incident on the second image-side outward-positioned half-mirror 282 where it transmits through as p-polarized light 9". P-polarized light 9" is transmitted through the second image-side outward-positioned half-mirror 282 generally parallel to light 1" and forms a portion of an image I on the image-side 24 of the cloaking assembly 20.

Accordingly, light from the object O may travel from the object-side 22 to the image-side 24 via the third optical path F: object O—second object-side outward-positioned half-mirror 272—second object-side inward-positioned half-mirror 277—second object-side CR reflection boundary 230—second object-side inward-positioned reflection boundary 275—second image-side inward-positioned reflection boundary 285—second image-side CR reflection boundary 240—second image-side inward-positioned half-mirror 287—second image-side outward-positioned half-mirror 282—Image I. That is, light from the object O may travel from the object-side 22 to the image-side 24 via the third optical path F: object O—transmittance through second object-side outward-positioned half-mirror 272—transmittance through second object-side inward-positioned half-mirror 277—reflection from second object-side CR reflection boundary 230—reflection from second object-side inward-positioned reflection boundary 275—reflection from second image-side inward-positioned reflection boundary 285—reflection from second image-side CR reflection boundary 240—transmittance through second image-side inward-positioned half-mirror 287—transmittance through second image-side outward-positioned half-mirror 282—Image I.

In combination, i.e., light 1 on the first side (+X direction) and the second side (−X direction) of the reference optical axis 26 from the object O on the object-side 22 of the cloaking assembly 20 propagates to the image-side 24 via the first optical paths D: object O—reflection from first and second object-side CR reflection boundaries 210, 230—reflection from first and second object-side inward-positioned half-mirrors 257, 277—reflection from first and second object-side CR reflection boundaries 210, 230—reflection from first and second object-side inward-positioned reflection boundaries 255, 275—reflection from first and second image-side inward-positioned reflection boundaries 265, 285—reflection from first and second image-side CR reflection boundaries 220, 240—reflection from first and second image-side inward-positioned half-mirrors 267, 287—reflection from first and second image-side CR reflection boundaries 220, 240—image I. Light 1' on the first side (+X direction) and the second side (−X direction) of the reference optical axis 26 from the object O on the object-side 22 of the cloaking assembly 20 propagates to the image-side 24 via the second optical paths E: object O—reflection from first and second object-side inward-positioned half-mirrors 257, 277—reflection from first and second object-side outward-positioned half-mirrors 252, 272—reflection from first and second object-side inward-positioned half-mirrors 257, 277—transmittance through first and second object-side half-wave plates 253, 273—reflection from first and second object-side outward-positioned reflection boundaries 251, 271—transmittance through first and second object-side inward-positioned half-mirrors 257, 277—transmittance through first and second image-side inward-positioned half-mirrors 267, 287—reflection from first and second image-side outward-positioned reflection boundaries 261, 281—transmittance through first and second image-side half-wave plates 263, 283—reflection from first and second image-side inward-positioned half-mirrors 267, 287—reflection from first and second image-side outward-positioned half-mirrors 262, 282—reflection from first and second image-side inward-positioned half-mirrors 267, 287—Image I. Light 1" on the first side (+X direction) and the second side (−X direction) of the reference optical axis 26 from the object O on the object-side 22 of the cloaking assembly 20 propagates to the image-side 24 via the third optical paths F: object O—transmittance through first and second object-side outward-positioned half-mirrors 252, 272—transmittance through first and second object-side inward-positioned half-mirrors 257, 277—reflection from first and second object-side CR reflection boundaries 210, 230—reflection from first and second object-side inward-positioned reflection boundaries 255, 275—reflection from first and second image-side inward-positioned reflection boundaries 265, 285—reflection from first and second image-side CR reflection boundaries 220, 240—transmittance through first and second image-side inward-positioned half-mirrors 267, 287—transmittance through first and second image-side outward-positioned half-mirrors 262, 282—Image I.

While FIGS. 2A and 2B depict the CR reflection boundaries 210, 220, 230, 240, outward-positioned reflection boundaries 251, 261, 271, 281, outward-positioned half-mirrors 252, 262, 272, 282, half-wave plates 253, 263, 273, 283, inward-positioned reflection boundaries 255, 265, 275, 285, and inward-positioned half-mirrors 257, 267, 277, 287 as stand-alone components, it should be understood that such optical components may be provided as a single unit or a plurality of assembled units. For example, the optical component sub-assemblies 250, 260, 270, 280 may be formed from a plurality of prisms that comprise the CR reflection boundaries 210, 220, 230, 240, outward-positioned reflection boundaries 251, 261, 271, 281, outward-positioned half-mirrors 252, 262, 272, 282, half-wave plates 253, 263, 273, 283, inward-positioned reflection boundaries 255, 265, 275, 285, and inward-positioned half-mirrors 257, 267, 277, 287. It should also be understood that the cloaking assembly 20 may cloak an object within the cloaked region CR including only the first object-side and image-side CR reflection boundaries 210, 220 and the optical component sub-assemblies 250, 260. That is, an object positioned on the first side (+X direction) of the reference optical axis 26 within the cloaked region CR would be cloaked by the first object-side and image-side CR reflection boundaries 210, 220, and the optical component sub-assemblies 250, 260. In the alternative, an object positioned on the second side (−X direction) of the reference optical axis 26 within the cloaked region CR would be cloaked by the second object-side and image-side CR reflection boundaries 230, 240 and the optical component sub-assemblies 270, 280.

Figure 3A:
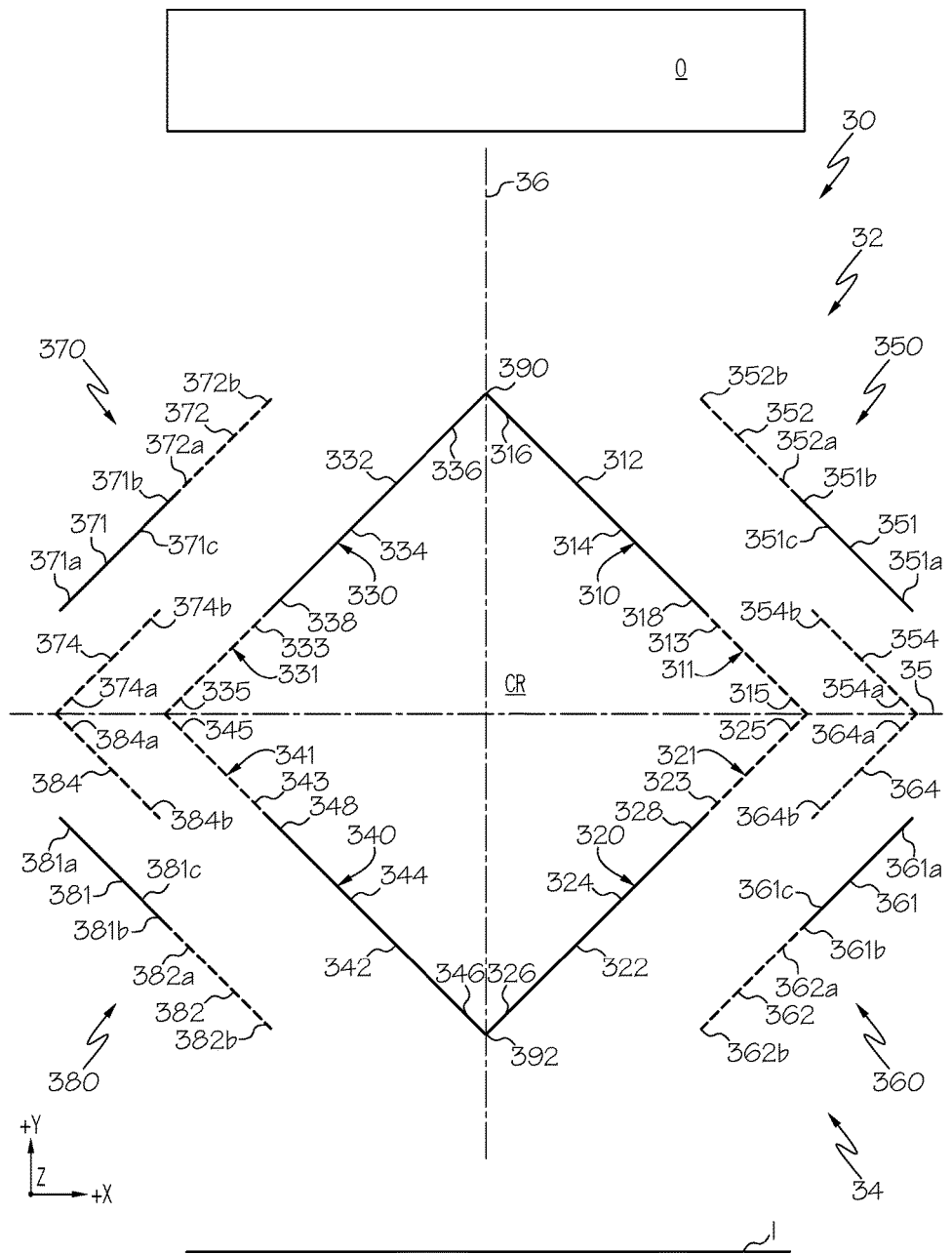
FIG. 3A schematically depicts a top view of a cloaking assembly according to one or more embodiments described and illustrated herein.

Referring now FIG. 3A, embodiments of a cloaking assembly 30 that provide three optical paths to reflect light around a cloaked region CR without the use of half-wave plates is depicted. The cloaking assembly 30 includes an object-side 32, an image-side 34, four CR reflection boundaries 310, 320, 330, 340. In embodiments, the CR reflection boundaries 310, 320, 330, 340 are planar and four CR half-mirrors 311, 321, 331, 341 are co-planar with the four CR reflection boundaries 310, 320, 330, 340, respectively. The object-side 32 is positioned above (+Y direction) a bisecting axis 35 and the image-side 34 is positioned below (−Y direction) the bisecting axis 35. That is, the bisecting axis 35 extends between and delineates the object-side 32 and the image-side 34. Each of the four CR reflection boundaries 310, 320, 330, 340 and each of the four CR half-mirrors 311, 321, 331, 341 may be planar and oriented at an acute angle (e.g., 45°) relative to the bisecting axis 35 and a reference optical axis 36 extending from the object-side 32 to the image-side 34 as depicted in FIG. 3A. Also, each of the four CR reflection boundaries 310, 320, 330, 340 and each of the four CR half-mirrors 311, 321, 331, 341 has a height along the Z-axis shown in the figures. That is, the Z-axis shown in the figures extends along a height of the four CR reflection boundaries 310, 320, 330, 340 and the four CR half-mirrors 311, 321, 331, 341.

The two CR reflection boundaries 310, 330 and the two CR half-mirrors 311, 331 may be positioned on the object-side 32 of the cloaking assembly 30 to face an object 'O' and may be referred to herein as object-side CR reflection boundaries 310, 330 and object-side CR half-mirrors 311, 331. Also, the object-side CR reflection boundary 310 and the object-side CR half-mirror 311 are positioned on a first side (+X direction) of the reference optical axis 36 and may be referred to herein as a first object-side CR reflection boundary 310 and a first object-side CR half-mirror 311. The object-side CR reflection boundary 330 and the object-side CR half-mirror 331 are positioned on a second side (−X direction) of the reference optical axis 36 opposite the first side and may be referred to herein as a second object-side CR reflection boundary 330 and a second object-side CR half-mirror 331.

The two CR reflection boundaries 320, 340 and the two CR half-mirrors 321, 341 may be positioned on the image-side 34 of the cloaking assembly 30 to provide an image 'I' formed by the cloaking assembly 30 and may be referred to herein as image-side CR reflection boundaries 320, 340 and image-side CR half-mirrors 321, 341. The image-side CR reflection boundary 320 and the image-side CR half-mirror 321 are positioned on the first side (+X direction) of the reference optical axis 36 and may be referred to herein as a first image-side CR reflection boundary 320 and a first image-side CR half-mirror 321. The image-side CR reflection boundary 340 and the image-side CR half-mirror 341 are positioned on the second side (−X direction) of the reference optical axis 36 opposite the first side and may be referred to herein as a second image-side CR reflection boundary 340 and a second image-side CR half-mirror 341.

In some embodiments, the two object-side CR reflection boundaries 310, 330, the two object-side CR half-mirrors 311, 331, the two image-side CR reflection boundaries 320, 340 and the two image-side CR half-mirrors 321, 341 may be oriented at an acute angle (e.g., 45°) relative to the bisecting axis 35 and the reference optical axis 36. In such embodiments, the two image-side CR reflection boundaries 320, 340 and the two image-side CR half-mirrors 321, 341 may be oriented relative to the bisecting axis 35 and the reference optical axis 36 at the same acute angle as the two object-side CR reflection boundaries 310, 330, the two object-side CR half-mirrors 311, 331, respectively. For example, the two image-side CR reflection boundaries 320, 340 and the two image-side CR half-mirrors 321, 341 may be symmetrical to the two object-side CR reflection boundaries 310, 330 and the two object-side CR half-mirrors 311, 331 (i.e., form a mirror image) about the bisecting optical axis 35. Alternatively or additionally, the second object-side and the second image-side CR reflection boundaries 330, 340 and the second object-side and the second image-side CR half mirrors 331, 341 may be symmetrical to the first object-side and the first image-side CR reflection boundaries 310, 320 and the first object-side and the first image-side CR half mirrors 311, 321 (i.e., form a mirror image) about the reference optical axis 36.

The CR reflection boundaries 310, 320, 330, 340 each have an outward facing reflection surface 312, 322, 332, 342 and an inward facing surface 314, 324, 334, 344, respectively. In embodiments, one or more of the inward facing surfaces 314, 324, 334, 344 may be an opaque surface thereby preventing light from within the cloaked region CR from propagating through one or more of the CR reflection boundaries 310, 320, 330, 340, respectively. The outward facing reflection surfaces 312, 322, 332, 342 can be made from omnidirectional photonic crystals or mirrors such that light incident on the outward facing reflection surfaces 312, 322, 332, 342 is reflected there from. In the alternative, one or more of the outward facing reflection surfaces 312, 322, 332, 342 may be a reflection surface of a prism, e.g., a right angle prism, that totally internally reflects light incident on the surface.

The CR reflection boundaries 310, 320, 330, 340 may each have a distal end 316, 326, 336, 346 and a proximal end 318, 328, 338, 348, respectively. The proximal ends 318, 328, 338, 348 are spaced apart from the distal ends 316, 326, 336, 346, respectively, and the CR reflection boundaries 310, 320, 330, 340 extend between distal ends 316, 326, 336, 346 and proximal ends 318, 328, 338, 348, respectively. The CR half-mirrors 311, 321, 331, 341 may each have a distal end 313, 323, 333, 343 and a proximal end 315, 325, 335, 345, respectively. The proximal ends 315, 325, 335, 345 are spaced apart from the distal ends 313, 323, 333, 343, respectively, and the CR half-mirrors 311, 321, 331, 341 extend between distal ends 313, 323, 333, 343 and proximal ends 315, 325, 335, 345, respectively. In embodiments, the distal ends 313, 323, 333, 343 of the CR half-mirrors 311, 321, 331, 341 are directly in contact with the proximal ends 318, 328, 338, 348 of the CR reflection boundaries 310, 320, 330, 340, respectively, such that un-polarized light does not escape or propagate out from the cloaked region CR. In such embodiments, the distal ends 313, 323, 333, 343 of the CR half-mirrors 311, 321, 331, 341 may be attached to the proximal ends 318, 328, 338, 348 of the CR reflection boundaries 310, 320, 330, 340, respectively.

In embodiments, the distal ends 316, 336 of the two object-side CR reflection boundaries 310, 330, respectively, meet or intersect at an apex 390. Alternatively or additionally, the distal ends 326, 346 of the two image-side CR reflection boundaries 320, 340, respectively, meet or intersect at an apex 392. In such embodiments, the reference optical axis 36 bisects the apex 390 and the apex 392, and may be a centerline between the first side (+X direction) and the second side (−X direction) of the cloaking assembly 30. In other embodiments, the distal ends 316, 336 of the two object-side CR reflection boundaries 310, 330, respectively, are spaced apart from each other and/or the distal ends 326, 346 of the two image-side CR reflection boundaries 320, 340, respectively, are spaced apart from each other such that an uncloaked region or gap (not shown) is present between the spaced apart distal ends 316, 336 and/or spaced apart distal ends 326, 346. In such embodiments, an image of the portion of the object O positioned above (+Y direction) the uncloaked region is not provided on the image-side 34 of the cloaking assembly 30. Also, in embodiments, the proximal ends 315, 335 of the object-side CR half-mirrors 311, 331, respectively, may be positioned adjacent to and may be joined to proximal ends 325, 345 of the image-side CR half-mirrors 321, 341, respectively, as depicted in FIG. 3A. In other embodiments, the proximal ends 315, 335 may be spaced apart (Y direction) from the proximal ends 325, 345 (not shown).

In embodiments, the two object-side CR reflection boundaries 310, 330, the two object-side CR half-mirrors 311, 331, the two image-side CR reflection boundaries 320, 340 and the two image-side CR half-mirrors 321, 341 form the cloaked region CR that is bound at least partly by the inward facing surfaces 314, 324, 334, 344 of the four CR reflection boundaries 310, 330, 320, 340, respectively, and the four CR half-mirrors 311, 321, 331, 341. The two object-side CR reflection boundaries 310, 330, the two object-side CR half-mirrors 311, 331, the two image-side CR reflection boundaries 320, 340 and the two image-side CR half-mirrors 321, 341 have a height 'h' (FIG. 7) in the Z-direction of the coordinate axes in the figures.

Still referring to FIG. 3A, the cloaking assembly 30 may include four optical component sub-assemblies 350, 360, 370, 380. In embodiments, the four optical component sub-assemblies 350, 360, 370, 380 are spaced apart from each of the CR reflection boundaries 310, 320, 330, 340, and CR half-mirrors 311, 321, 331, 341 and may include four outward-positioned half-mirrors 352, 362, 372, 382, four outward-positioned reflection boundaries 351, 361, 371, 381 co-planar with the four outward-positioned half-mirrors 352, 362, 372, 382, respectively, and four inward-positioned half-mirrors 354, 364, 374, 384, respectively.

The four outward-positioned half-mirrors 352, 362, 372, 382, and the four outward-positioned reflection boundaries 351, 361, 371, 381 are oriented generally parallel (+/−2°) to and spaced apart from the four CR reflection boundaries 310, 320, 330, 340, respectively. The four inward-positioned half-mirrors 354, 364, 374, 384 are oriented generally parallel (+/−2°) to and spaced apart from the four CR reflection boundaries 310, 320, 330, 340, and the four outward-positioned reflection boundaries 351, 361, 371, 381, respectively. In some embodiments, the four inward-positioned half-mirrors 354, 364, 374, 384 are positioned between the four outward-positioned reflection boundaries 351, 361, 371, 381 and the four CR half-mirrors 311, 321, 331, 341, respectively.

The outward-positioned half-mirrors 352, 362, 372, 382 include proximal ends 352a, 362a, 372a, 382a and distal ends 352b, 362b, 372b, 382b, respectively. The proximal ends 352a, 362a, 372a, 382a are spaced apart from the distal ends 352b, 362b, 372b, 382b, respectively, and the outward-positioned half-mirrors 352, 362, 372, 382 extend between the proximal ends 352a, 362a, 372a, 382a and distal ends 352b, 362b, 372b, 382b, respectively. The outward-positioned reflection boundaries 351, 361, 371, 381 include proximal ends 351a, 361a, 371a, 381a and distal ends 351b, 361b, 371b, 381b, respectively. The proximal ends 351a, 361a, 371a, 381a are spaced apart from the distal ends 351b, 361b, 371b, 381b, respectively, and the outward-positioned reflection boundaries 351, 361, 371, 381 extend between the proximal ends 351a, 361a, 371a, 381a and the distal ends 351b, 361b, 371b, 381b, respectively. The inward-positioned half-mirrors 354, 364, 374, 384 include proximal ends 354a, 364a, 374a, 384a and distal ends 354b, 364b, 374b, 384b, respectively. The proximal ends 354a, 364a, 374a, 384a are spaced apart from the distal ends 354b, 364b, 374b, 384b, respectively, and the inward-positioned half-mirrors 354, 364, 374, 384 extend between the proximal ends 354a, 364a, 374a, 384a and the distal ends 354b, 364b, 374b, 384b, respectively.

Each of the outward-positioned half-mirrors 352, 362, 372, 382, each of the outward-positioned reflection boundaries 351, 361, 371, 381, and each of the inward-positioned half-mirrors 354, 364, 374, 384 has a height along the Z-axis shown in the figures. The two outward-positioned half-mirrors 352, 372, the two outward-positioned reflection boundaries 351, 371, and the two inward-positioned half-mirrors 354, 374 may be positioned on the object-side 32 of the cloaking assembly 30 and may be referred to herein as object-side outward-positioned half-mirrors 352, 372, object-side outward-positioned reflection boundaries 351, 371, and object-side inward-positioned half-mirrors 354, 374, respectively. The object-side outward-positioned half-mirror 352, the object-side outward-positioned reflection boundary 351, and the object-side inward-positioned half-mirror 354 are positioned on the first side (+X direction) of the reference optical axis 36 and may be referred to herein as a first object-side outward-positioned half-mirror 352, a first object-side outward-positioned reflection boundary 351, and a first object-side inward-positioned half-mirror 354. The object-side outward-positioned half-mirror 372, the object-side outward-positioned reflection boundary 371, and the object-side inward-positioned half-mirror 374 are positioned on the second side (−X direction) of the reference optical axis 36 and may be referred to herein as a second object-side outward-positioned half-mirror 372, a second object-side outward-positioned reflection boundary 371, and a second object-side inward-positioned half-mirror 374. The two outward-positioned half-mirrors 362, 382, the two outward-positioned reflection boundaries 361, 381, and the two inward-positioned half-mirrors 364, 384 may be positioned on the image-side 34 of the cloaking assembly 30 and may be referred to herein as image-side outward-positioned half-mirrors 362, 382, image-side outward-positioned reflection boundaries 361, 381, and image-side inward-positioned half-mirrors 364, 384, respectively. The image-side outward-positioned half-mirror 362, the image-side outward-positioned reflection boundary 361, and the image-side inward-positioned half-mirror 364 are positioned on the first side (+X direction) of the reference optical axis 36 and may be referred to herein as a first image-side outward-positioned half-mirror 362, a first image-side outward-positioned reflection boundary 361, and a first image-side inward-positioned half-mirror 364. The image-side outward-positioned half-mirror 382, the image-side outward-positioned reflection boundary 381, and the image-side inward-positioned half-mirror 384 are positioned on the second side (−X direction) of the reference optical axis 36 and may be referred to herein as a second image-side outward-positioned half-mirror 382, a second image-side outward-positioned reflection boundary 381, and a second image-side inward-positioned half-mirror 384.

The CR half-mirrors 311, 321, 331, 341, the outward-positioned half-mirrors 352, 362, 372, 382, and the inward-positioned half-mirrors 354, 364, 374, 384 reflect a specific mode of visible light. Specifically, each of the CR half-mirrors 311, 321, 331, 341, each of the outward-positioned half-mirrors 352, 362, 372, 382, and each of the inward-positioned half-mirrors 354, 364, 374, 384 may be an s-polarizer half-mirror or a p-polarizer half-mirror. The CR half-mirrors 311, 321, 331, 341, the outward-positioned half-mirrors 352, 362, 372, 382, and the inward-positioned half-mirrors 354, 364, 374, 384 may be in the form of a diffraction grating or thin film polarizer. In embodiments, the CR half-mirrors 311, 321, 331, 341, the outward-positioned half-mirrors 352, 362, 372, 382, and the inward-positioned half-mirrors 354, 364, 374, 384 are all p-polarizer half-mirrors or all s-polarizer half-mirrors. In other embodiments, the first side (+X direction) half-mirrors, i.e., the CR half-mirrors 311, 321, the outward-positioned half-mirrors 352, 362, and the inward-positioned half-mirrors 354, 364, are all p-polarizer half-mirrors and the second side (−X direction) half-mirrors, i.e., the CR half-mirrors 331, 341, the outward-positioned half-mirrors 372, 382, and the inward-positioned half-mirrors 374, 384, are all s-polarizer half-mirrors. In still other embodiments, the first side (+X direction) half-mirrors, i.e., CR half-mirrors 311, 321, the outward-positioned half-mirrors 352, 362, and the inward-positioned half-mirrors 354, 364, are all s-polarizer half-mirrors and the second side (−X direction) half-mirrors, i.e., CR half-mirrors 331, 341, the outward-positioned half-mirrors 372, 382, and the inward-positioned half-mirrors 374, 384, are all p-polarizer half-mirrors.

Figure 3B:
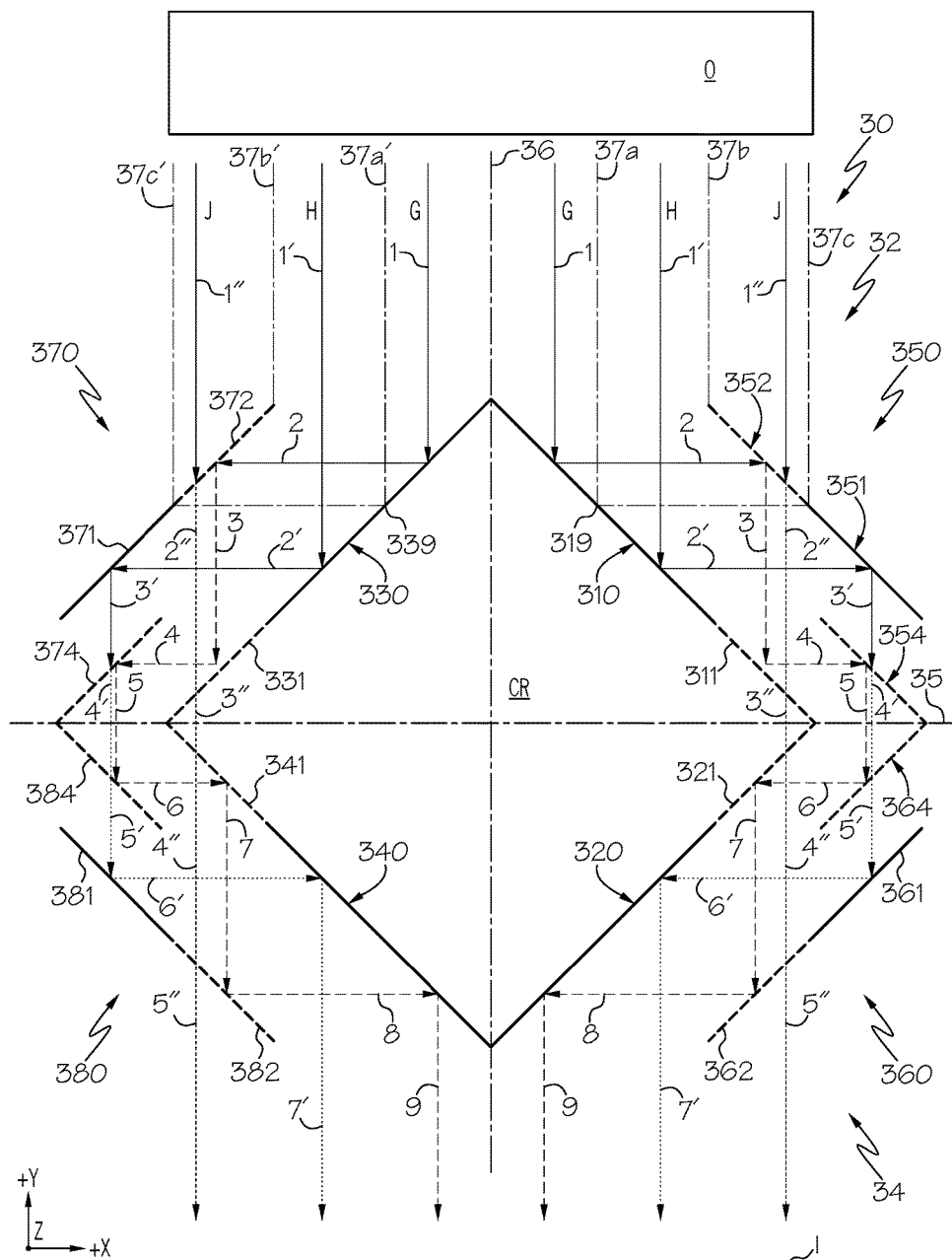
FIG. 3B schematically depicts a top view of the cloaking assembly of FIG. 3A with light propagating from an object on an object-side of the cloaking assembly to form an image on an image-side of the cloaking assembly via three optical paths.

Referring now to FIGS. 3A and 3B, the cloaking assembly 30 includes three optical paths for light from an object 'O' positioned on the object-side 32 to be redirected around the cloaked region CR to form an image 'I' on the image-side 34 on the first side (+X direction) of the reference optical axis 36. The cloaking assembly 30 may also include three optical paths for light from an object 'O' positioned on the object-side 32 to be redirected around the cloaked region CR to form an image 'I' on the image-side 34 on the second side (−X direction) of the reference optical axis 36. Regarding the three optical paths on the first side (+X direction) of the reference optical axis 36, light from the object O incident on the cloaking assembly 30 between the reference optical axis 36 and a first optical path transition axis 37a propagates via an optical path 'G'. Light from the object O incident on the cloaking assembly 30 between the first optical path transition axis 37a and a second optical path transition axis 37b propagates via an optical path 'H'. Light from the object O positioned above (+Y direction) the cloaking assembly 30 between the second optical path transition axis 37b and a third optical path transition axis 37c propagates via an optical path T.

The first optical path transition axis 37a extends parallel to the Y-axis in the figures from a point 319 on the first object-side CR reflection boundary 310 to the object O. In embodiments, the point 319 is defined by the intersection of a line extending parallel to the X-axis in the figures from the proximal end 352a of the first object-side outward-positioned half-mirror 352. Accordingly, light propagating via optical path G is incident on and reflected by the first object-side CR reflection boundary 310 onto the first object-side outward-positioned half-mirror 352 (e.g., see arrows '1' and '2' in FIG. 3B). The second optical path transition axis 37b extends parallel to the Y-axis from the distal end 352b of the first object-side outward-positioned half-mirror 352 to object O. Accordingly, light propagating via optical path H is incident on and reflected by the first object-side CR reflection boundary 310 onto the first object-side outward-positioned reflection boundary 351 (e.g., see arrows '1'' and '2'' in FIG. 3B). The third optical path transition axis 37c extends parallel to the Y-axis from the proximal end 352a of the first object-side outward-positioned half-mirror 352 to object O. Accordingly, light propagating via optical path J is incident on the first object-side outward-positioned half-mirror 352 between the distal end 352b and the proximal end 352a (e.g., see arrow '1''' in FIG. 3B).

Regarding the first optical path G on the first side (+X direction) of the reference optical axis 36, and as noted above, the first object-side CR reflection boundary 310 is positioned relative to the first outward-positioned half-mirror 352 such that light 1 from the object O is reflected by the outward facing reflection surface 312 (FIG. 3A) of the first object-side CR reflection boundary 310 as light 2 onto the first outward-positioned half-mirror 352. A non-limiting example of the first outward-positioned half-mirror 352 in the form of a p-polarization half-mirror is depicted in FIG. 3B. Accordingly, s-polarized light is reflected from the first outward-positioned half-mirror 352 (shown as arrow '3' in FIG. 3B). The first outward-positioned half-mirror 352 is positioned relative to the first object-side CR half-mirror 311 such that s-polarized light 3 is reflected by the first outward-positioned half-mirror 352 onto the first object-side CR half-mirror 311. As noted above, the first side (+X direction) half-mirrors are all the same type or mode of half-mirrors. Accordingly, in the embodiment depicted in FIG. 3B the first object-side CR half-mirror 311 is a p-polarization half-mirror and s-polarized light 3 is reflected by the first object-side CR half-mirror 311 (shown as arrow '4' in FIG. 3B). The first object-side CR half-mirror 311 is positioned relative to the first object-side inward-positioned half-mirror 354 such that s-polarized light 4 is reflected by the first object-side CR half-mirror 311 onto the first object-side inward-positioned half-mirror 354 where it is reflected as s-polarized light 5. The first object-side inward-positioned half-mirror 354 is positioned relative to the first image-side inward-positioned half-mirror 364 such that s-polarized light 5 is reflected by the first object-side inward-positioned half-mirror 354 onto the first image-side inward-positioned half-mirror 364 where it is reflected as s-polarized light 6. The first image-side inward-positioned half-mirror 364 is positioned relative to the first image-side CR half-mirror 321 such that s-polarized light 6 is reflected by the first image-side inward-positioned half-mirror 364 onto the first image-side CR half-mirror 321 where it is reflected as s-polarized light 7. The first image-side CR half-mirror 321 is positioned relative to the first image-side outward-positioned half-mirror 362 such that s-polarized light 7 is reflected by the first image-side CR half-mirror 321 onto the first image-side outward-positioned half-mirror 362 where it is reflected as s-polarized light 8. The first image-side outward-positioned half-mirror 362 is positioned relative to the first image-side CR reflection boundary 320 such that s-polarized light 8 is reflected by the first image-side outward-positioned half-mirror 362 onto the outward facing reflection surface 322 (FIG. 3A) of the first image-side CR reflection boundary 320 where it is reflected as s-polarized light 9. S-polarized light 9 is reflected by the outward facing reflection surface 322 generally parallel to light 1 and forms a portion of an image I on the image-side 34 of the cloaking assembly 30.

Accordingly, light from the object O may travel from the object-side 32 to the image-side 34 via the first optical path G: object O—first object-side CR reflection boundary 310—first object-side outward-positioned half-mirror 352—first object-side CR half-mirror 311—first object-side inward-positioned half-mirror 354—first image-side inward-positioned half-mirror 364—first image-side CR half-mirror 321—first image-side outward-positioned half-mirror 362—first image-side CR reflection boundary 320—image I. That is, light from the object O may travel from the object-side 32 to the image-side 34 via the first optical path G: object O—reflection from first object-side CR reflection boundary 310—reflection from first object-side outward-positioned half-mirror 352—reflection from first object-side CR half-mirror 311—reflection from first object-side inward-positioned half-mirror 354—reflection from first image-side inward-positioned half-mirror 364—reflection from first image-side CR half-mirror 321—reflection from first image-side outward-positioned half-mirror 362—reflection from first image-side CR reflection boundary 320—image I.

Regarding the second optical path H on the first side (+X direction) of the reference optical axis 36, the first object-side CR reflection boundary 310 is positioned relative to the first object-side outward-positioned reflection boundary 351 such that light 1' is reflected by the outward facing reflection surface 312 (FIG. 3A) of the first object-side CR reflection boundary 310 as light 2' onto the first object-side outward-positioned reflection boundary 351 where it is reflected by the inward facing reflection surface 351c (FIG. 3A) as light 3'. The first object-side outward-positioned reflection boundary 351 is positioned relative to the first object-side inward-positioned half-mirror 354 such that light 3' is incident on the first object-side inward-positioned half-mirror 354. As noted above, the first object-side inward-positioned half-mirror 354 is a p-polarization half-mirror. Accordingly, p-polarized light is transmitted through the first object-side inward-positioned half-mirror 354 (shown as arrow '4'' in FIG. 3B). The first object-side inward-positioned half-mirror 354 is positioned relative to the first image-side inward-positioned half-mirror 364 such that p-polarized light 4' transmitted through the first object-side inward-positioned half-mirror 354 is incident on the first image-side inward-positioned half-mirror 364 where it is transmitted as p-polarized light 5'. The first image-side inward-positioned half-mirror 364 is positioned relative to the first image-side outward-positioned reflection boundary 361 such that p-polarized light 5' transmitted through the first image-side inward-positioned half-mirror 364 is incident on the inward facing reflection surface 361c (FIG. 3A) of the first image-side outward-positioned reflection boundary 361 where it is reflected as p-polarized light 6'. The first image-side outward-positioned reflection boundary 361 is positioned relative to the first image-side CR reflection boundary 320 such that p-polarized light 6' is reflected from the inward facing reflection surface 361c onto the outward facing reflection surface 322 (FIG. 3A) where it is reflected as p-polarized light 7'. P-polarized light 7' is reflected by the outward facing reflection surface 322 of the first images-side CR reflection boundary 320 generally parallel to light 1' and forms a portion of the image I on the image-side 34 of the cloaking assembly 30.

Accordingly, light from the object O may travel from the object-side 32 to the image-side 34 via the second optical path H: object O—first object-side CR reflection boundary 310—first object-side outward-positioned reflection boundary 351—first object-side inward-positioned half-mirror 354—first image-side inward-positioned half-mirror 364—first image-side outward-positioned reflection boundary 361—first image-side CR reflection boundary 320—image I. That is, light from the object O may travel from the object-side 32 to the image-side 34 via the second optical path H: object O—reflection from first object-side CR reflection boundary 310—reflection from first object-side outward-positioned reflection boundary 351—transmittance through first object-side inward-positioned half-mirror 354—transmittance through first image-side inward-positioned half-mirror 364—reflection from first image-side outward-positioned reflection boundary 361—reflection from first image-side CR reflection boundary 320—image I.

Regarding the third optical path J on the first side (+X direction) of the reference optical axis 36, and as noted above, the first object-side outward-positioned half-mirror 352, the first object-side CR half-mirror 311, the first image-side CR half-mirror 321 and the first image-side outward-positioned half-mirror 362 are all p-polarization half-mirrors. Accordingly, the p-polarized mode of light 1″ is transmitted through the first object-side outward-positioned half-mirror 352 as p-polarized light 2″. The first object-side outward-positioned half-mirror 352 is positioned relative to the first object-side CR half-mirror 311 such that p-polarized light 2″ transmitted through the first object-side outward-positioned half-mirror 352 is incident on the first object-side CR half-mirror 311 where it is transmitted through as p-polarized light 3″. The first object-side CR half-mirror 311 is positioned relative to the first image-side CR half-mirror 321 such that p-polarized light 3″ transmitted through the first object-side CR half-mirror 311 is incident on the first image-side CR half-mirror 321 where it is transmitted through as p-polarized light 4″. The first image-side CR half-mirror 321 is positioned relative to the first image-side outward-positioned half-mirror 362 such that p-polarized light 4″ transmitted through the first image-side CR half-mirror 321 is incident on the first image-side outward-positioned half-mirror 362 where it is transmitted through as p-polarized light 5″. P-polarized light 5′ is transmitted through the first image-side outward-positioned half-mirror 362 generally parallel to light 1″ and forms a portion of the image I on the image-side 34 of the cloaking assembly 30.

Accordingly, light from the object O may travel from the object-side 32 to the image-side 34 via the third optical path J: object O—first object-side outward-positioned half-mirror 352—first object-side CR half-mirror 311—first image-side CR half-mirror 321—first image-side outward-positioned half-mirror 362—image I. That is, light from the object O may travel from the object-side 32 to the image-side 34 via the third optical path J: object O—transmittance through first object-side outward-positioned half-mirror 352—transmittance through first object-side CR half-mirror 311—transmittance through first image-side CR half-mirror 321—transmittance through first image-side outward-positioned half-mirror 362—image I.

Still referring to FIGS. 3A and 3B, and regarding the three optical paths on the second (−X direction) of the reference optical axis 36, light from the object O incident on the cloaking assembly 30 between the reference optical axis 36 and a first optical path transition axis 37a′ propagates via an optical path 'G'. Light from the object O incident on the cloaking assembly 30 between the first optical path transition axis 37a′ and a second optical path transition axis 37b′ propagates via an optical path 'H'. Light from the object O positioned above (+Y direction) the cloaking assembly 30 between the second optical path transition axis 37b′ and a third optical path transition axis 37c′ propagates via an optical path T.

The first optical path transition axis 37a′ extends parallel to the Y-axis in the figures from a point 339 on the second object-side CR reflection boundary 330 to the object O. In embodiments, the point 339 is defined by the intersection of a line (not labeled) extending parallel to the X-axis in the figures between the proximal end 372a of the second object-side outward-positioned half-mirror 372. Accordingly, light propagating via optical path G is incident on and reflected by the second object-side CR reflection boundary 330 onto the second object-side outward-positioned half-mirror 372 (e.g., see arrows '1' and '2' in FIG. 3B). The second optical path transition axis 37b′ extends parallel to the Y-axis from the distal end 372b of the second object-side outward-positioned half-mirror 372 to object O. Accordingly, light propagating via optical path H is incident on and reflected by the second object-side CR reflection boundary 330 onto the second object-side outward-positioned reflection boundary 371 (e.g., see arrows '1' and '2' in FIG. 3B). The third optical path transition axis 37c′ extends parallel to the Y-axis from the proximal end 372a of the second object-side outward-positioned half-mirror 372 to object O. Accordingly, light propagating via optical path J is incident on the second object-side outward-positioned half-mirror 372 between the distal end 372b and the proximal end 372a (e.g., see arrow '1‴' in FIG. 3B).

Regarding the first optical path G on the second side (−X direction) of the reference optical axis 36, and as noted above, the second object-side CR reflection boundary 330 is positioned relative to the second object-side outward-positioned half-mirror 372 such that light 1 from the object O is reflected by the outward facing reflection surface 332 (FIG. 3A) of the second object-side CR reflection boundary 330 as light 2 onto the second object-side outward-positioned half-mirror 372. A non-limiting example of the second object-side outward-positioned half-mirror 372 in the form of a p-polarization half-mirror is depicted in FIG. 3B. Accordingly, s-polarized light is reflected from the second object-side outward-positioned half-mirror 372 (shown as arrow '3' in FIG. 3B). The second object-side outward-positioned half-mirror 372 is positioned relative to the second object-side CR half-mirror 331 such that s-polarized light 3 is reflected by the second object-side outward-positioned half-mirror 372 onto the second object-side CR half-mirror 331. As noted above, the second side (−X direction) half-mirrors are all the same type or mode of half-mirrors. Accordingly, in the embodiment depicted in FIG. 3B the second object-side CR half-mirror 331 is a p-polarization half-mirror and s-polarized light 3 is reflected by the second object-side CR half-mirror 331 (shown as arrow '4' in FIG. 3B). The second object-side CR half-mirror 331 is positioned relative to the second object-side inward-positioned half-mirror 374 such that s-polarized light 4 is reflected by the second object-side CR half-mirror 331 onto the second object-side inward-positioned half-mirror 374 where it is reflected as s-polarized light 5. The second object-side inward-positioned half-mirror 374 is positioned relative to the second image-side inward-positioned half-mirror 384 such that s-polarized light 5 is reflected by the second object-side inward-positioned half-mirror 374 onto the second image-side inward-positioned half-mirror 384 where it is reflected as s-polarized light 6. The second image-side inward-positioned half-mirror 384 is positioned relative to the second image-side CR half-mirror 341 such that s-polarized light 6 is reflected by the second image-side inward-positioned half-mirror 384 onto the second image-side CR half-mirror 341 where it is reflected as s-polarized light 7. The second image-side CR half-mirror 341 is positioned relative to the second image-side outward-positioned half-mirror 382 such that s-polarized light 7 is reflected by the second image-side CR half-mirror 341 onto the second image-side outward-positioned half-mirror 382 where it is reflected as s-polarized light 8. The second image-side outward-positioned half-mirror 382 is positioned relative to the second image-side CR reflection boundary 340 such that s-polarized light 8 is reflected by the second image-side outward-positioned half-mirror 382 onto the outward facing reflection surface 342 (FIG. 3A) of the second image-side CR reflection boundary 340 where it is reflected as s-polarized light 9. S-polarized light 9 is reflected by the outward facing reflection surface 342 generally parallel to light 1 and forms a portion of an image I on the image-side 34 of the cloaking assembly 30.

Accordingly, light from the object O may travel from the object-side 32 to the image-side 34 via the first optical path G: object O—second object-side CR reflection boundary 330—second object-side outward-positioned half-mirror 372—second object-side CR half-mirror 331—second object-side inward-positioned half-mirror 374—second image-side inward-positioned half-mirror 384—second image-side CR half-mirror 341—second image-side outward-positioned half-mirror 382—second image-side CR reflection boundary 340—image I. That is, light from the object O may travel from the object-side 32 to the image-side 34 via the first optical path G: object O—reflection from second object-side CR reflection boundary 330—reflection from second object-side outward-positioned half-mirror 372—reflection from second object-side CR half-mirror 331—reflection from second object-side inward-positioned half-mirror 374—reflection from second image-side inward-positioned half-mirror 384—reflection from second image-side CR half-mirror 341—reflection from second image-side outward-positioned half-mirror 382—reflection from second image-side CR reflection boundary 340—image I.

Regarding the second optical path H on the second side (−X direction) of the reference optical axis 36, the second object-side CR reflection boundary 330 is positioned relative to the second object-side outward-positioned reflection boundary 371 such that light 1' is reflected by the outward facing reflection surface 332 (FIG. 3A) of the second object-side CR reflection boundary 330 as light 2' onto the second object-side outward-positioned reflection boundary 371 where it is reflected by the inward facing reflection surface 371c (FIG. 3A) as light 3'. The second object-side outward-positioned reflection boundary 371 is positioned relative to the second object-side inward-positioned half-mirror 374 such that light 3' is incident on the second object-side inward-positioned half-mirror 374. As noted above, the second object-side inward-positioned half-mirror 374 is a p-polarization half-mirror. Accordingly, p-polarized light is transmitted through the second object-side inward-positioned half-mirror 374 (shown as arrow '4'' in FIG. 3B). The second object-side inward-positioned half-mirror 374 is positioned relative to the second image-side inward-positioned half-mirror 384 such that p-polarized light 4' transmitted through the second object-side inward-positioned half-mirror 374 is incident on the second image-side inward-positioned half-mirror 384 where it is transmitted as p-polarized light 5'. The second image-side inward-positioned half-mirror 384 is positioned relative to the second image-side outward-positioned reflection boundary 381 such that p-polarized light 5' transmitted through the second image-side inward-positioned half-mirror 384 is incident on the inward facing reflection surface 381c (FIG. 3A) of the second image-side outward-positioned reflection boundary 381 where it is reflected as p-polarized light 6'. The second image-side outward-positioned reflection boundary 381 is positioned relative to the second image-side CR reflection boundary 340 such that p-polarized light 6' is reflected from the inward facing reflection surface 381c onto the outward facing reflection surface 342 (FIG. 3A) where it is reflected as p-polarized light 7'. P-polarized light 7' is reflected by the outward facing reflection surface 342 of the second images-side CR reflection boundary 340 generally parallel to light 1' and forms a portion of the image I on the image-side 34 of the cloaking assembly 30.

Accordingly, light from the object O may travel from the object-side 32 to the image-side 34 via the second optical path H: object O—second object-side CR reflection boundary 330—second object-side outward-positioned reflection boundary 371—second object-side inward-positioned half-mirror 374—second image-side inward-positioned half-mirror 384—second image-side outward-positioned reflection boundary 381—second image-side CR reflection boundary 340—image I. That is, light from the object O may travel from the object-side 32 to the image-side 34 via the second optical path H: object O—reflection from second object-side CR reflection boundary 330—reflection from second object-side outward-positioned reflection boundary 371—transmittance through second object-side inward-positioned half-mirror 374—transmittance through second image-side inward-positioned half-mirror 384—reflection from second image-side outward-positioned reflection boundary 381—reflection from second image-side CR reflection boundary 340—image I.

Regarding the third optical path J on the second side (−X direction) of the reference optical axis 36, and as noted above, the second object-side outward-positioned half-mirror 372, the second object-side CR half-mirror 331, the second image-side CR half-mirror 341 and the second image-side outward-positioned half-mirror 382 are all p-polarization half-mirrors. Accordingly, the p-polarized mode of light 1" is transmitted through the second object-side outward-positioned half-mirror 372 as p-polarized light 2". The second object-side outward-positioned half-mirror 372 is positioned relative to the second object-side CR half-mirror 331 such that p-polarized light 2" transmitted through the second object-side outward-positioned half-mirror 372 is incident on the second object-side CR half-mirror 331 where it is transmitted through as p-polarized light 3". The second object-side CR half-mirror 331 is positioned relative to the second image-side CR half-mirror 341 such that p-polarized light 3" transmitted through the object-side CR half-mirror 331 is incident on the second image-side CR half-mirror 341 where it is transmitted through as p-polarized light 4". The second image-side CR half-mirror 341 is positioned relative to the second image-side outward-positioned half-mirror 382 such that p-polarized light 4" transmitted through the second image-side CR half-mirror 341 is incident on the second image-side outward-positioned half-mirror 382 where it is transmitted through as p-polarized light 5". P-polarized light 5" is transmitted through the second image-side outward-positioned half-mirror 382 generally parallel to light 1" and forms a portion of the image I on the image-side 34 of the cloaking assembly 30.

Accordingly, light from the object O may travel from the object-side 32 to the image-side 34 via the third optical path J: object O—second object-side outward-positioned half-mirror 372—second object-side CR half-mirror 331—second image-side CR half-mirror 341—second image-side outward-positioned half-mirror 382—image I. That is, light from the object O may travel from the object-side 32 to the image-side 34 via the third optical path J: object O—transmittance through second object-side outward-positioned half-mirror 372—transmittance through second object-side CR half-mirror 331—transmittance through second image-side CR half-mirror 341—transmittance through second image-side outward-positioned half-mirror 382—image I.

In combination, i.e., light 1 on the first side (+X direction) and the second side (−X direction) of the reference optical axis 36 from the object O on the object-side 32 of the cloaking assembly 30 propagates to the image-side 34 via the first optical paths G: object O—reflection from first and second object-side CR reflection boundaries 310, 330—reflection from first and second object-side outward-positioned half-mirrors 352, 372—reflection from first and second object-side CR half-mirrors 311, 331—reflection from first and second object-side inward-positioned half-mirrors 354, 374—reflection from first and second image-side inward-positioned half-mirrors 364, 384—reflection from first and second image-side CR half-mirrors 321, 341—reflection from first and second image-side outward-positioned half-mirrors 362, 382—reflection from first and second image-side CR reflection boundaries 320, 340—image I. Light 1' on the first side (+X direction) and the second side (−X direction) of the reference optical axis 36 from the object O on the object-side 32 of the cloaking assembly 30 propagates to the image-side 34 via the second optical paths H: object O—reflection from first and second object-side CR reflection boundaries 310, 330—reflection from first and second object-side outward-positioned reflection boundaries 351, 371—transmittance through first and second object-side inward-positioned half-mirrors 354, 374—transmittance through first and second image-side inward-positioned half-mirrors 364, 384—reflection from first and second image-side outward-positioned reflection boundaries 361, 381—reflection from first and second image-side CR reflection boundaries 320, 340—image I. Light 1" on the first side (+X direction) and the second side (−X direction) of the reference optical axis 36 from the object O on the object-side 32 of the cloaking assembly 30 propagates to the image-side 34 via the third optical paths J: object O—transmittance through first and second object-side outward-positioned half-mirrors 352, 372—transmittance through first and second object-side CR half-mirrors 311, 331—transmittance through first and second image-side CR half-mirror 321, 341—transmittance through first and second image-side outward-positioned half-mirrors 362, 382—image I.

While FIGS. 3A and 3B depict the CR reflection boundaries 310, 320, 330, 340, the CR half-mirrors 311, 321, 331, 341, the outward-positioned half-mirrors 352, 362, 372, 382, the outward-positioned reflection boundaries 351, 361, 371, 381, and the inward-positioned half-mirrors 354, 364, 374, 384 as stand-alone components, it should be understood one or more of the components may be provided as a single unit or a plurality of assembled units. For example, the optical component sub-assemblies 350, 360, 370, 380 may be formed from a plurality of prisms that comprise the CR reflection boundaries 310, 320, 330, 340, the CR half-mirrors 311, 321, 331, 341, the outward-positioned half-mirrors 352, 362, 372, 382, the outward-positioned reflection boundaries 351, 361, 371, 381, and the inward-positioned half-mirrors 354, 364, 374, 384. It should also be understood that the cloaking assembly 30 may cloak an object within the cloaked region CR including only the first object-side and image-side CR reflection boundaries 310, 320, the first object-side and image-side CR half-mirrors 311, 321, the first object-side and image-side outward-positioned half-mirrors 352, 362, the first object-side and image-side outward-positioned reflection boundaries 351, 361 and the first object-side and image-side inward-positioned half-mirrors 354, 364. That is, an object positioned on the first side (+X direction) of the reference optical axis 36 within the cloaked region CR would be cloaked by the first object-side and image-side CR reflection boundaries 310, 320, the first object-side and image-side CR half-mirrors 311, 321, the first object-side and image-side outward-positioned half-mirrors 352, 362, the first object-side and image-side outward-positioned reflection boundaries 351, 361 and the first object-side and image-side inward-positioned half-mirrors 354, 364. In the alternative, an object positioned on the second side (−X direction) of the reference optical axis 36 within the cloaked region CR would be cloaked by the second object-side and image-side CR reflection boundaries 330, 340, the second object-side and image-side CR half-mirrors 331, 341, the second object-side and image-side outward-positioned half-mirrors 372, 382, the second object-side and image-side outward-positioned reflection boundaries 371, 381 and the second object-side and image-side inward-positioned half-mirrors 374, 384.

Figure 4:
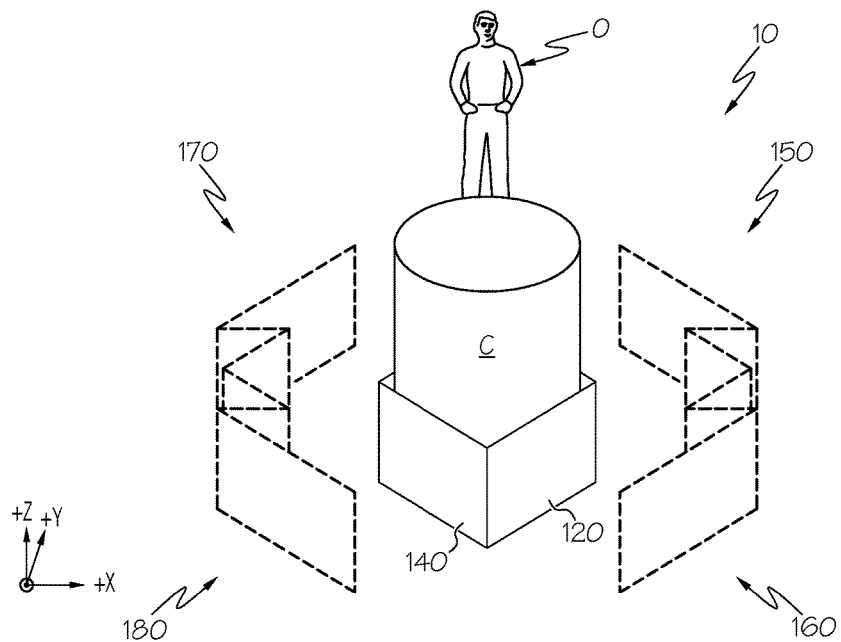
FIG. 4 schematically depicts a top perspective view of the cloaking assembly in FIG. 1A with a first object on one side of the cloaking assembly and a second object within a cloaked region of the cloaking assembly.
Figure 5:
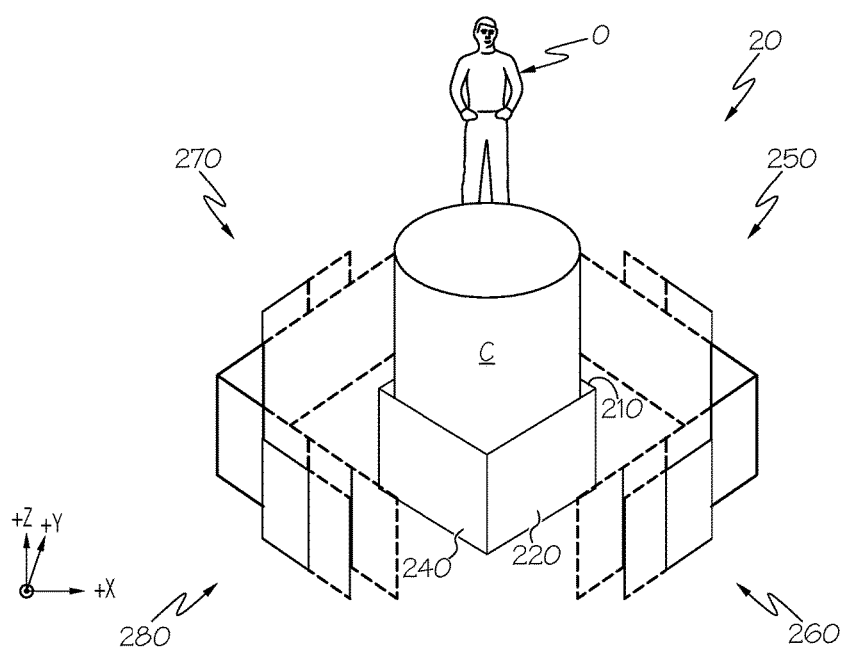
FIG. 5 schematically depicts a top perspective view of the cloaking assembly of FIG. 2A with a first object on one side of the cloaking assembly and a second object within a cloaked region of the cloaking assembly.
Figure 6:
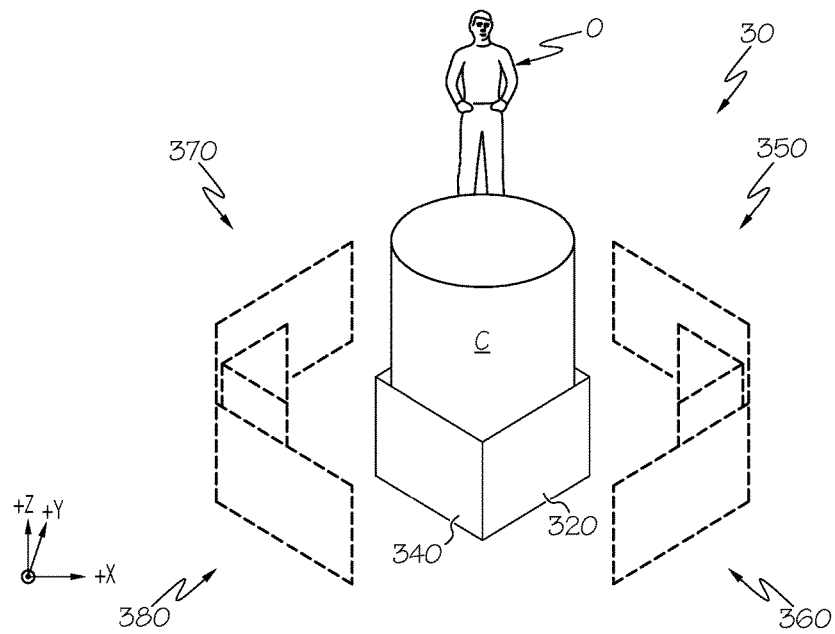
FIG. 6 schematically depicts a top perspective view of the cloaking assembly of FIG. 3A with a first object on one side of the cloaking assembly and a second object within a cloaked region of the cloaking assembly.
Figure 7:
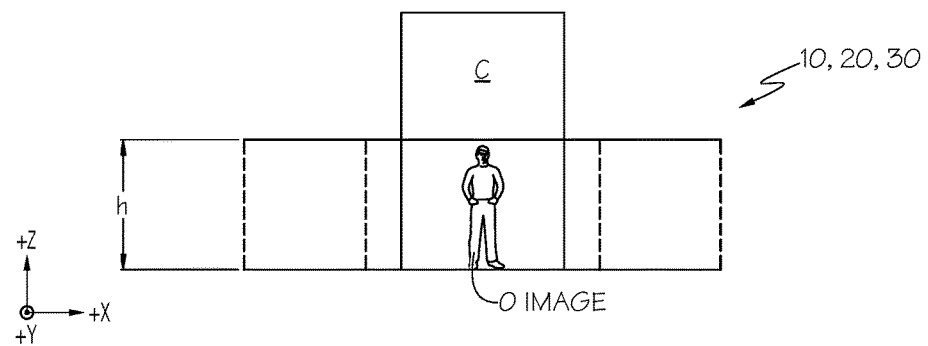
FIG. 7 schematically depicts a side view of the cloaking assemblies of FIGS. 1A, 2A, and 3A with the first object on one side of the cloaking assemblies and the second object within the cloaked region of the cloaking assemblies.

Referring now to FIGS. 4-7, top perspective views and a side view of cloaking devices according to embodiments described herein depicted. Particularly, FIG. 4 is a top perspective view of an article in the form of a column 'C' within the cloaked region CR of the cloaking assembly 10 (FIG. 1A) and an object 'O' (e.g., a person) located behind the column C on the object-side 12 of the cloaking assembly 10 in the +Y direction. The column C has a height dimension in the Z direction (increasing height in the +Z direction) greater than the height h of the cloaking device (FIG. 7). FIG. 5 is a top perspective view of the column C within the cloaked region CR of the cloaking assembly 20 (FIG. 2A) and the object O located behind the column C on the object-side 22 of the cloaking assembly 20 in the +Y direction. FIG. 6 is a top perspective view of the column C within the cloaked region CR of the cloaking assembly 30 (FIG. 3A) and the object O located behind the column C on the object-side 32 of the cloaking assembly 30 in the +Y direction. FIG. 7 is a side view from the +Y direction of the cloaking assemblies 10, 20, 30 shown in FIGS. 4-6 and shows the portion of the column C that is within the cloaked region CR is not visible and the object O located behind the column C in the +Y direction is visible to an observer viewing the cloaking assemblies 10, 20, 30 in the +Y direction. Accordingly, the column C positioned within the cloaked region CR is not visible to an observer viewing the image-sides 14, 24, 34 of the cloaking assemblies 10, 20, 30, respectively, and an image of the object O is visible to the observer viewing the image-sides 14, 24, 34. Although column C in FIGS. 4-6 is separate from the inward facing surfaces 114, 124, 134, 144 (FIG. 4), the inward facing surfaces 214, 224, 234, 244 (FIG. 5,) and the inward facing surfaces 314, 324, 334, 344 (FIG. 6) i.e., column C is a separate object from the cloaking assemblies 10, 20, 30, it should be appreciated that column C may be structurally part of the cloaking assembly 10, the cloaking assembly 20 and/or cloaking assembly 30 and have an outer surface that provides or is equivalent to the inward facing surfaces 114, 124, 134, 144 (FIG. 1A), the inward facing surfaces 214, 224, 234, 244 (FIG. 2A) and/or the inward facing surfaces 314, 324, 334, 344 (FIG. 3A).

Figure 8:
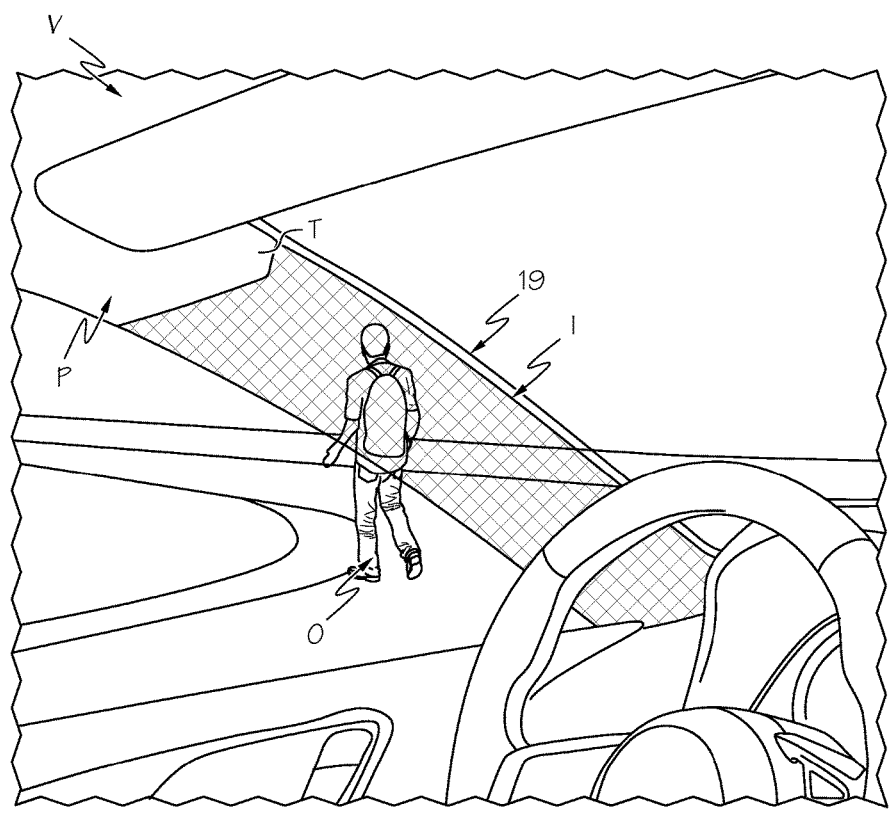
FIG. 8 schematically depicts a side view of a cloaking assembly cloaking an A-pillar of a vehicle according to one or more embodiments described and illustrated herein.

Referring to FIG. 8, embodiments of an A-pillar of a vehicle being cloaked by a cloaking device are shown. Particularly, FIG. 8 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

The cloaking devices described herein may be used to cloak vehicle articles such as a vehicle A-pillar, B-pillar, C-pillar, D-pillar, etc., and remove a blind spot caused by the vehicle article. Also, the cloaking devices described herein may be used to cloak articles such as extension cords, electrical conduit, piping, etc., in home, office and industrial environments. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side, an image-side, a cloaked region (CR) between the object-side and the image-side, and a reference optical axis extending from the object-side to the image-side;
   an object-side CR reflection boundary and an object-side optical component sub-assembly, the object-side optical component sub-assembly comprising an object-side outward-positioned half-mirror spaced apart and generally parallel to the object-side CR reflection boundary, an object-side inward-positioned half-mirror spaced apart and generally parallel to the object-side outward-positioned half-mirror, and at least one of an object-side outward-positioned reflection boundary spaced apart and parallel to the object-side CR reflection boundary and an object-side half-wave plate spaced apart and non-parallel to the object-side CR reflection boundary;
   an image-side CR reflection boundary, and an image-side optical component sub-assembly, the image-side optical component sub-assembly comprising an image-side outward-positioned half-mirror spaced apart and generally parallel to the image-side CR reflection boundary, an image-side inward-positioned half-mirror spaced apart and generally parallel to the image-side outward-positioned half-mirror, and at least one of an image-side outward-positioned reflection boundary spaced apart and parallel to the image-side CR reflection boundary and an image-side half-wave plate spaced apart and non-parallel to the image-side CR reflection boundary;
   wherein light from an object located on the object-side of the cloaking device and obscured by the CR is redirected around the CR via three optical paths to form an image of the object on the image-side of the cloaking device such that the light from the object appears to pass through the CR.

2. The cloaking device of claim 1, further comprising:
   an object-side CR half-mirror co-planar with the object-side CR reflection boundary, wherein:
      the object-side inward-positioned half-mirror is positioned between the object-side outward-positioned half-mirror and the object-side CR half-mirror;
      the object-side optical component sub-assembly comprises the object-side half-wave plate positioned generally perpendicular to the reference optical axis extending between the object-side outward-positioned half-mirror and the object-side inward-positioned half-mirror; and
   an image-side CR half-mirror co-planar with the image-side CR reflection boundary, wherein:
      the image-side inward-positioned half-mirror is positioned between the image-side outward-positioned half-mirror and the image-side CR half-mirror;
      the image-side optical component sub-assembly comprises the image-side half-wave plate positioned generally perpendicular to the reference optical axis extending between the image-side outward-positioned half-mirror and the image-side inward-positioned half-mirror.

3. The cloaking device of claim 2, wherein the three optical paths comprise:
   a first optical path of: Object—reflection from object-side CR reflection boundary—reflection from object-side outward-positioned half-mirror—reflection from object-side CR half-mirror—reflection from object-side inward-positioned half-mirror—reflection from image-side inward-positioned half-mirror—reflection from image-side CR half-mirror—reflection from image-side outward-positioned half-mirror—reflection from image-side CR reflection boundary Image;
   a second optical path of: Object—reflection from object-side CR reflection boundary—reflection from object-side outward-positioned half-mirror—transmittance through object-side half-wave plate—transmittance through object-side inward-positioned half-mirror—transmittance through image-side inward-positioned half-mirror—transmittance through image-side half-wave plate—reflection from image-side outward-positioned half-mirror—reflection from image-side CR reflection boundary—Image; and a third optical path of: Object—transmittance through object-side outward-positioned half-mirror—transmittance through object-side CR half-mirror—transmittance through image-side CR half-mirror—transmittance through image-side outward-positioned half-mirror—Image.

4. The cloaking device of claim 1, wherein:

the object-side inward-positioned half-mirror is positioned between the object-side outward-positioned half-mirror and the object-side CR reflection boundary;

the object-side optical component sub-assembly comprises an object-side outward-positioned reflection boundary co-planar with the object-side outward-positioned half-mirror, an object-side inward-positioned reflection boundary co-planar with the object-side inward-positioned half-mirror and the object-side half-wave plate positioned generally parallel to the reference optical axis extending between the object-side outward-positioned half-mirror and the object-side inward-positioned half-mirror;

the image-side inward-positioned half-mirror is positioned between the image-side outward-positioned half-mirror and the image-side CR reflection boundary;

the image-side optical component sub-assembly comprises an image-side outward-positioned reflection boundary co-planar with the image-side outward-positioned half-mirror, an image-side inward-positioned reflection boundary co-planar with the image-side inward-positioned half-mirror and the image-side half-wave plate positioned generally parallel to the reference optical axis extending between the image-side outward-positioned half-mirror and the image-side inward-positioned half-mirror.

5. The cloaking device of claim 4, wherein the three optical paths comprise:

a first optical path of: Object—reflection from object-side CR reflection boundary—reflection from object-side inward-positioned half-mirror—reflection from object-side CR reflection boundary—reflection from object-side inward-positioned reflection boundary—reflection from image-side inward-positioned reflection boundary—reflection from image-side CR reflection boundary—reflection from image-side inward-positioned half-mirror—reflection from image-side CR reflection boundary—Image;

a second optical path of: Object—reflection from object-side inward-positioned half-mirror—reflection from object-side outward-positioned half-mirror—reflection from object-side inward-positioned half-mirror—transmittance through object-side half-wave plate—reflection from object-side outward-positioned reflection boundary—transmittance through object-side inward-positioned half-mirror—transmittance through image-side inward-positioned half-mirror—reflection from image-side outward-positioned reflection boundary—transmittance through image-side half-wave plate—reflection from image-side inward-positioned half-mirror—reflection from image-side outward-positioned half-mirror—reflection from image-side inward-positioned half-mirror—Image; and a third optical path of: Object—transmittance through object-side outward-positioned half-mirror—transmittance through object-side inward-positioned half-mirror—reflection from object-side CR reflection boundary—reflection from object-side inward-positioned reflection boundary—reflection from image-side inward-positioned reflection boundary—reflection from image-side CR reflection boundary—transmittance through image-side inward-positioned half-mirror—transmittance through image-side outward-positioned half-mirror—Image.

6. The cloaking device of claim 1, further comprising:

an object-side CR half-mirror co-planar with the object-side CR reflection boundary and an object-side outward-positioned reflection boundary co-planar with the object-side outward-positioned half-mirror, wherein the object-side inward-positioned half-mirror is positioned between the object-side outward-positioned reflection boundary and the object-side CR half-mirror; and an image-side CR half-mirror co-planar with the image-side CR reflection boundary and an image-side outward-positioned reflection boundary co-planar with the image-side outward-positioned half-mirror, wherein the image-side inward-positioned half-mirror is positioned between the image-side outward-positioned reflection boundary and the image-side CR half-mirror.

7. The cloaking device of claim 6, wherein the three optical paths comprise:

a first optical path of: Object—reflection from object-side CR reflection boundary—reflection from object-side outward-positioned half-mirror—reflection from object-side CR half-mirror—reflection from object-side inward-positioned half-mirror—reflection from image-side inward-positioned half-mirror—reflection from image-side CR half-mirror—reflection from image-side outward-positioned half-mirror—reflection from image-side CR reflection boundary—Image;

a second optical path of: Object—reflection from object-side CR reflection boundary—reflection from object-side outward-positioned reflection boundary—transmittance through object-side inward-positioned half-mirror—transmittance through image-side inward-positioned half-mirror—reflection from image-side outward-positioned reflection boundary—reflection from image-side CR reflection boundary—Image; and a third optical path of: Object—transmittance through object-side outward-positioned half-mirror—transmittance through object-side CR half-mirror—transmittance through image-side CR half-mirror—transmittance through image-side outward-positioned half-mirror—Image.

8. A cloaking device assembly comprising:

an object-side, an image-side, a cloaked region (CR) between the object-side and the image-side, and a reference optical axis extending from the object-side to the image-side;

a first object-side CR reflection boundary and a first object-side optical component sub-assembly on a first side of the reference optical axis, the first object-side optical component sub-assembly comprising a first object-side outward-positioned half-mirror spaced apart and generally parallel to the first object-side CR reflection boundary, a first object-side inward-positioned half-mirror spaced apart and generally parallel to the first object-side outward-positioned half-mirror, and at least one of a first object-side outward-positioned reflection boundary spaced apart and parallel to the first object-side CR reflection boundary and a first object-side half-wave plate spaced apart and not parallel to the first object-side CR reflection boundary;

a second object-side CR reflection boundary and a second object-side optical component sub-assembly on a second side of the reference optical axis opposite the first side, the second object-side optical component sub-assembly comprising a second object-side outward-positioned half-mirror spaced apart and generally parallel to the second object-side CR reflection boundary, a second object-side inward-positioned half-mirror spaced apart and generally parallel to the second object-side outward-positioned half-mirror, and at least one of a second object-side outward-positioned reflection boundary spaced apart and parallel to the second object-side CR reflection boundary and a second object-side half-wave plate spaced apart and not parallel to the second object-side CR reflection boundary;

a first image-side CR reflection boundary and a first image-side optical component sub-assembly on the first side of the reference optical axis, the first image-side optical component sub-assembly comprising a first image-side outward-positioned half-mirror spaced apart and generally parallel to the first image-side CR reflection boundary, a first image-side inward-positioned half-mirror spaced apart and generally parallel to the first image-side outward-positioned half-mirror, and at least one of a first image-side outward-positioned reflection boundary spaced apart and parallel to the first image-side CR reflection boundary and a first image-side half-wave plate spaced apart and not parallel to the first image-side CR reflection boundary;

a second image-side CR reflection boundary and a second image-side optical component sub-assembly on the second side of the reference optical axis opposite the first side, the second image-side optical component sub-assembly comprising a second image-side outward-positioned half-mirror spaced apart and generally parallel to the second image-side CR reflection boundary, a second image-side inward-positioned half-mirror spaced apart and generally parallel to the second image-side outward-positioned half-mirror, and at least one of a second image-side outward-positioned reflection boundary spaced apart and parallel to the second image-side CR reflection boundary and a second image-side half-wave plate spaced apart and not parallel to the second image-side CR reflection boundary;

wherein light from an object located on the object-side of the cloaking device assembly and obscured by the CR is redirected around the CR via three optical paths on the first side of the reference optical axis and three optical paths on the second side of the reference optical axis to form an image of the object on the image-side of the cloaking device assembly such that the light from the object appears to pass through the CR.

9. The cloaking device assembly of claim 8, further comprising:
first and second object-side CR half-mirrors co-planar with the first and second object-side CR reflection boundaries, respectively, wherein:
the first and second object-side inward-positioned half-mirrors are positioned between the first and second object-side outward-positioned half-mirrors and the first and second object-side CR half-mirrors, respectively;
the first and second object-side optical component sub-assemblies comprise the first and second object-side half-wave plates, respectively, positioned generally perpendicular to the reference optical axis extending between the first and second object-side outward-positioned half-mirrors and the first and second object-side inward-positioned half-mirrors, respectively; and first and second image-side CR half-mirrors co-planar with the first and second image-side CR reflection boundaries, respectively, wherein:
the first and second image-side inward-positioned half-mirrors are positioned between the first and second image-side outward-positioned half-mirrors and the first and second image-side CR half-mirrors, respectively;
the first and second image-side optical component sub-assemblies comprise the first and second image-side half-wave plates, respectively, positioned generally perpendicular to the reference optical axis extending between the first and second image-side outward-positioned half-mirrors and the first and second image-side inward-positioned half-mirrors, respectively.

10. The cloaking device assembly of claim 9, wherein the three optical paths on the first side of the reference optical axis and the three optical paths on the second side of the reference optical axis comprise:
a first optical path of: Object—reflection from first and second object-side CR reflection boundaries—reflection from first and second object-side outward-positioned half-mirrors—reflection from first and second object-side CR half-mirrors—reflection from first and second object-side inward-positioned half-mirrors—reflection from first and second image-side inward-positioned half-mirrors—reflection from first and second image-side CR half-mirrors—reflection from first and second image-side outward-positioned half-mirrors—reflection from first and second image-side CR reflection boundaries—Image;
a second optical path of: Object—reflection from first and second object-side CR reflection boundaries—reflection from first and second object-side outward-positioned half-mirrors—transmittance through first and second object-side half-wave plates—transmittance through first and second object-side inward-positioned half-mirrors—transmittance through first and second image-side inward-positioned half-mirrors—transmittance through first and second image-side half-wave plates—reflection from first and second image-side outward-positioned half-mirrors—reflection from first and second image-side CR reflection boundaries—Image; and
a third optical path of: Object—transmittance through first and second object-side outward-positioned half-mirrors—transmittance through first and second object-side CR half-mirrors —transmittance through first and second image-side CR half-mirrors—transmittance through first and second image-side outward-positioned half-mirrors—Image.

11. The cloaking device assembly of claim 8, wherein:
the first and second object-side inward-positioned half-mirrors are positioned between the first and second object-side outward-positioned half-mirrors and the first and second object-side CR reflection boundaries, respectively;
the first and second object-side optical component sub-assemblies comprise first and second object-side outward-positioned reflection boundaries, respectively, co-planar with the first and second object-side outward-positioned half-mirrors, respectively, first and second object-side inward-positioned reflection boundaries co-planar with the first and second object-side inward-positioned half-mirrors, respectively, and the first and second object-side half-wave plates positioned generally parallel to the reference optical axis and extending between the first and second object-side outward-positioned half-mirrors and the first and second object-side inward-positioned half-mirrors, respectively;

the first and second image-side inward-positioned half-mirrors are positioned between the first and second image-side outward-positioned half-mirrors and the first and second image-side CR reflection boundaries, respectively;

the first and second image-side optical component sub-assemblies comprise first and second image-side outward-positioned reflection boundaries, respectively, co-planar with the first and second image-side outward-positioned half-mirrors, respectively, first and second image-side inward-positioned reflection boundaries co-planar with the first and second image-side inward-positioned half-mirrors, respectively, and the first and second image-side half-wave plates positioned generally parallel to the reference optical axis and extending between the first and second image-side outward-positioned half-mirrors and the first and second image-side inward-positioned half-mirrors, respectively.

12. The cloaking device assembly of claim 11, wherein the three optical paths on the first side of the reference optical axis and the three optical paths on the second side of the reference optical axis comprise:

first optical paths of: Object—reflection from first and second object-side CR reflection boundaries—reflection from first and second object-side inward-positioned half-mirrors—reflection from first and second object-side CR reflection boundaries—reflection from first and second object-side inward-positioned reflection boundaries—reflection from first and second image-side inward-positioned reflection boundaries—reflection from first and second image-side CR reflection boundaries—reflection from first and second image-side inward-positioned half-mirrors—reflection from first and second image-side CR reflection boundaries—Image;

second optical paths of: Object—reflection from first and second object-side inward-positioned half-mirrors—reflection from first and second object-side outward-positioned half-mirrors—reflection from first and second object-side inward-positioned half-mirrors—transmittance through first and second object-side half-wave plates—reflection from first and second object-side outward-positioned reflection boundaries—transmittance through first and second object-side inward-positioned half-mirrors—transmittance through first and second image-side inward-positioned half-mirrors—reflection from first and second image-side outward-positioned reflection boundaries—transmittance through first and second image-side half-wave plates—reflection from first and second image-side inward-positioned half-mirrors—reflection from first and second image-side outward-positioned half-mirrors—reflection from first and second image-side inward-positioned half-mirrors—Image; and third optical paths of: Object—transmittance through first and second object-side outward-positioned half-mirrors—transmittance through first and second object-side inward-positioned half-mirrors—reflection from first and second object-side CR reflection boundaries—reflection from first and second object-side inward-positioned reflection boundaries—reflection from first and second image-side inward-positioned reflection boundaries—reflection from first and second image-side CR reflection boundaries—transmittance through first and second image-side inward-positioned half-mirrors—transmittance through first and second image-side outward-positioned half-mirrors—Image.

13. The cloaking device assembly of claim 8, further comprising:

first and second object-side CR half-mirrors co-planar with the first and second object-side CR reflection boundaries, respectively, and first and second object-side outward-positioned reflection boundaries co-planar with the first and second object-side outward-positioned half-mirrors, respectively, wherein the first and second object-side inward-positioned half-mirrors are positioned between the first and second object-side outward-positioned reflection boundaries and the first and second object-side CR half-mirrors, respectively; and first and second image-side CR half-mirrors co-planar with the first and second image-side CR reflection boundaries, respectively, and first and second image-side outward-positioned reflection boundaries co-planar with the first and second image-side outward-positioned half-mirrors, respectively, wherein the first and second image-side inward-positioned half-mirrors are positioned between the first and second image-side outward-positioned reflection boundaries and the first and second image-side CR half-mirrors, respectively.

14. The cloaking device assembly of claim 13, wherein the three optical paths on the first side of the reference optical axis and the three optical paths on the second side of the reference optical axis comprise:

first optical paths of: Object—reflection from first and second object-side CR reflection boundaries—reflection from first and second object-side outward-positioned half-mirrors—reflection from first and second object-side CR half-mirrors—reflection from first and second object-side inward-positioned half-mirrors—reflection from first and second image-side inward-positioned half-mirrors—reflection from first and second image-side CR half-mirrors—reflection from first and second image-side outward-positioned half-mirrors—reflection from first and second image-side CR reflection boundaries—Image;

second optical paths of: Object—reflection from first and second object-side CR reflection boundaries—reflection from first and second object-side outward-positioned reflection boundaries—transmittance through first and second object-side inward-positioned half-mirrors—transmittance through first and second image-side inward-positioned half-mirrors—reflection from first and second image-side outward-positioned reflection boundaries—reflection from first and second image-side CR reflection boundaries—Image; and third optical paths of: Object—transmittance through first and second object-side outward-positioned half-mirrors—transmittance through first and second object-side CR half-mirrors—transmittance through first and second image-side CR half-mirrors—transmittance through first and second image-side outward-positioned half-mirrors—Image.

15. A vehicle comprising:
an A-pillar; and
a cloaking device positioned on the A-pillar, the cloaking device comprising:

an object-side, an image-side, and a cloaked region (CR) between the object-side and the image-side, and a reference optical axis extending from the object-side to the image-side, wherein the A-pillar is positioned within the cloaked region, the object-side is positioned on an exterior of the vehicle and the image-side is positioned within an interior of the vehicle;

an object-side CR reflection boundary and an object-side optical component sub-assembly, the object-side optical component sub-assembly comprising an object-side outward-positioned half-mirror spaced apart and generally parallel to the object-side CR reflection boundary, an object-side inward-positioned half-mirror spaced apart and generally parallel to the object-side outward-positioned half-mirror, and at least one of an object-side outward-positioned reflection boundary spaced apart and parallel to the object-side CR reflection boundary and an object-side half-wave plate spaced apart and not parallel to the object-side CR reflection boundary;

an image-side CR reflection boundary, and an image-side optical component sub-assembly, the image-side optical component sub-assembly comprising an image-side outward-positioned half-mirror spaced apart and generally parallel to the image-side CR reflection boundary, an image-side inward-positioned half-mirror spaced apart and generally parallel to the image-side outward-positioned half-mirror, and at least one of an image-side outward-positioned reflection boundary spaced apart and parallel to the image-side CR reflection boundary and an image-side half-wave plate spaced apart and not parallel to the image-side CR reflection boundary;

wherein light from an object located on the object-side of the cloaking device and obscured by the A-pillar is redirected around the A-pillar via three optical paths to form an image of the object on the image-side of the cloaking device such that the light from the object appears to pass through the A-pillar.

16. The vehicle of claim 15, further comprising:
an object-side CR half-mirror co-planar with the object-side CR reflection boundary, wherein:
   the object-side inward-positioned half-mirror is positioned between the object-side outward-positioned half-mirror and the object-side CR half-mirror;
   the object-side optical component sub-assembly comprises the object-side half-wave plate positioned generally perpendicular to the reference optical axis extending between the object-side outward-positioned half-mirror and the object-side inward-positioned half-mirror; and
an image-side CR half-mirror co-planar with the image-side CR reflection boundary, wherein:
   the image-side inward-positioned half-mirror is positioned between the image-side outward-positioned half-mirror and the image-side CR half-mirror;
   the image-side optical component sub-assembly comprises the image-side half-wave plate positioned generally perpendicular to the reference optical axis extending between the image-side outward-positioned half-mirror and the image-side inward-positioned half-mirror.

17. The vehicle of claim 16, wherein the three optical paths comprise:
a first optical path of: Object—reflection from object-side CR reflection boundary—reflection from object-side outward-positioned half-mirror—reflection from object-side CR half-mirror—reflection from object-side inward-positioned half-mirror—reflection from image-side inward-positioned half-mirror—reflection from image-side CR half-mirror—reflection from image-side outward-positioned half-mirror—reflection from image-side CR reflection boundary—Image;
a second optical path of: Object—reflection from object-side CR reflection boundary—reflection from object-side outward-positioned half-mirror—transmittance through object-side half-wave plate—transmittance through object-side inward-positioned half-mirror—transmittance through image-side inward-positioned half-mirror—transmittance through image-side half-wave plate—reflection from image-side outward-positioned half-mirror—reflection from image-side CR reflection boundary—Image; and
a third optical path of: Object—transmittance through object-side outward-positioned half-mirror—transmittance through object-side CR half-mirror—transmittance through image-side CR half-mirror—transmittance through image-side outward-positioned half-mirror—Image.

18. The vehicle of claim 15, wherein:
the object-side inward-positioned half-mirror is positioned between the object-side outward-positioned half-mirror and the object-side CR reflection boundary;
the object-side optical component sub-assembly comprises an object-side outward-positioned reflection boundary co-planar with the object-side outward-positioned half-mirror, an object-side inward-positioned reflection boundary co-planar with the object-side inward-positioned half-mirror and the object-side half-wave plate positioned generally parallel to the reference optical axis extending between the object-side outward-positioned half-mirror and the object-side inward-positioned half-mirror;
the image-side inward-positioned half-mirror is positioned between the image-side outward-positioned half-mirror and the image-side CR reflection boundary;
the image-side optical component sub-assembly comprises an image-side outward-positioned reflection boundary co-planar with the image-side outward-positioned half-mirror, an image-side inward-positioned reflection boundary co-planar with the image-side inward-positioned half-mirror and the image-side half-wave plate positioned generally parallel to the reference optical axis extending between the image-side outward-positioned half-mirror and the image-side inward-positioned half-mirror.

19. The vehicle of claim 18, wherein the three optical paths comprise:
a first optical path of: Object—reflection from object-side CR reflection boundary—reflection from object-side inward-positioned half-mirror—reflection from object-side CR reflection boundary—reflection from object-side inward-positioned reflection boundary—reflection from image-side inward-positioned reflection boundary—reflection from image-side CR reflection boundary—reflection from image-side inward-positioned half-mirror—reflection from image-side CR reflection boundary—Image;
a second optical path of: Object—reflection from object-side inward-positioned half-mirror—reflection from object-side outward-positioned half-mirror—reflection from object-side inward-positioned half-mirror—transmittance through object-side half-wave plate—reflection from object-side outward-positioned reflection boundary—transmittance through object-side inward-positioned half-mirror—transmittance through image-side inward-positioned half-mirror—reflection from image-side outward-positioned reflection boundary—transmittance through image-side half-wave plate—reflection from image-side inward-positioned half-mirror—reflection from image-side outward-positioned half-mirror—reflection from image-side inward-positioned half-mirror—Image; and a third optical path of: Object—transmittance through object-side outward-positioned half-mirror—transmittance through object-side inward-positioned half-mirror—reflection from object-side CR reflection boundary—reflection from object-side inward-positioned reflection boundary—reflection from image-side inward-positioned reflection boundary—reflection from image-side CR reflection boundary—transmittance through image-side inward-positioned half-mirror—transmittance through image-side outward-positioned half-mirror—Image.

20. The cloaking device of claim 15, further comprising:

an object-side CR half-mirror co-planar with the object-side CR reflection boundary and an object-side outward-positioned reflection boundary co-planar with the object-side outward-positioned half-mirror, wherein the object-side inward-positioned half-mirror is positioned between the object-side outward-positioned reflection boundary and the object-side CR half-mirror; and an image-side CR half-mirror co-planar with the image-side CR reflection boundary and an image-side outward-positioned reflection boundary co-planar with the image-side outward-positioned half-mirror, wherein the image-side inward-positioned half-mirror is positioned between the image-side outward-positioned reflection boundary and the image-side CR half-mirror.

* * * * *

UNITED STATES PATENT AND TRADEMARK OFFICE
CERTIFICATE OF CORRECTION

| | | |
|---|---|---|
| PATENT NO. | : 10,317,685 B1 | Page 1 of 1 |
| APPLICATION NO. | : 15/816084 | |
| DATED | : June 11, 2019 | |
| INVENTOR(S) | : Kyu-Tae Lee, Chengang Ji and Debasish Banerjee | |

It is certified that error appears in the above-identified patent and that said Letters Patent is hereby corrected as shown below:

On the Title Page

Item (56), references cited, U.S. patent documents, Citation no (5), delete "Banerjee" and insert --Banerjee et al.--, therefor.

Signed and Sealed this
Thirtieth Day of July, 2019

Andrei Iancu
*Director of the United States Patent and Trademark Office*